United States Patent [19]

Johnson et al.

[11] Patent Number: 4,727,509

[45] Date of Patent: Feb. 23, 1988

[54] MASTER/SLAVE SYSTEM FOR REPLICATING/FORMATTING FLEXIBLE MAGNETIC DISKETTES

[75] Inventors: Ronald R. Johnson, Shorewood; Robert J. Kirscht, Hopkins; David C. Burns, Long Lake, all of Minn.

[73] Assignee: Information Exchange Systems, Inc., Shorewood, Minn.

[21] Appl. No.: 625,781

[22] Filed: Jun. 28, 1984

[51] Int. Cl.[4] ............... G06F 13/00; G06F 11/00; G11B 5/86
[52] U.S. Cl. ............................ 364/900; 360/15; 360/73
[58] Field of Search ... 364/200 MS File, 900 MS File, 364/468; 360/15, 51, 7, 73, 48

[56] References Cited

U.S. PATENT DOCUMENTS

| | | | |
|---|---|---|---|
| 3,778,793 | 12/1973 | Hayashi et al. | 360/51 |
| 3,805,284 | 4/1974 | Coon, Jr. et al. | 360/15 |
| 3,864,735 | 2/1975 | Davis et al. | 360/51 |
| 3,938,184 | 2/1976 | DeFrancesco et al. | 360/51 |
| 4,157,573 | 6/1979 | Aghazadeh et al. | 360/51 |
| 4,357,707 | 11/1982 | Delury | 360/51 X |
| 4,365,210 | 12/1982 | Harrington et al. | 360/51 |
| 4,375,655 | 3/1983 | Korth et al. | 360/15 |
| 4,471,390 | 9/1984 | Hamann | 360/15 |
| 4,494,156 | 1/1985 | Kadison et al. | 360/15 |
| 4,499,507 | 2/1985 | Yamada et al. | 360/51 |
| 4,541,019 | 9/1985 | Precourt | 360/15 |
| 4,551,840 | 11/1985 | Fujii et al. | 360/15 |

Primary Examiner—Raulfe B. Zache
Assistant Examiner—William G. Niessen
Attorney, Agent, or Firm—Orrin M. Haugen; Thomas J. Nikolai

[57] ABSTRACT

A system for facilitating the mass duplication of flexible diskettes of the type used to store programs and related data for use with word processors, computer systems, etc. A microprocessor-controlled base station, including a Kopy Module and two associated manual modules, is coupled by means of a daisy-chained bidirectional data Way to a plurality of slave stations. The Kopy Module may be used to store a plurality of possible diskette formats as well as operator-introduced copy and duplicating instructions. Blank diskettes are fed into the slaves and the blank diskettes are formatted in accordance with information supplied by the master. An especially designed translator contained within the Kopy Module allows diskettes bearing all of the commonly used data encoding techniques to be replicated. In another mode of operation, diskettes with unknown formats are analyzed, deciphered and stored for later use.

10 Claims, 46 Drawing Figures

DRIVE CONTROL SECTION

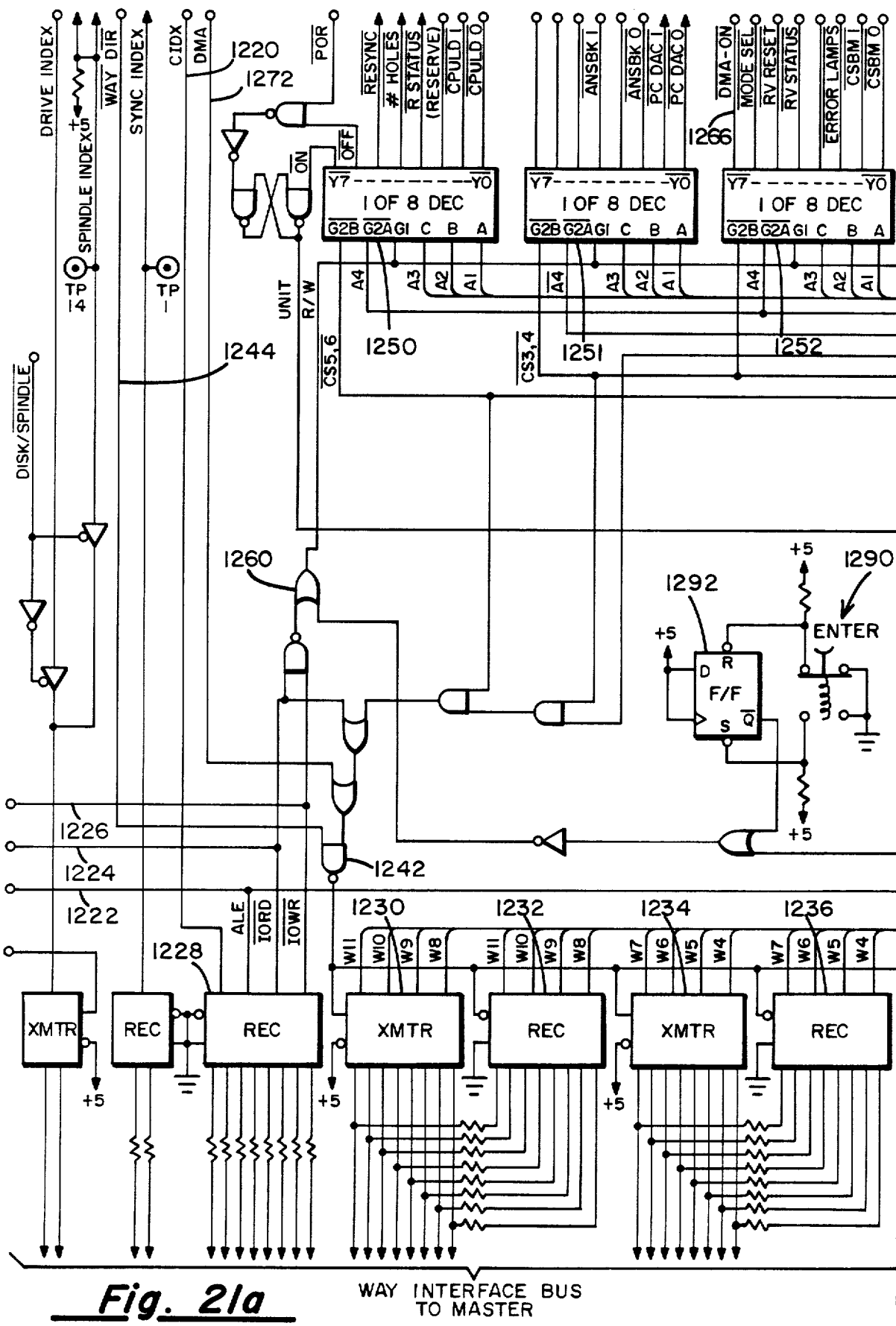
Fig. 21a  WAY INTERFACE BUS TO MASTER

MASTER/SLAVE SYSTEM FOR REPLICATING/FORMATTING FLEXIBLE MAGNETIC DISKETTES

BACKGROUND OF THE INVENTION

I. Field of the Invention

This invention relates generally to a system for copying and duplicating flexible magnetic storage diskettes, and more specifically, a system which permits the copying and duplication of such magnetic storage diskettes on a high-volume basis irrespective of the mode in which the magnetic information is recorded and the format employed for organizing the digital information on the diskette.

II. Discussion of the Prior Art

In recent years there has been an explosive growth in the number of personal computers and minicomputer systems installed throughout the world, and this growth is expected to compound dramatically through the rest of this decade. These computer systems are typically 8 or 16-bit microprocessors and 32 bit minicomputers, both of which rely extensively on flexible magnetic disk or "floppies" for their program and data input.

Whereas, in the past, the number of copies of a program which had to be prepared was relatively low while the selling price of the program was high, often in the thousands of dollars, it intended to make the cost of duplication of the program a relatively insignificant issue. Personal computer software typically sells in the $50–$200 price range and literally thousands, and perhaps in the future millions, of copies of a particular program will be produced. What is required for low-cost mass duplication of information on floppy diskettes is the equivalent of the modern day printing press. However, whereas the printing press can be modified to print virtually any material for any use by merely changing the printing plates, it is not that simple in the duplication of magnetic storage diskettes. Virtually every computer system employs a different diskette standard, where these differences will cover the physical size of the diskette, i.e., 3 in., 3¼ in., 3½ in., 5¼ in. or 8 in. diameter, the manner in which the digital information is encoded into the magnetic domains, i.e., FM, MFM, $M^2FM$, GCR and, even more diversely, the format or structure which is used to organize the data on the diskette.

Each computer system has developed a unique combination of dedicated high-speed hardware and software to perform the read and write operations for a particular diskette standard. It cannot accommodate any other standard typically. We thus have a real "Tower of Babel" syndrome in the computer industry. Duplication of programs is even further complicated by the use of copy protection schemes of software publishers which make it very difficult, if not impossible, for a user of the software to make his own copies with his equipment. Software publishing to date has been virtually a Guttenberg-type process, with the duplication of diskettes being done on very special purpose hardware with very low production rates.

The present invention enables very low-cost, high-speed duplication of diskettes, e.g., 4,200 per hour in a maximum configuration, for the diskette size mentioned for any of the encoding standards in use and it will accommodate any variety of formats presently used or which may be derived in the future, including formats which are copy-protected. Whereas, conventional techniques can potentially achieve this level of versatility at very low production rates or, conversely, low versatility at high-production rates, the novelty of the present invention resides in special purpose apparatus which will accomplish both ends. That is to say, through a combination of special purpose high-speed logic, which makes extensive use of large scale integrated circuits and programmable array logic "PALs", coupled with a unique architecture which allows the duplication process to be done in parallel on a plurality of slaves, e.g., 30 or even more, both high volume and high versatility are achieved.

A conventional 16-bit microprocessor, executing a program out of eraseable programmable read-only memory (EPROM), provides supervisory control for the dedicated high-speed logic.

In that in all digital magnetic recording, regardless of the media, the method of encoding the data or the data format, involves the periodic reversal of magnetized states on the magnetic media, i.e., flux transitions, this is the common denominator of all recording systems. The entire duplication process of this invention deals with information represented in the form of the time of occurrence of flux transitions. This is the most detailed representation of the data and thus requires higher speed logic circuitry to deal with it, but it is the most general form of the data and this is the feature that enables complete versatility of duplication. Reliable high-speed duplication requires three revolutions of the object diskette for each track of information, one revolution to acquire the track, a second to write the data onto the track and the third to verify the integrity of the track by comparing the information read to what was intended.

A major issue in digital magnetic recording is the need for good data interchange margins such that information recorded on one system can be reliably read on another. The software publishing business is unique in its requirement that the programs be distributed to a very wide number of user systems, often with a considerable delay between the time the information is written and the time it is first attempted to be read by the user. These factors place an exceptional emphasis on data interchange margins, and an object of this invention is to assure the tightest possible tolerances on recording amplitude and timing to provide the widest possible data interchange margins.

OBJECTS

It is accordingly a principal object of the present invention to provide a system for facilitating the duplication of software stored on flexible magnetic diskettes.

Another object of the invention is to provide a system to facilitate the high volume replication of flexible magnetic storage diskettes, irrespective of the format employed for organizing the information on the diskette and irrespective of the type of encoding scheme involved without the use of any special or master diskettes.

Another object of the invention is to provide a system for the volume replication of flexible diskettes with certain analog characteristics in a digital reproducing system to ensure the subtle degradations of quality do not occur over time.

A still further object of the invention is to provide a diskette duplicating system which contains a microprocessor as a system traffic manager and which permits a master module to control all system functions carried out by theoretically unlimited slave units tied to a single system master.

These and other objects and advantages of the invention will become apparent to those skilled in the art from the following description of a preferred embodiment when considered in conjunction with the accompanying drawings in which like numerals in the several views refer to corresponding parts.

BRIEF DESCRIPTION OF THE DRAWINGS

The invention is comprised of two major modules, the flexible diskette "kopy" module (FDKM) and the flexible diskette format module (FDFM).

DESCRIPTION OF THE PREFERRED EMBODIMENT

Figure 1A:
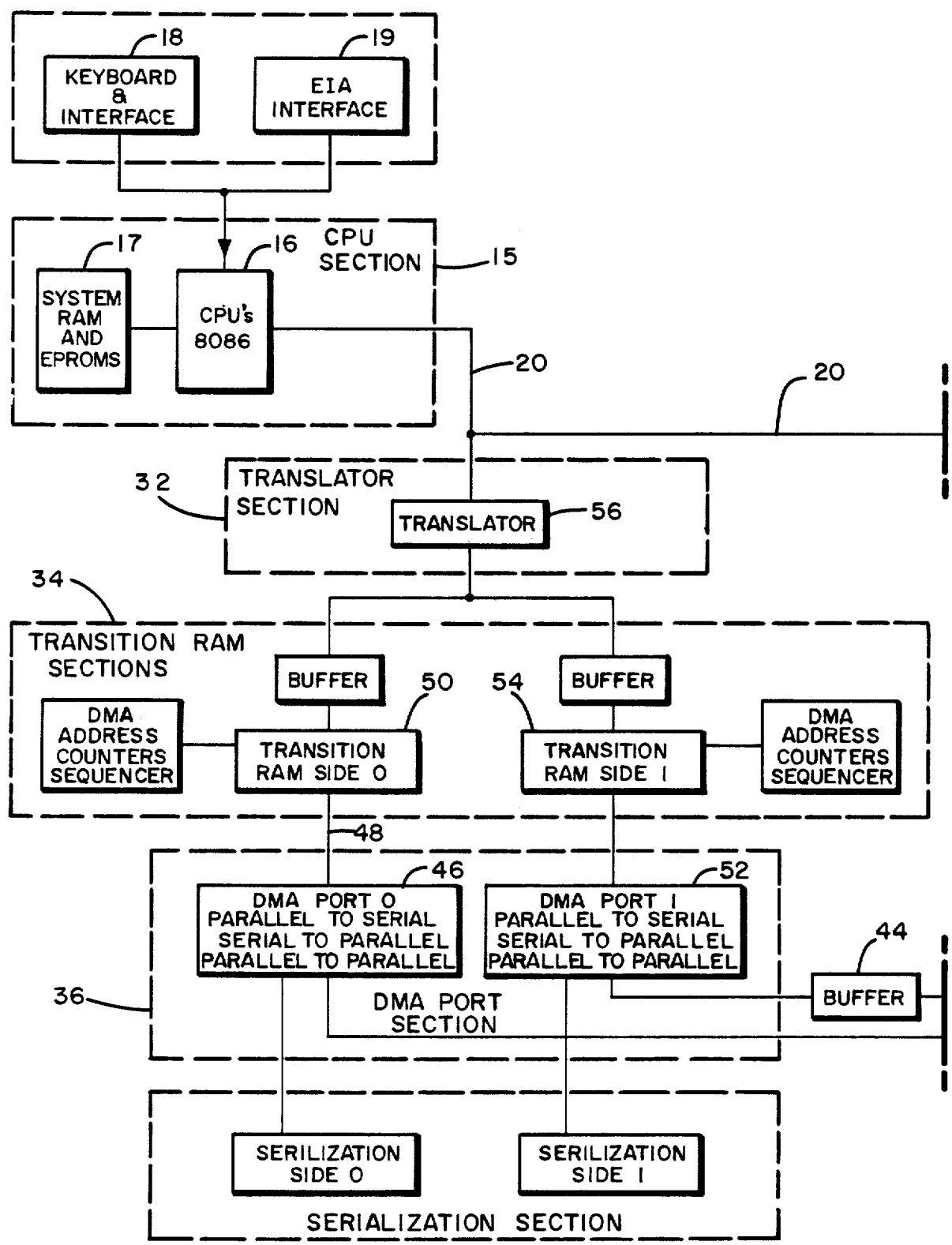
FIG. 1 is a general top level block diagram of the FDKM module.

In that the system of the present invention is a fairly complicated electronically controlled digital logic system, for ease of understanding, it will be broken down into various modules and sections and through the use of block diagrams, the organization and general function of each of the various modules and sections will be described, first using a higher level block diagram to provide an overall understanding of the system organization, followed by more detailed block diagrams depicting the various sections and logic subassemblies used in implementing the system. Following that, a description is given of the logic used in implementing certain of the subassemblies illustrated in the block diagrams where those subassemblies are not common, well-known elements available to the logic designer. In this fashion, it is believed that those skilled in the art will be provided with a full, concise and complete description of the invention in sufficient detail so as to permit them to make and use the invention.

Certain terminology will also be used in the following discussion and it is believed helpful to provide at the outset certain definitions for the terms employed:

FORMAT—A format is information written on a diskette to allow a computer to quickly locate specific sections of data. Typically, a diskette is divided into a series of concentric circles referred to as tracks and then further divided into wedge-shaped radial segments called sectors. Further, data may be recorded on one side only of the diskette or on both sides. Thus, by specifying a track number, a sector number and a side designation, the data located on the diskette can be accessed. The format may also specify the encoding type, the error detect scheme, etc.

CODING—Coding refers to the manner in which information is recorded on the magnetic surface of a diskette. Common coding schemes include FM, MFM, $M^2FM$, GCR and associated with each is a unique way in which clock bits are combined with the data bits to identify the borders of the cell spaces in which flux transitions are to be interpreted for their binary value.

CERTIFY—Certify refers to the act of testing the quality of the recording media for missing or extra bits prior to duplication and formatting.

KNOWN FORMAT DUPLICATION—Known format duplication refers to the act of replicating diskettes when the recording format employed on the original to be copied is known. This mode of duplication permits later verification of the accuracy of the replication.

PSEUDO-BLIND DUPLICATION—When the format is unknown, pseudo-blind duplicating records the transitions from the original without regard to the coding employed. This method of duplication allows replication with a minimal amount of information about the format on the diskette. It results in a user making an exact duplicate of the original diskette.

Other terms unique to the apparatus of the present invention will be developed hereinbelow and will be defined as they occur.

GENERAL BLOCK DIAGRAM FDKM

Figure 1B:
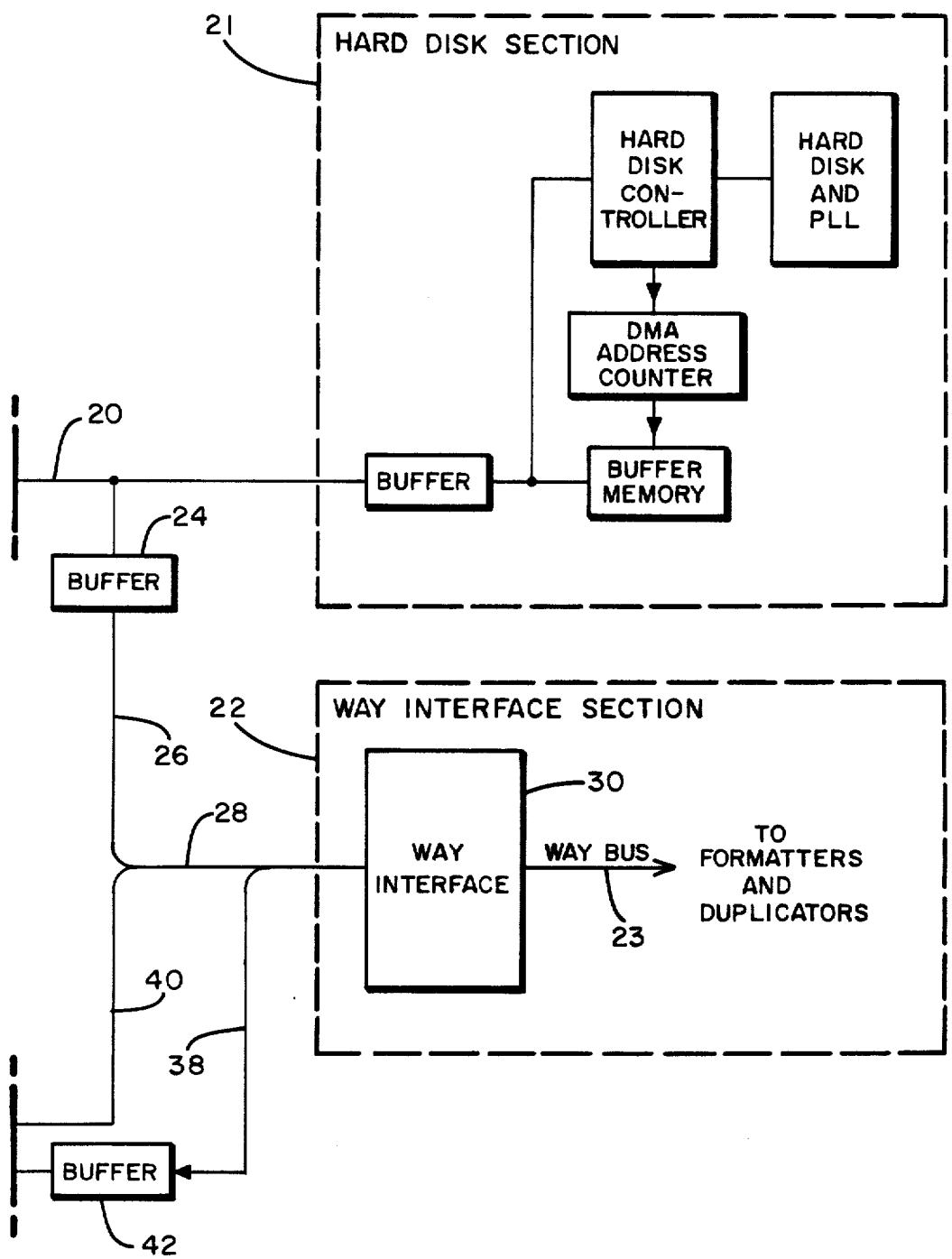

Referring to FIGS. 1(a) and 1(b), there is shown a general block diagram of the flexible diskette copy module which includes a CPU section which is shown as being enclosed by dash line box 15 and preferably may comprise an Intel 8086 microprocessor 16 and an associated random access memory (RAM) along with eraseable programmable read-only memories (EPROM) both represented by block 17. Typically, the EPROM memories contain the program for each of the operating modes which the system of the present invention can assume, i.e., copy, pseudo-blind copy, blind copy, duplication, initialize and test. Operator communication with the CPU is accomplished via an operator's keyboard and interface 18 or from a remote terminal (not shown) via the EIA interface 19.

The line 20 emanating from the CPU 16 represents a multiconductor digital data bus which allows bidirectional communication between the CPU 16 and a large capacity storage device which can be either a cartridge-type hard disk or so-called Winchester disk drive system, here shown as being enclosed by the broken line box 21. The cartridge-type hard disk system or Winchester disk system used in the present invention may be of conventional design which can communicate with the CPU 16 in a manner typical of known microcomputer systems. The removable hard disk cartridge enables data to be duplicated to be prepared on another system and brought to the apparatus of the present invention in cartridge form.

Leaving the description of the hard disk section 21 momentarily, the CPU bus 20 also leads to the Way interface section 22 which is configured to communicate, via the Way bus 23, with a plurality of slave units which, for convenience, are referred by the acronym FDFM. The slave units themselves are represented in the block diagram of FIG. 7 and will be discussed later on in greater detail. The FDFM slave units are each capable of simultaneously copying a diskette under control of the FDKM system of FIGS. 1(a) and 1(b). Unlike known diskette controllers, the FDFM slave units have no specific control logic hard-wired into them, but rather, they are commanded by the FDKM to emulate any of a plurality of desired diskette control modes. The commands to specify this emulation are part of the initialization procedure to be described hereinbelow.

In the initialization and test modes, the CPU 16 communicates with the FDFM modules via the bus 20, the buffer 24, the lines in the cables 26 and 28, and the Way interface 30 in a relatively conventional manner. This communication path is, however, much too slow to accommodate the high data rate (up to 2 MHz) associated with copying and duplication in the flux transition mode of data representation.

In accordance with one aspect of the invention, a special-purpose, high-speed logic arrangement including the translator section 32, the transition RAM sections 34 and the DMA port section 36 is designed to accommodate this high data rate. Because of the manner that the Way bus and interface are designed, the designation of the bus lines when the system is functioning in the copy and duplication modes, as well as the manner in which the bus functions, is completely altered, such that a single bus actually does the work of what would otherwise require two.

In the copy mode, a diskette to be copied is inserted into one of the slave FDFM modules and both sides of the diskette may be simultaneously read. The resulting flux transition data obtained during the reading operation is captured and transmitted over the Way bus 23 and is received into the FDKM, via cables 38 and 40, and the buffers 42 and 44. This communication is serial in form. The DMA port 0 converter 46 in the DMA port section 36 is employed to convert the serial data stream into a parallel word. The parallel word is stored, via lines 48, in the transition RAM 50 which is included in the transition RAM section 34 and associated with side 0 of the diskette. Similarly, the data from side 1 of the diskette being copied is fed via the buffer 44 and the DMA port 1 converter 52 to the transition RAM 54 on-the-fly into address locations defined by an adaptively set T-clock so as to keep pace with the highest rate that transitions can possibly occur with a given media bandwidth.

Each of the transition RAM 50 and 54 has the capacity to hold one track of information from a respective side of the diskette in a flux transition format without concern as to whether the transition falls into a time window. A translator 56 converts the data in the transition RAM from this flux transition format to a binary format which is then understandable to the CPU 16. This translation is performed "on-the-fly" as the data is moved from the transition RAMs 50 and 54 to the CPU system RAM 17. Once the data has been assemblied in the system RAM 17, it can be transferred to the cartridge hard disk system 21 for archival purposes.

The duplication process is virtually the reverse of the copy process. In the case of duplication, the data to be duplicated is not already stored in the system RAM 17, but is loaded to that point from the cartridge hard disk system 21. On a one track at a time basis, data is read from the system RAM 17 and routed through the translator 56 and is loaded into the transition RAMs 50 and 54. The DMA ports 46 and 52 convert the transition data from the parallel format in the RAM to a serial format, to be transmitted, via buffers 42 and 44, over the Way bus 23 to the FDFM modules. It is important to realize that in the duplication process, the FDKM broadcasts simultaneously the duplication information to a plurality of FDFMs which may be configured into the system. The necessary translation is done on-the-fly, enabling the transition RAMs 50 and 54 to be loaded with the information for the next track while the FDFMs are performing the track access. A track verify operation is accomplished by retransmitting the information from each track so that it can be compared with the data read back from the previously written track.

Those skilled in the art will comprehend the productivity aspects of the system of the present invention by recognizing that in three revolutions of a diskette spindle, an entire track on each side of the diskette can be read and verified simultaneously on a plurality of slave modules.

Figure 2A:
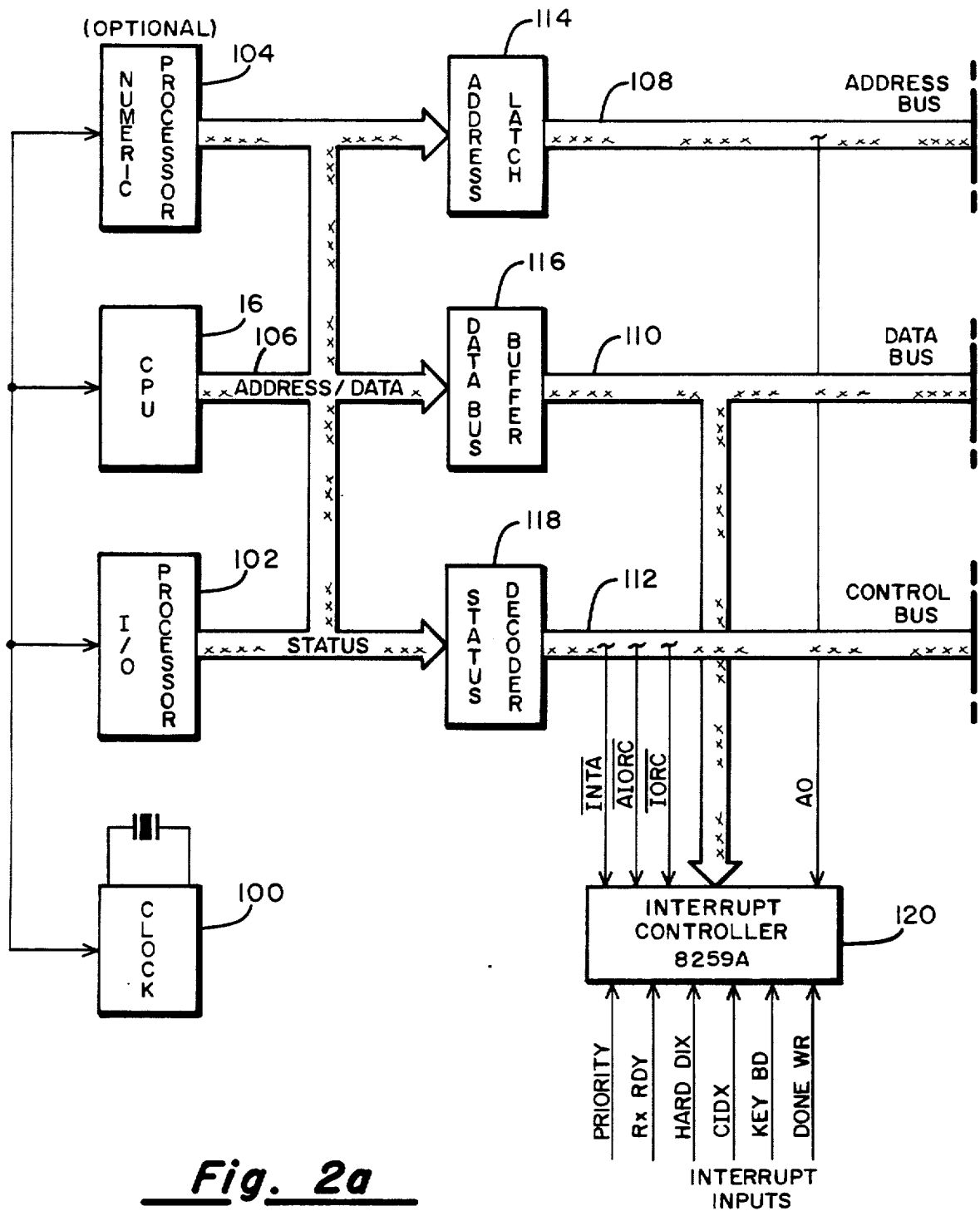
FIGS. 2-6 are block diagrams showing various sections of the FDKM in greater detail.
Figure 2B:
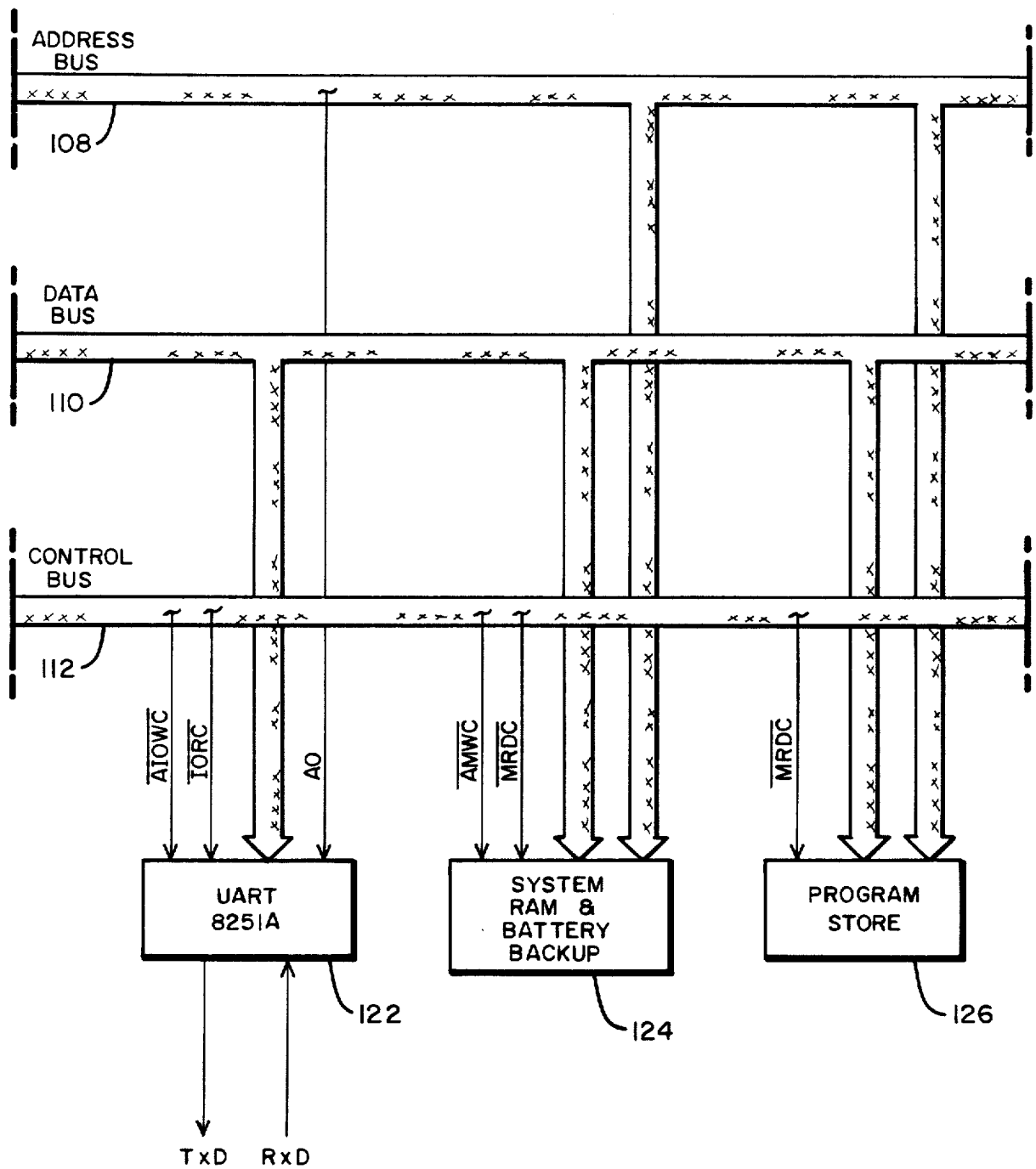
Figure 2C:
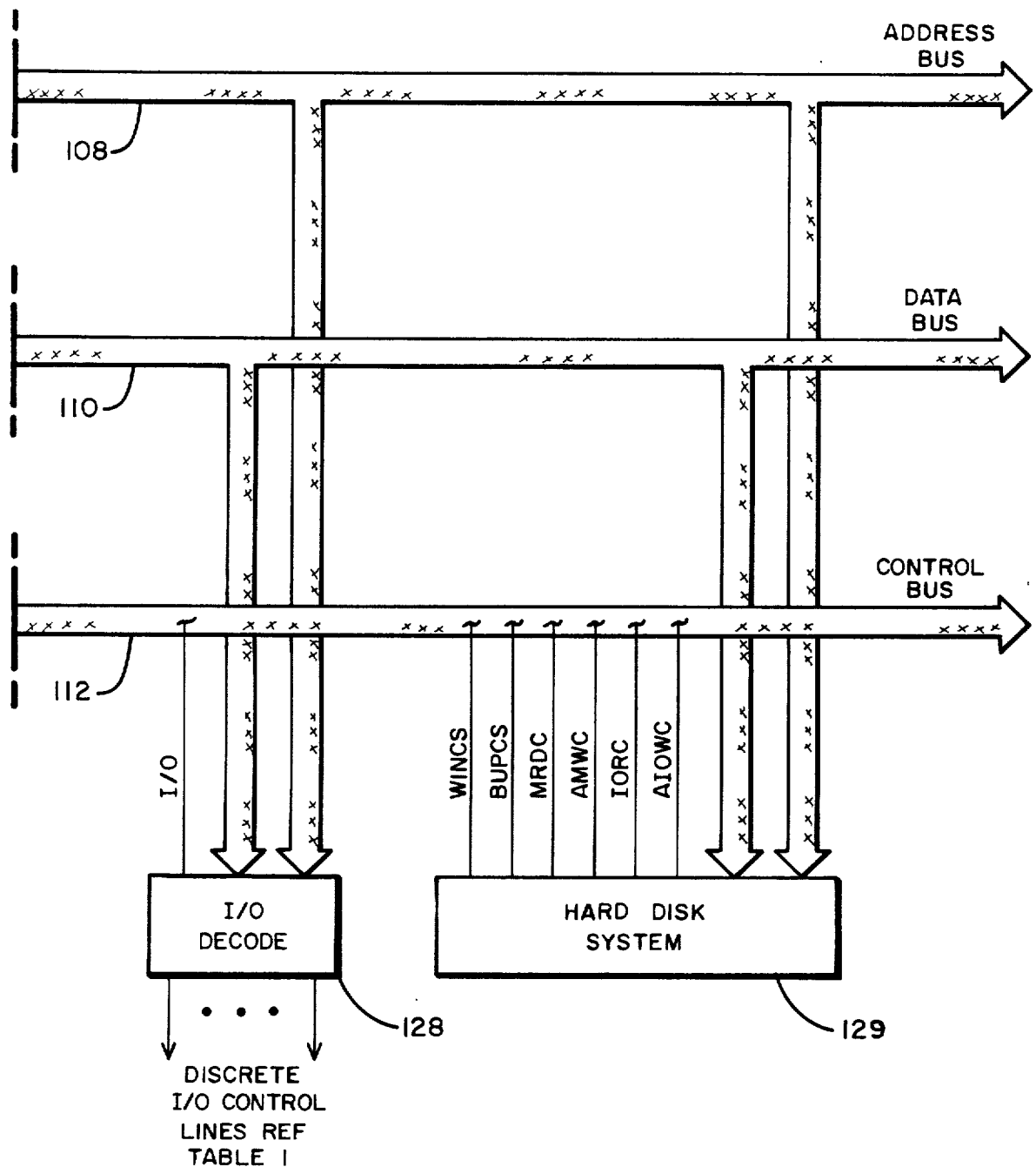

With the general organization of the FDKM now in mind through the description of the general block diagram of FIGS. 1(a) and 1(b), attention is next directed to the block diagram of FIGS. 2(a), 2(b) and 2(c), which show the configuration of the CPU section 15 of FIG. 1, but in greater detail. In the preferred embodiment, the CPU 16 is Type 8086 16-bit microprocessor which is a member of the Intel family of microprocessors and, as such, it can be readily connected to a Type 8284 crystal controlled clock circuit 100 and to an optional I/O processor 102 and an optional numeric processor 104. The processors 102 and 104 may respectively be Intel-type 8089 and 8087 devices.

Address information and data is time multiplexed on the bus 106 to provide communication between the CPU 16 and other portions of the FDKM yet to be described. The address bus 108, the data bus 110 and the control bus 112 are interfaced to the CPU by means of the address latch network 114, the data bus buffer network 116 and the status decoder 118, respectively. The bus sytem communicates to all of the I/O devices in the sytem. The interrupt controller 120 senses when any of its several inputs go active. It signals the CPU that an interrupt has occurred and the CPU can then respond by interrogating to determine the identity of the interrupting device via the data bus 110.

The Universal Asyncronous Receiver Transmitter (UART) 122 provides a standard RS 232-type serial interface which can be connected to a variety of peripheral devices, all in a known manner.

The system RAM 17 of FIG. 1 is identified by numeral 124 in FIG. 2(b) and may be a 32K word×8-bit CMOS static random access memory (RAM). By providing a battery backup for the RAM, it is able to maintain its information during power-off intervals, rendering the static RAM non-volatile. In a minimum configuration, this non-volatile system RAM 124 can provide sufficient storage so that a hard disk may not be essential.

The program store 126 is a non-volatile, eraseable programmable read-only memory (EPROM) in which the system program is permanently stored. It can be configured either as a 64K byte memory or a 128K byte memory, depending upon the particular chip selection.

An I/O decode circuit 128 using a memory mapped I/O scheme is employed to generate the discrete I/O control signals listed in Table I.

TABLE 1

| | |
|---|---|
| WINCS | Winchest chip select accesses internal registers of the hard disk controller. |
| BUFCS | Buffer chip select accesses the hard disk buffer memory. |
| MRDC | Memory read cycle used to read from buffer memory. |
| AMWC | Advanced memory write cycle used to write to buffer memory. |
| IORC | Input/output (I/O) read cycle used to read hard disk controllers internal registers. |
| AIOWC | Advanced I/O write cycle used to write to hard disk |

TABLE 1-continued
controller's internal registers

Six I/O control lines, along with the address and data bus, provide a conventional interface to the hard disk system 129.

TRANSITION RAM

Figure 3A:
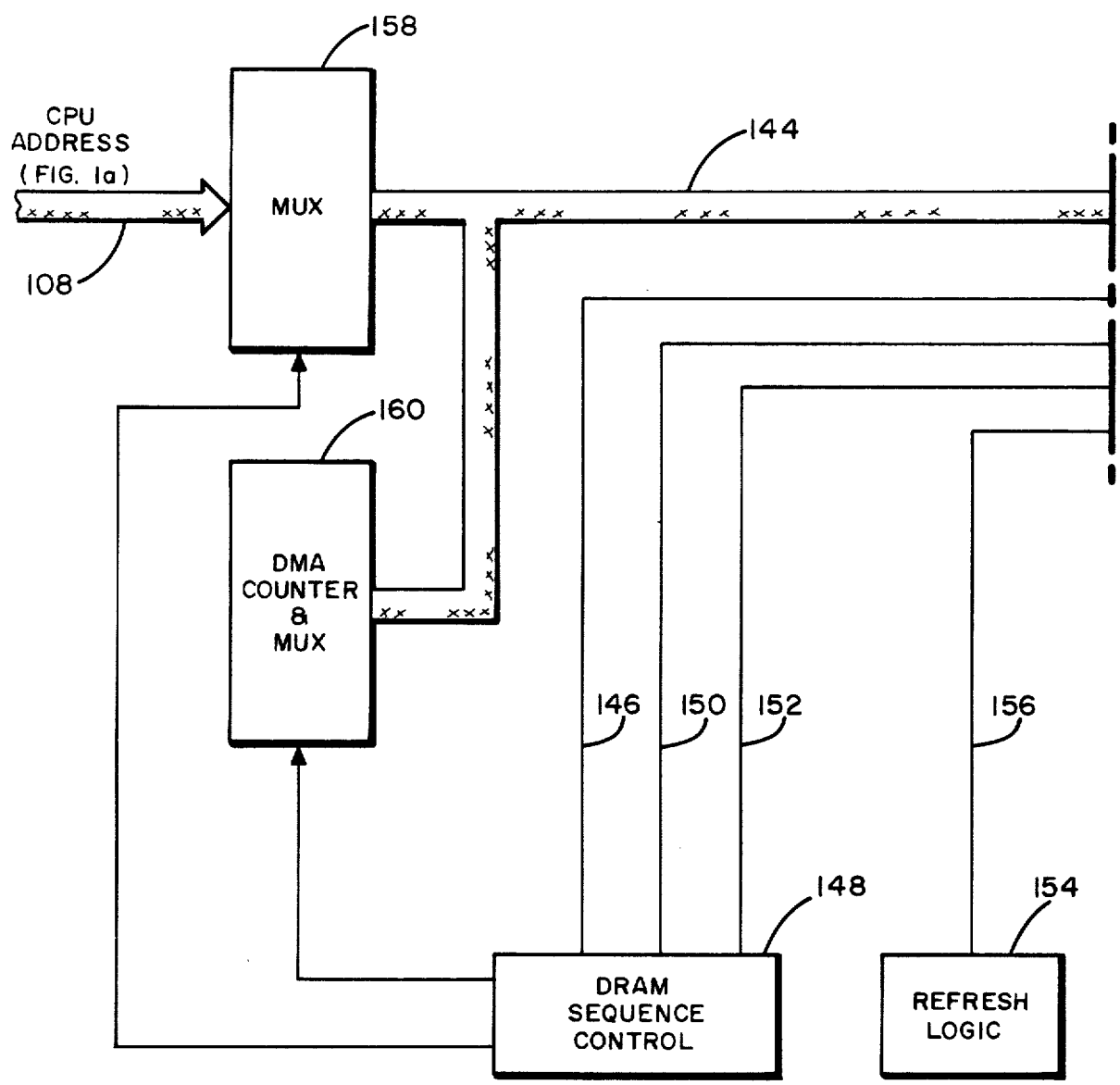
Figure 3B:
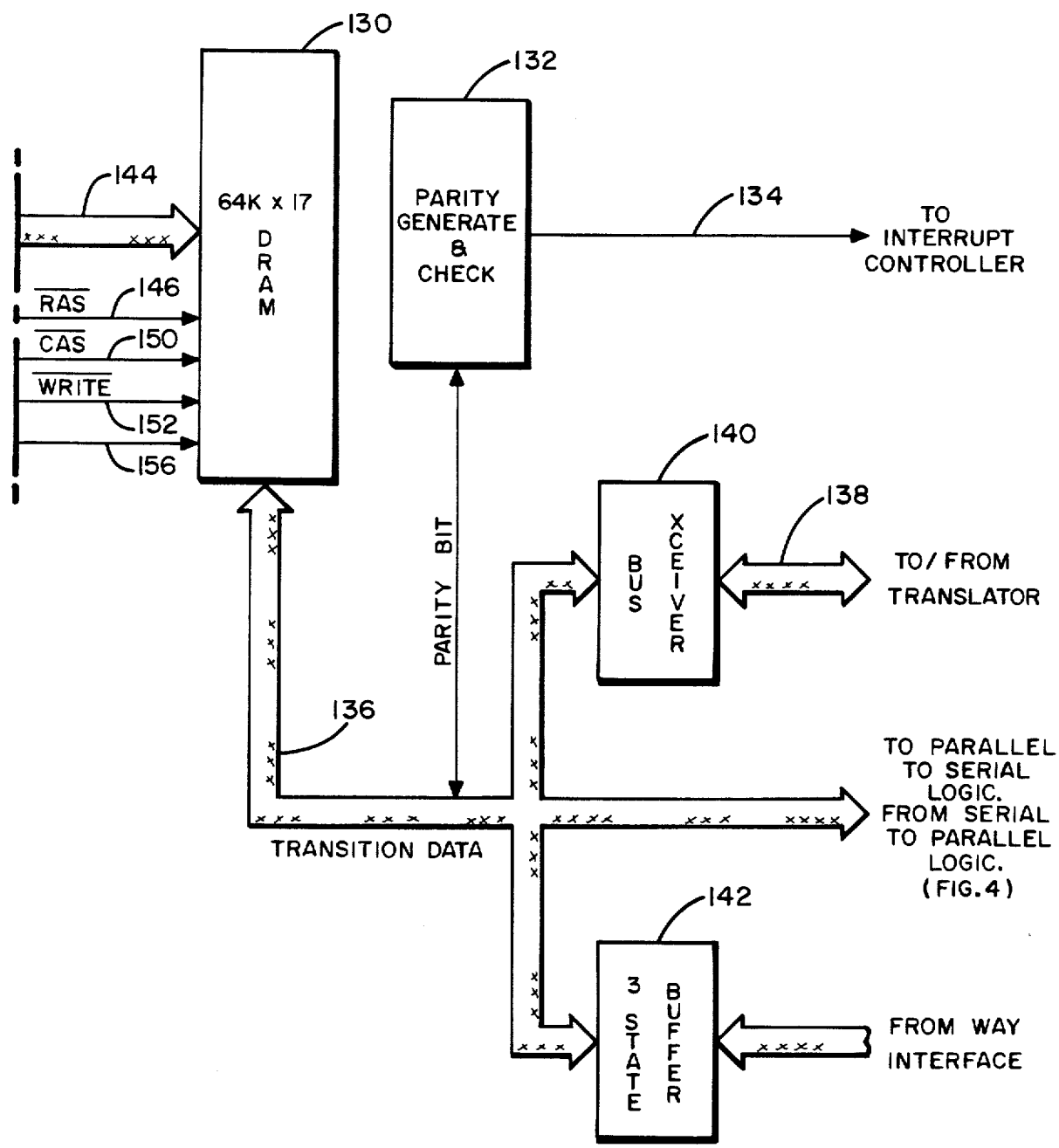

Now that the overall layout of the CPU section has been described with the aid of the block diagram of FIG. 2, next to be considered is the make-up of the transition RAM sections 34 of FIG. 1(a) and, in that regard, reference will be made to the further block diagram comprising FIGS. 3(a) and 3(b). While this block diagram shows the circuitry required for working only with one side of a diskette, it is to be understood that this circuitry is effectively replicated in the hardware to accommodate dealing with both sides of a diskette on a concurrent basis. The transition store 130 is preferably a 64K word × 17-bit dynamic random access memory (DRAM) in which 16 bits of each word are data, with the 17th bit being a parity bit. Each word that is written into memory has odd parity generated by the parity generator and check circuit 132 which is written as a 17th bit. Each time the memory is read, the parity is computed on the 16 bits of data and compared to the 17th parity bit. In the event that they do not match, indicating an error in the word, an interrupt is sent via line 134 to the interrupt controller 120 in FIG. 2(a).

Read or write data for the transition RAM is contained on the bidirectional transition data bus 136, which communicates with the parallel-to-serial and serial-to-parallel ports 46 and 52 (FIG. 1(a)) and which will be described with greater particularly hereinbelow when FIG. 4 is dealt with. Transition RAM data may also be exchanged with the translator 56 via bus 138 and the bus transceiver 140. A third source of data is directed from the Way interface via the 3-state buffer 142. In the so-called "blind copy II" mode, each 12-bit word transmitted across the Way interface is loaded into the lower 12 bits of the 16-bit transition RAM 130. The 16-bit address field of the DRAM 130 is time multiplexed into eight address pins connected to the bus 144. At the first phase of a memory cycle, the upper eight bits of address are put on the bus 144 and the row address select line 146 is activated by the DRAM sequence control 148. During the next phase, the lower eight bits of address are put on the bus 144 and the column address select line 150 is activated. If line 152 is high, this two-step selection will cause the data from the addressed memory cell of the DRAM 130 to appear on the transition data bus 136. If line 152 is low, however, the data on bus 136 will be written into the addressed word of the DRAM 130.

As those skilled in the art will recognize, dynamic RAM memories must be periodically refreshed if they are to retain their information when not being actively accessed. The refresh logic 154 activates line 156 to cause a refresh cycle on a non-interferring basis with other RAM memory cycles. Refresh is accomplished by cycling all row address combinations and performing the row address selection, but not the column address selection.

When the transition RAM 130 is interchanging data with the CPU, the address source is the address bus 108 (FIG. 2(a)). The sequence control circuit 148 selects multiplexer 158 such that the upper and lower fields of the CPU address are placed on bus 144 at row address strobe (RAS) and column address strobe (CAS) times. This mode of operation may be referred to as the "CPU mode".

An alternate mode of operation is the direct memory access (DMA) mode which is used for all non-CPU interchange with the transition RAM 130. In this latter mode, multiplexer 158 is disabled and the address source is the DMA counter & mux 160, the DMA counter being 16-bits in length. As before, the sequence control 148 multiplexes the DMA address from the source 160 to put the upper and lower 8-bit fields on the bus 144 at the correct time. In the DMA mode, memory access is sequential and automatic without need for processor intervention.

PARALLEL-TO-SERIAL AND SERIAL-TO-PARALLEL PORT

Figure 4A:
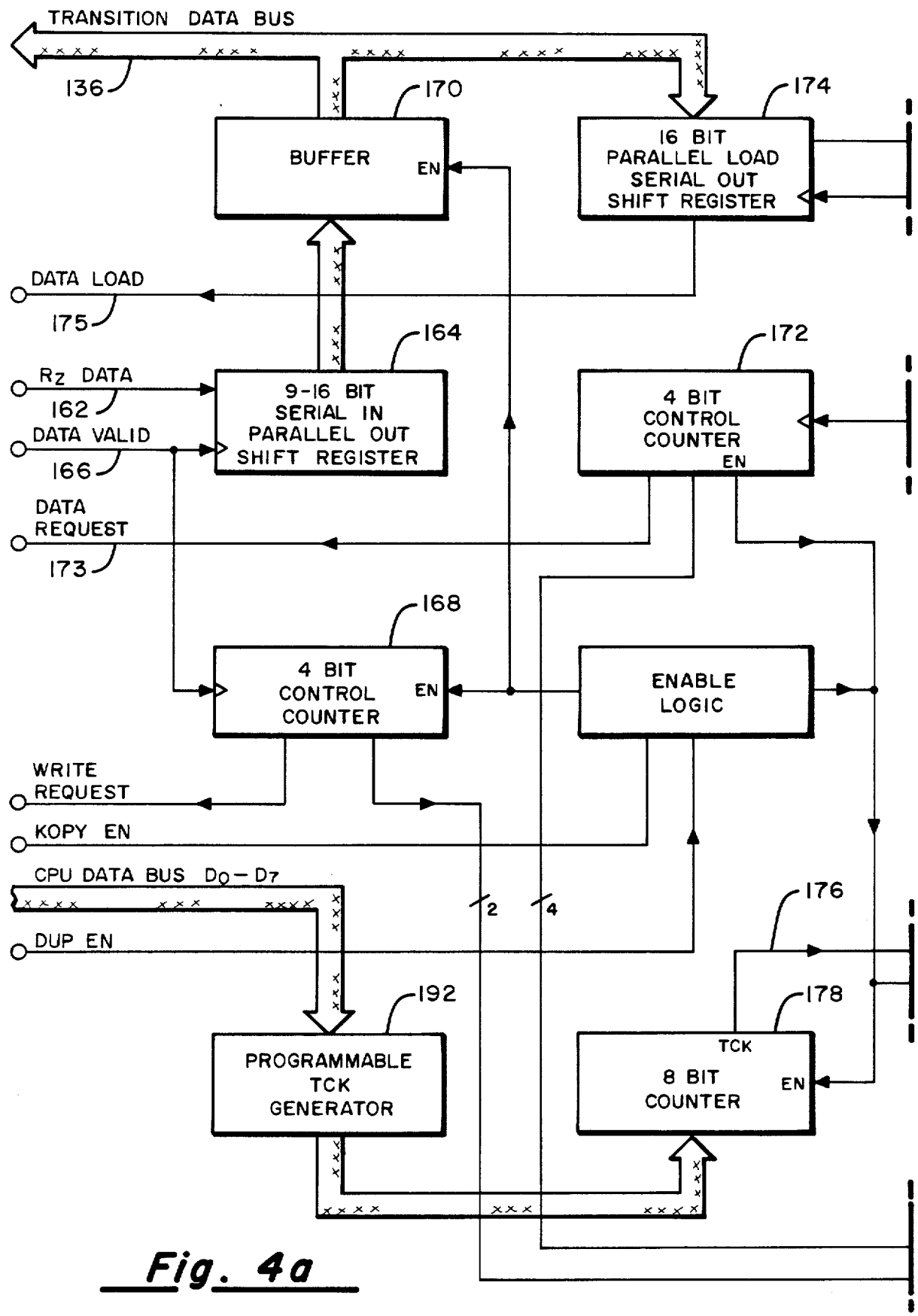
Figure 4B:
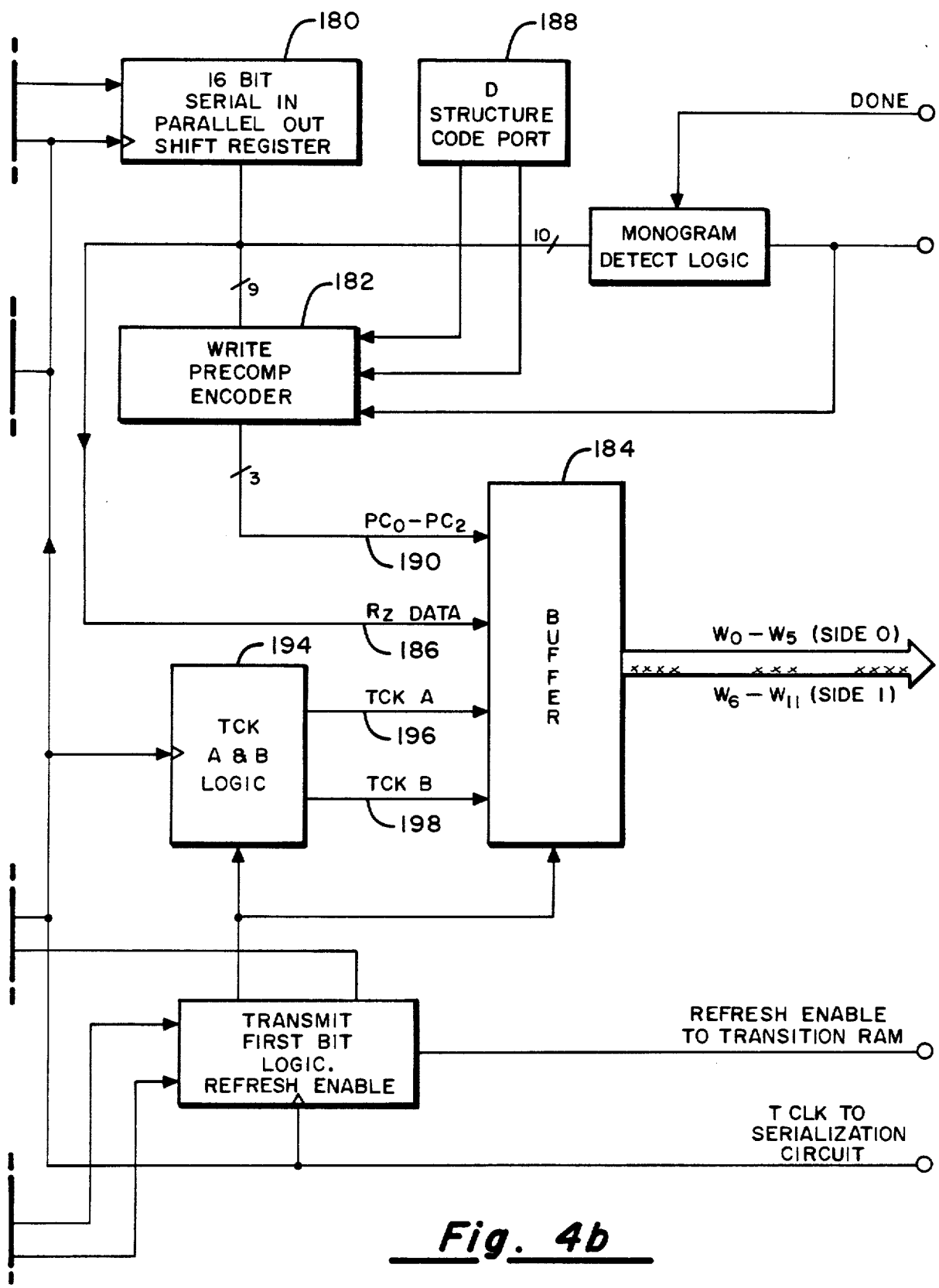

FIG. 4 is a more detailed block diagram of the logic circuitry used in implementing the DMA port section 36 of FIG. 1(a). Specifically, the circuitry of FIGS. 4(a) and 4(b) do the parallel-to-serial and serial-to-parallel conversions in communicating between the transition RAM (FIGS. 3(a) and 3(b)) and the Way interface. In the Copy mode, where data is being loaded from the slave into the transition RAM 130, the process is to assemble the serial data in words of 9 to 16 bits in length. Serial return-to-zero (RZ) data from the Way interface is presented on line 162 and it is clocked into the shift register 164 by the "Data Valid" signal applied to line 166, which also serves to increment a 4-bit control counter 168 for each bit shift. The counter 168 controls the number of bits per word. When it reaches a terminal count, it generates a Write Request and causes the holding register or buffer 170 to be enabled, thus putting the data from the shift register 164 on the transition data bus 136 to be written into the transition RAM 130.

In the Duplication mode, data flows from the transition RAM 130 to the Way interface. Whereas the input process forms serial data into variable length words, this process unpacks variable length words into a continuous data stream. The number of bits per word in this case is determined by the 4-bit control counter 172, which sends a data request, via line 173, to the transition RAM 130 when a new word is required. The transition RAM, in turn, reads the data, then it puts the data on bus 136 and it is loaded, via the Data Load signal on line 175, into a 16-bit parallel-load, serial-out shift register 174. The T-clock (TCK) signal line 176 coming from the 8-bit counter 178 causes data to be shifted out of the shift register 174 and into a shift register 180 (FIG. 4(b)). Nine consecutive output stages of this shift register are presented as inputs to the Write Precompensation Encoder 182 while the center three of these nine bits are sent on to the buffer 184 as the RZ Data signal via line 186.

In magnetic recording, it is well understood that the fringing field from flux transitions associated with adjacent bits affect the apparent position of the sensed flux transitions. If flux transitions are written at their normal time, then during a Read operation, the peaks will shift in time due to adjacent bit patterns. This could result in unreliable operation. The solution to this problem which the present invention employs is to provide compensation in the time of writing each individual bit on the basis of the data pattern of its adjoining neighbors. The present invention allows for four different types of data structures, each with a different write precompensation logic. The data structure is loaded from the CPU into the D-structure code port 188. This data, along with the information concerning the logic state of the adjacent neighbors, allows a 3-bit write precompensation code to be enabled on lines 190 for each bit of RZ data. The RZ data and write precompensation code then provide the information to write one flux transition at the slave. It will be understood in the discussion of the slave module (FDFM) that the rate in which RZ data is presented over the Way interface must approximately equal the rate at which it is being written onto the diskette.

Since various formats and data rates are involved, a programmable clock frequency for the TCK is required. This is accomplished by loading a digital value from the CPU 16 (FIG. 2(a)) over the bus 110 into the programmable TCK generator 192 (FIG. 4(a)). This digital value controls a presettable 8-bit counter 178 such that the frequency of the TCK signal on line 176 is inversely related to the digital count. The TCK A & B logic 194 generates additional timing signals from the leading edge of the TCK signal to produce the TCK A and TCK B on the lines 196 and 198, respectively, which are transmitted along with the data and the write precompensation bits on line 190, by way of the buffer 184, to the Way interface.

TRANSLATOR

Figure 5:
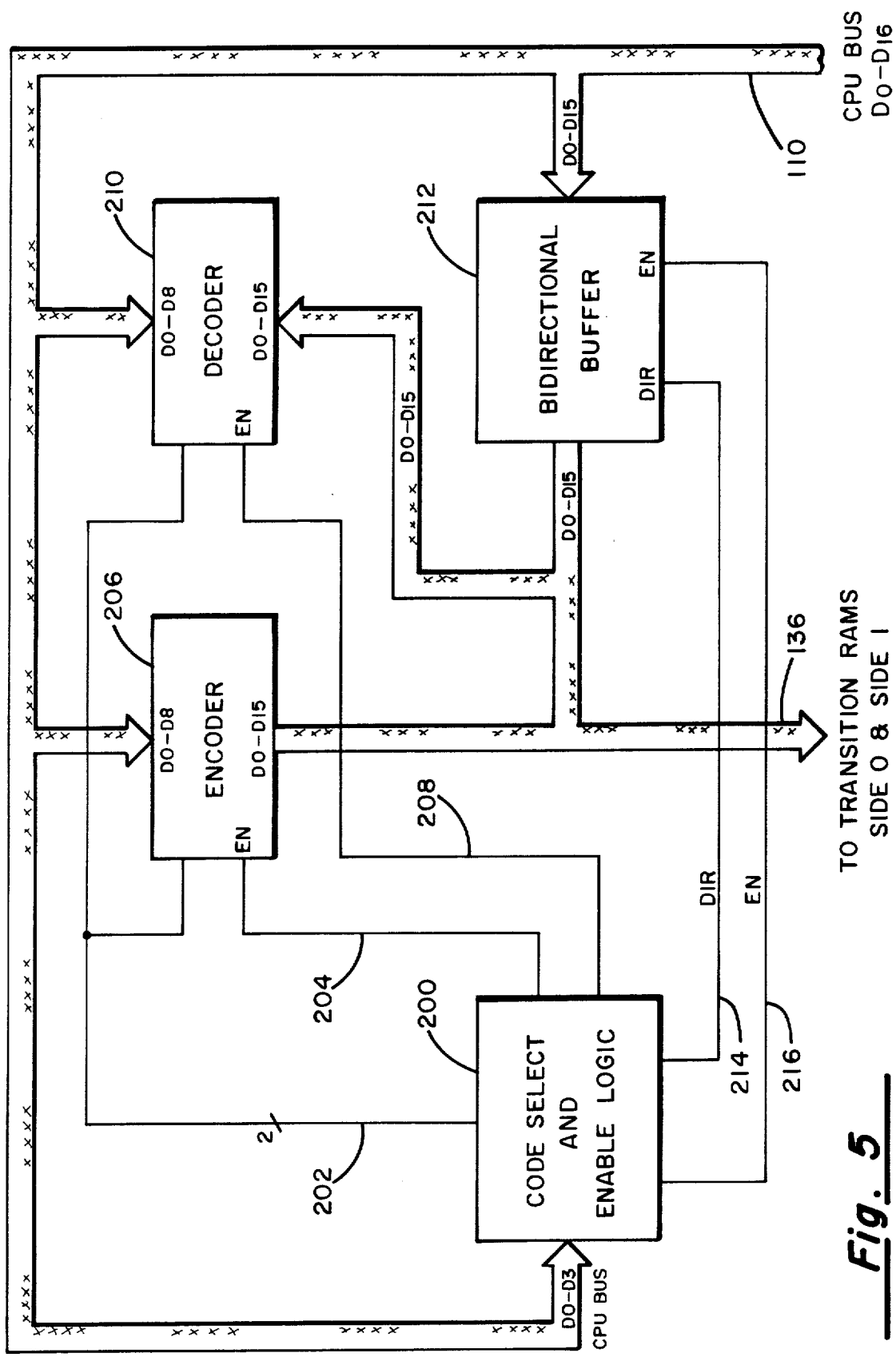

FIG. 5 illustrates a more detailed block diagram of the translator 56 of FIG. 1(a). The translator is interposed between the CPU data bus 110 and the transition RAM data bus 136. The CPU selects the translation code and the direction of data flow by loading a digital value over the bus 110 into the Code Select and Enable Logic 200. When data is to be written into the transition RAM from the CPU, lines 202 are conditioned to select the desired code, and the line 204 enables the outputs of the encoder 206, such that data passes from the CPU bus 110 on to the transition RAM data bus 136 (FIG. 4(a)). In the encoding process, binary data is encoded to a flux transition representation. Similarly, line 208 enables decoder 210 such that the flux transition data on bus 136 is decoded and appears on the CPU bus 110 as binary data. Bidirectional buffer 212 is used to interchange data between the CPU and the transition RAM without translation. Line 214 selects the direction of data flow, while line 216 enables the output.

WAY INTERFACE

Figure 6A:
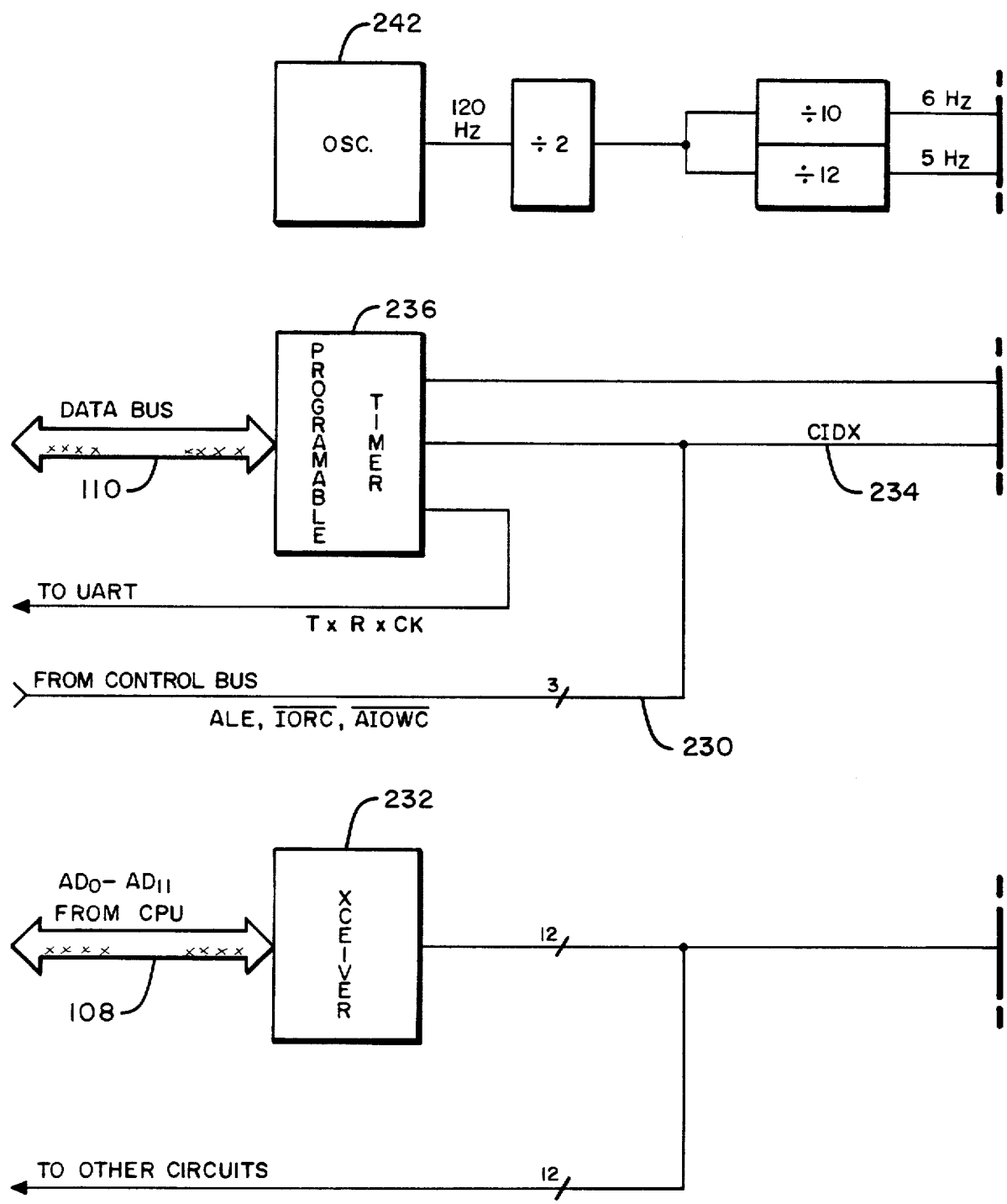
Figure 6B:
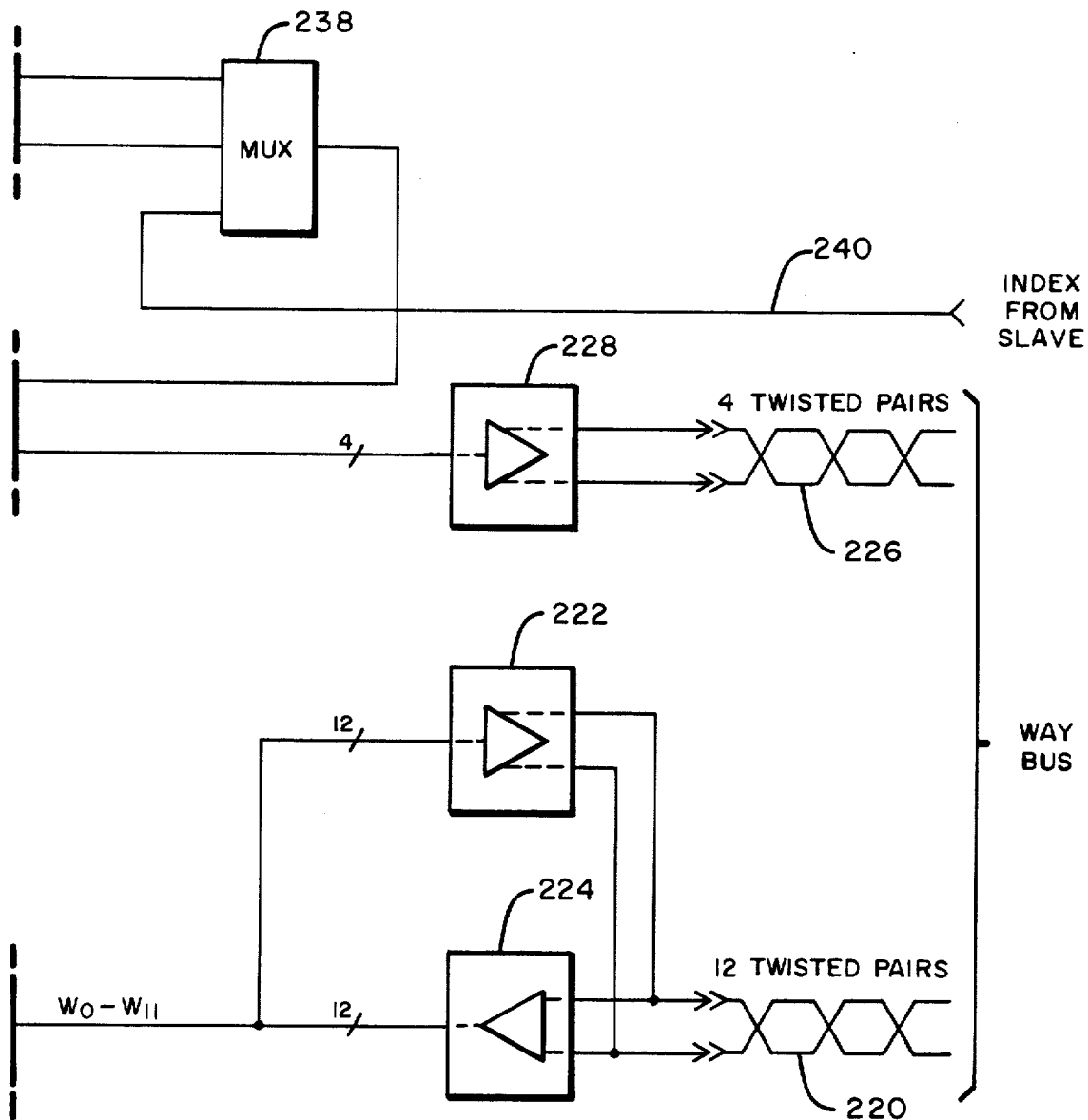

FIG. 6 illustrates a more detailed block diagram of the Way interface. All data is transmitted over 12 twisted pair lines 220 which can be daisy-chained to a plurality of FDFM slave modules. The line are driven in a balanced differential mode by transmitters 222 and the received data is sensed differentially by differential amplifiers 224. The direction of data flow and the mode of data transmission, i.e., CPU mode or DMA mode, is determined by the FDKM and is communicated to the slaves via four twisted pair control lines 226 driven by appropriate transmitters 228.

Control signals from the control bus of FIG. 2 are applied to the lines 230 and define the CPU mode. The Address Latch Enable (ALE) signal indicates to the slave that the data on the Way is a valid address. The I/O Read Control signal ($\overline{IORC}$) causes slaves responding to the address to put data on the Way. The $\overline{AIOWC}$ control signal applied to the lines 230 indicates to the slave that valid write data is present on the Way. This control system thus allows the CPU to read from and to write to addressable logic boards in any of the slaves.

In the CPU mode, transceiver 232 is enabled to connect the 12 Way data lines, W0–W11, to the lower 12 address/data bits of the CPU on the bus 108.

In the DMA mode, slaves are controlled by the so-called "Contrived Index" signal ($\overline{CIDX}$) generated on line 234 by the programmable timer 236. The contrived index is generated by the programmable timer 236, which can be programmed for various increments of time delay from the CPU via the data bus 110. The time reference is from the multiplexer 238, which provides three possible reference sources: (1) an index on line 240 from one of the slaves; (2) a 6 Hz reference drive from a time-base generator, such as oscillator 242; or (3) a 5 Hz reference drive from the oscillator 242.

In the DMA mode, the six lower Way data interface lines communicate with the serial-to-parallel and parallel-to-serial ports for side 0 while the upper six Way data lines communicate with corresponding ports for side 1 of the diskette.

THE FLEXIBLE DISKETTE FORMAT MODULE

Figure 7A:
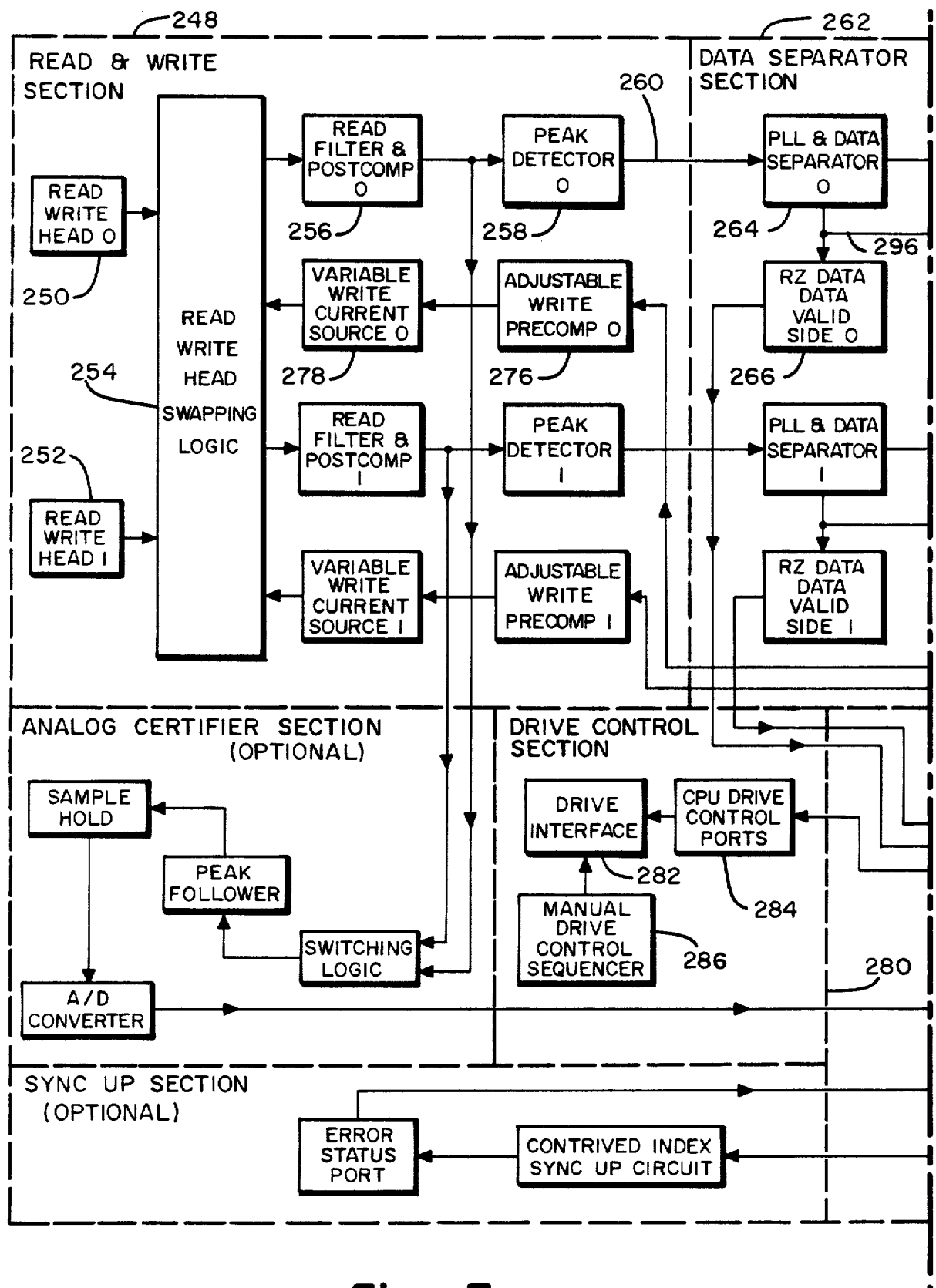
FIG. 7 shows a top level general block diagram of the FDFM module.
Figure 7B:
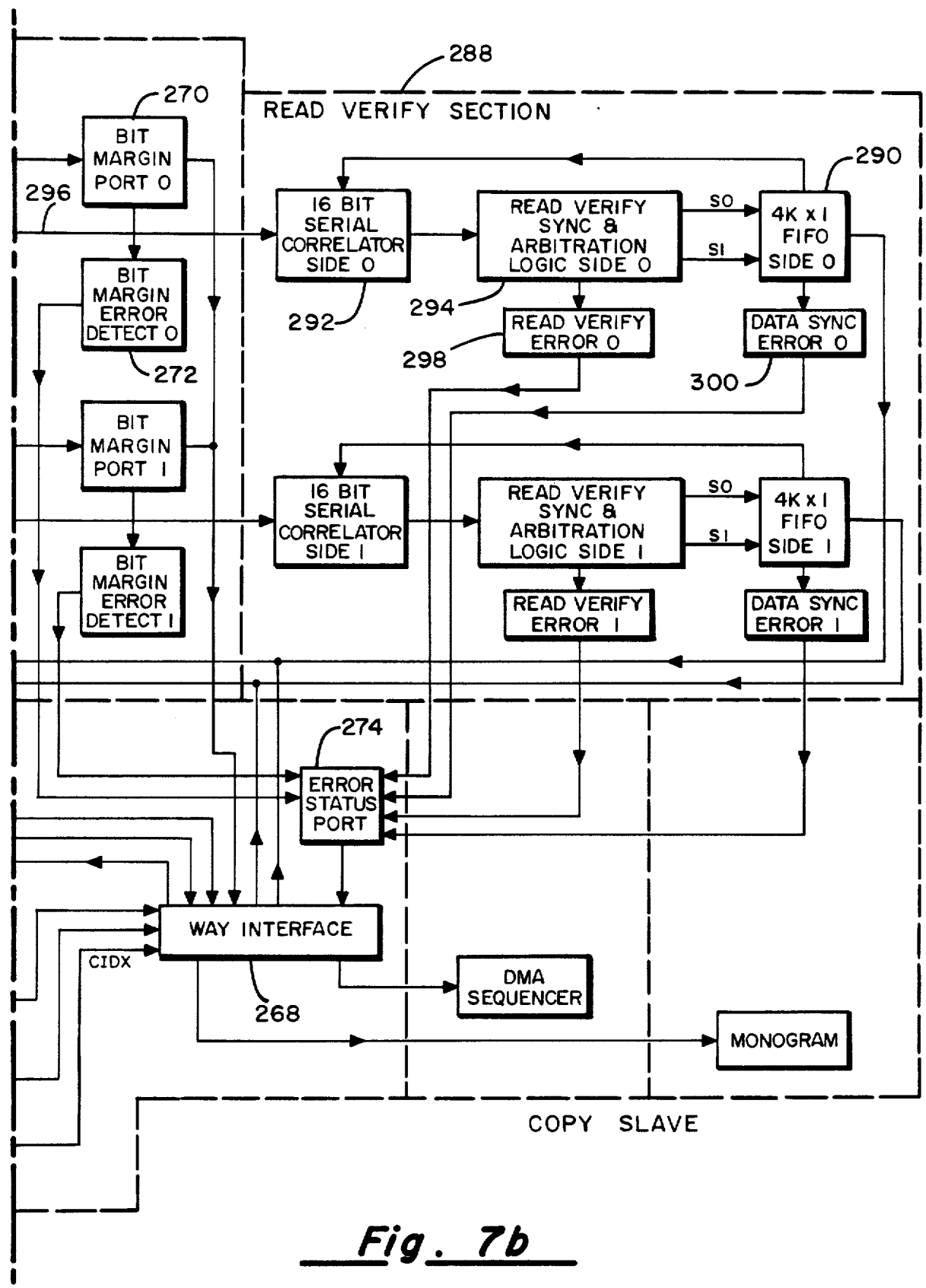

Having generally described, with the aid of the block diagram of FIGS. 1–6, the logic organization of the Flexible Diskette Kopy Module (FDKM), using a similar approach, consideration will next be give to the logical organization of the Flexible Diskette Format Module (FDFM). FIGS. 7(a) and 7(b) together illustrate a high level block diagram of the FDFM. The principal function of the FDFM is to write the diskette to be duplicated with information provide by the FDKM. This is the so-called Duplication mode wherein a large plurality of FDFMs (up to 30) can duplicate both sides of a diskette simultaneously under the control of the FDKM. An alternate mode of operation is referred to as the "Copy" mode in which one FDFM can be a source of data to be read and transferred to the FDKM for subsequent duplication.

With that general explanation in mind and with reference to FIG. 7, a single coil is used to both read and write data on the magnetic surface of the diskette. The read/write head identified by numeral 250 is normally associated with side 0 of the diskette while the read/write head 252 is normally associated with side 1 of the diskette. The circuitry represented by block 254 provides the ability to "swap" the electronics for the heads, which becomes useful for diagnostic fault isolation purposes. Through the use of the circuitry 254, the read/write circuit normally associated with the head for side 0 can be used to read or write from side 1 of the disk, and the read/write circuitry normall associated with head 252 for side 1 of the diskette may be used with the head for side 0 of the diskette. Thus, if upon switching heads a problem previously occurring in association with side 0 now occurs on side 1, it is known that the head itself is bad. However, if the problem continued to occur on the same side of the disk following the head-swap operation, then it would be known that a problem exists in the read/write electronics rather than the head.

Forming a further part of the Read & Write Section 248 of the FDFM is a read filter & post-compensation circuit for side 0 and it is identified by the block labeled 256. Its function is to perform analog processing to reduce spurious noise and to electrically compensate for the effect of magnetic interactions with adjacent bits. The output from the read & postcomp circuit 256 is applied to a peak detector circuit 258 which contains a differentiator to first differentiate the analog signal and a peak detector for locating the time of minimum slope of the differentiated wave form, which provides a reliable indication of the flux transition time on line 260. The output which appears on line 260 is applied to the Data Separator Section, which is shown enclosed by the broken line box 262, and is applied to the block 264 which depicts a digital form of a phase-lock loop and data separator used for recovering both the clock and the data from the flux transition signals. The presence or absence of a flux transition in the clock window is sensed by the RZ data valid circuitry 266, which formats the data into a return-to-zero format and passes that data back to the FDKM via the Way interface 268. The bit margin port 0 block 270 functions to sense the deviation from the optimal center position of the window of the flux transition peak and determines from this error what the remaining "jitter" tolerance margin is for the signal. That is, the quality of the Read-back signal is assessed. The bit margin tolerance can be programmed into the bit margin error detect circuit 272 and, if during a read of a track, any one of the bits is outside of the established tolerance, that information is captured in the error status port 274 and, subsequently, relayed back to the FDKM over the Way interface 268. As is shown in the drawings, comparable circuits exist for side 1 of the diskette. Because those circuits are merely a repeat of those associated with side 0, little further explanation need be given with respect to them.

To write data on a track of the side 0 surface of the diskette, the data, along with the digital value of precompensation for each bit of that data is sent over the Way interface 268 along with the reference clock TCK A. The adjustable write precompensation circuit 276 adjusts the time of the edge of the data with respect to the reference clock pulse to provide write precompensation. The block labeled 278 represents a variable Write current source and it toggles the direction of current to record a magnetic flux transition each time a 1-bit appears in the serial data stream, with the data being transmitted across the Way interface at the precise frequency to effect recording on the diskette with the proper bit spacings dictated by the format.

The Drive Control Section is shown as being enclosed by the broken line box 280 and includes a drive interface 282 which controls the action of the track access stepping motor. The CPU is able to control the stepping of the read/record head from track to track by way of the CPU drive control ports 284 which are accessed by the CPU, again by way of the Way interface 268. The drive interface 282 may also receive control signals via the manual drive control sequencer 286.

Attention is next directed to the Read/Verify Section of the FDFM, which is shown enclosed by the broken line box 288 in FIG. 7(b). The read verify process ensures that the flux transition pattern represented by the serial data from the FDKM is actually written on the diskette. The verify operation is accomplished by reading the data from the diskette and re-transmitting the data previously written in approximate syncronization with the Read data and performing a correlation to align the bit pattern being read with the verification pattern and then detecting any discrepancy in the pattern. Since it is not practical to perfectly synchronize the data from the Way interface 268 with the data from the Read channel, a 4K×1 first-in, first-out elastic buffer 290 is used. Data is sent from the FDKM earlier in time than it occurs at the output of the data separator such that the FIFO buffer 290 is nominally half full at the beginning of the verification process. The beginning of the data track is sensed by the 16-bit serial correlator 292 which recognizes a unique code, i.e., a serial combination of bits repesenting the start of a track. When this code is sensed, the read verify synchronization and arbitration logic 294 begins a bit-by-bit comparison, shifting a bit out of the FIFO 290 each time a new bit arrives from the data separator on line 296. If the data has been properly recorded and is reliably read back, each transition will compare and there will be no verify errors. However, the lack of comparison on any one bit will cause an error to be sent by read verify error circuitry 298, the output of which is captured in error status port 274. This port can be interrogated by the CPU at the end of a Verify cycle to determine that no errors have occurred.

It is possible to have an error which would cause the serial correlator 292 to miss the beginning of the track. In this case, although there is no read verify, the data will not be shifted out of the FIFO buffer 290 and that error is captured by Data Sync error circuitry 300, which senses the overflow of the buffer 290 and provides the error status information to the error status port 274.

READ/WRITE SECTION—FDFM

Referring now to FIG. 8, there is shown a more detailed block diagram of the Read/Write Section 248 of FIG. 7(a). The switches joined by the broken line 310 are analog switches which are driven by an amplifier 312 which is energized by the Swap signal developed on line 314. Switch contacts associated with the broken line 316 are also analog switches which switch the read/write heads between the Write current source 318 and the differential preamplifier 320. They are controlled by a buffer amplifier 322 which is activated by the Read/Write control signal which is made to appear on the line 324.

The filter characteristics of the programmable read filter 326 can be set by the CPU to emulate various types of drives, i.e., 3½, 5¼ or 8 in., and also various recording frequencies, 125 KHz for 5¼ in. disks and micro diskettes and 250 KHz for 8 in. disks.

The threshold logic track average circuit shown enclosed by broken line box 328 functions to sense the average peak value of the Read signal on line 330 and to establish positive and negative threshold levels on lines 332 and 334. These thresholds can be programmed to be a specific percentage of the average level. The zero crossing detector 336 does not generate an Output signal unless the output from the read amplifier circuit 330 exceeds either the positive or the negative threshold which has been established. This form of thresholded zero-crossing detection eanbles very reliable reading of the data, even in the presence media anomalies.

During the Write cycle, information from the Way is present on lines 340, 342 and 344. The "Data Valid" signal on line 342 is used to clock the RZ data bit and its associated precompensation data value which is a 3-bit code. The leading edge of the Data Valid signal propagates down a 10-stage delay line 346 while the precompensation data code selects one of up to 11 possible taps or delay positions via the multiplexer 348. The effect of this is that the write data at the output of the multiplexer 348 on the line 350 has been write precompensated, i.e., the transition has been moved either earlier or later than the nominal position to compensate for field interaction of adjacent bits on the magnetic media.

Flux transitions are recorded by switching the direction of current in the switch current source 318 with the programmable current digital-to-analog converter 352 providing a programmable level of write current.

Figure 8A:
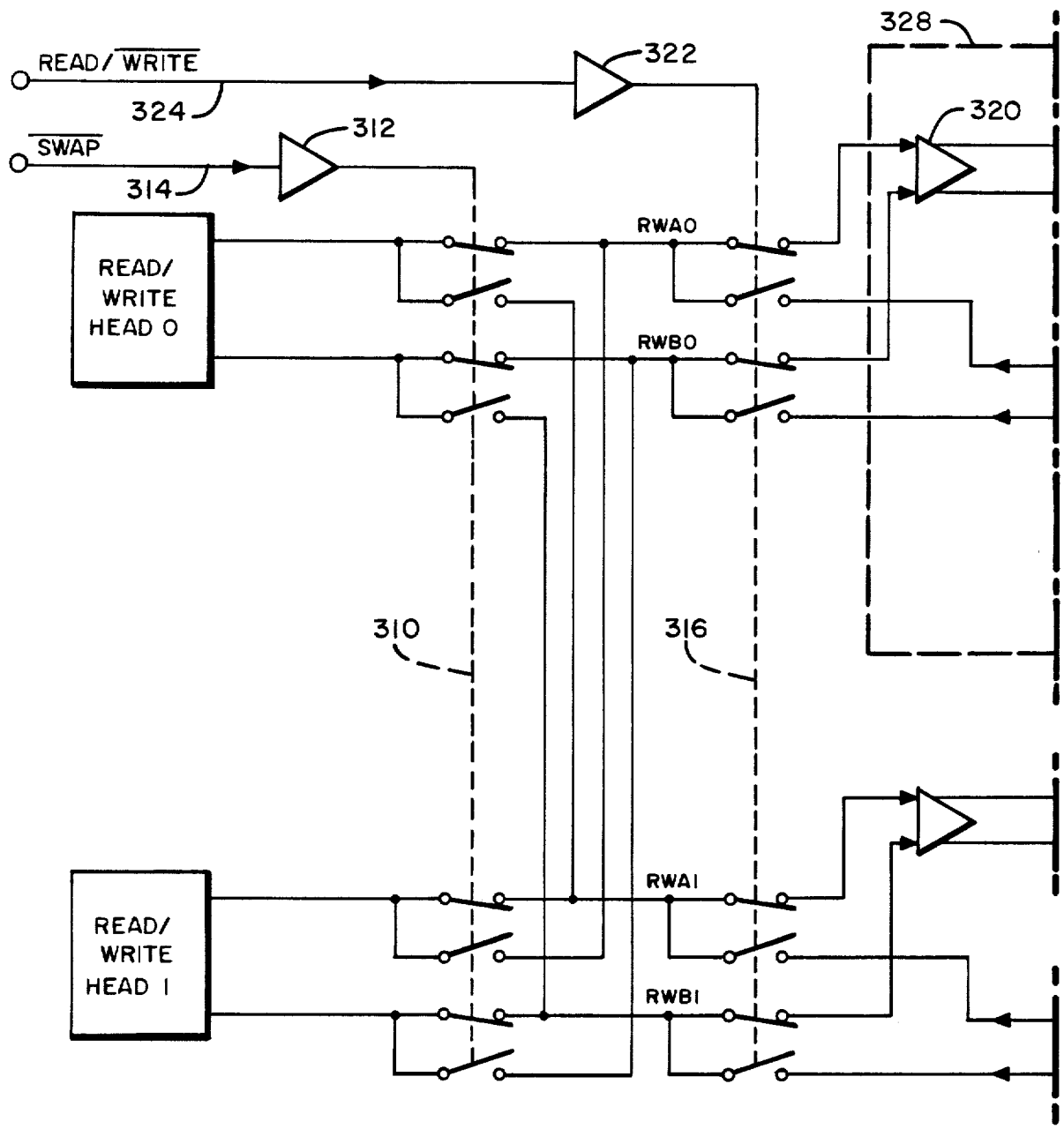
FIGS. 8-11 show block diagrams of sections of the FDFM at a higher level of detail.
Figure 8B:
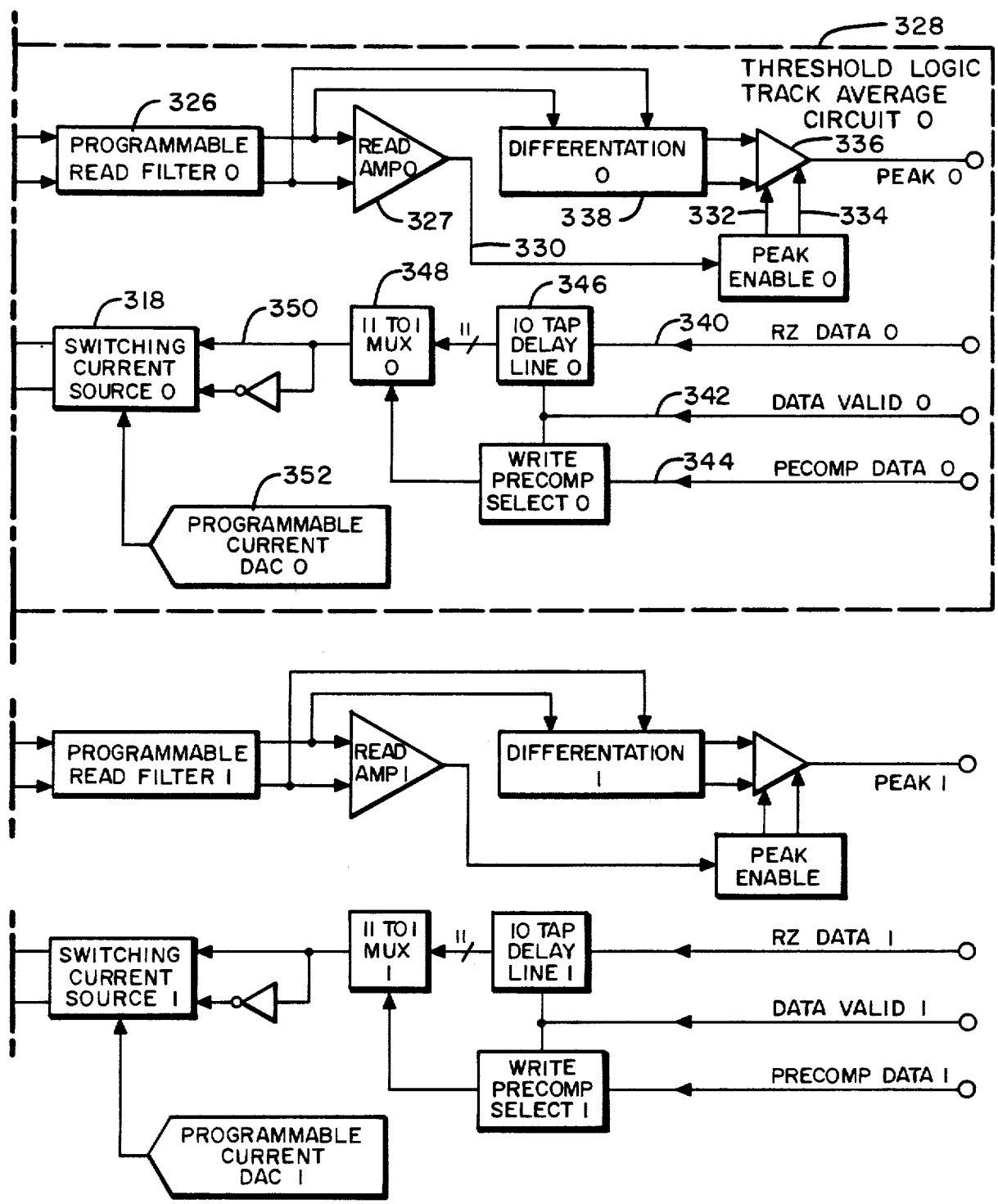

The remaining portion of the drawings of FIGS. 8(a) and 8(b) are effectively a repeat of the circuitry already described, but associated with side 1 of the diskette. In that the description given for side 0 has been provided, it is deemed unnecessary to repeat the explanation for the side 1 circuitry.

DATA SEPARATOR

Figure 9A:
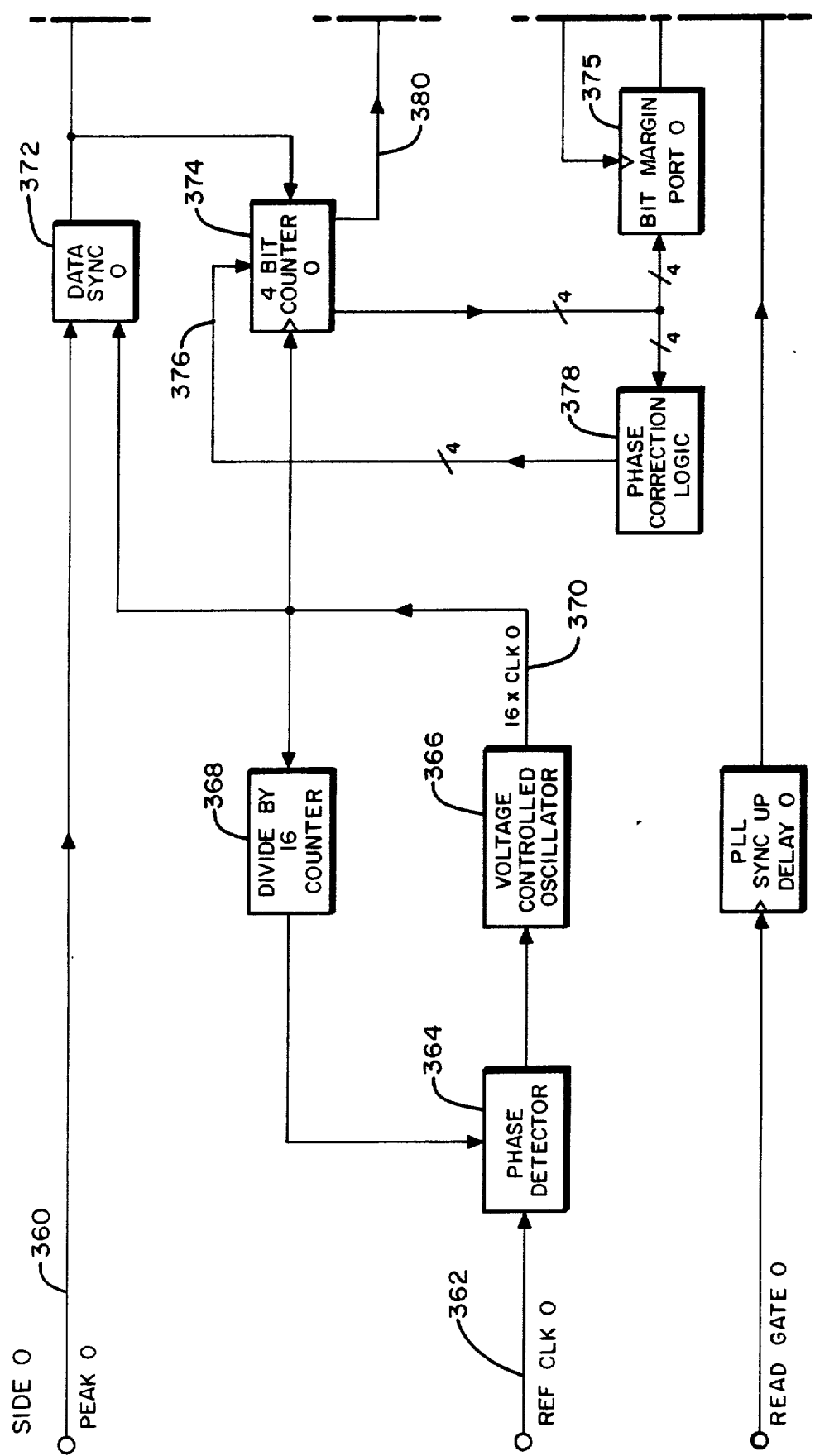
Figure 9B:
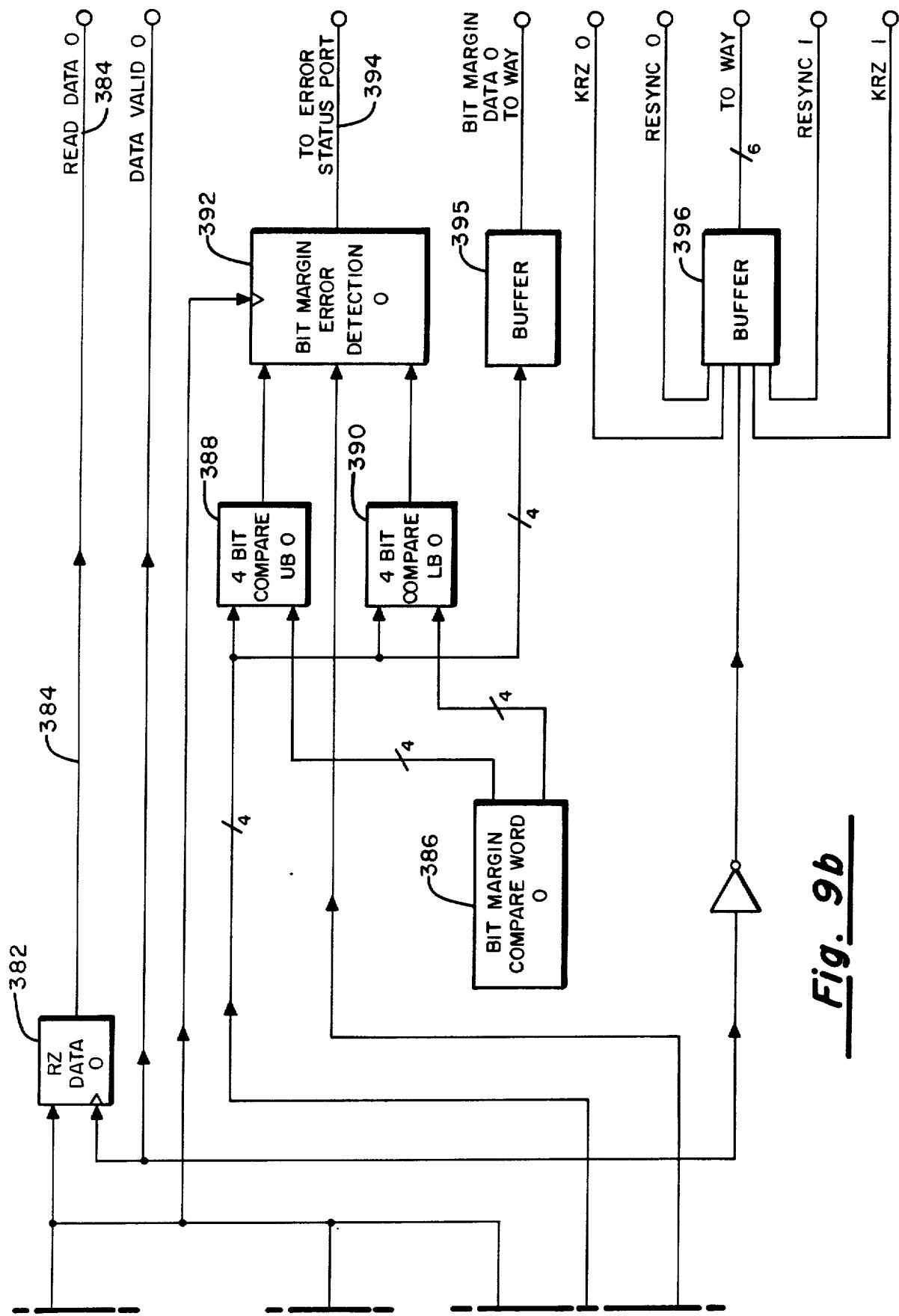

The data separator 262 in FIGS. 7(a) and 7(b) is shown with greater particularity in the block diagram of FIG. 9. It is to be recognized that most of the codes used in digital magnetic recording are of a class known as self-clocking codes, i.e., the data is encoded in such a way that, by sensing the time of flux transitions, the clock can be extracted from the data and the data, in effect, clocks itself. The extracted clock defines a window for the data transitions, with the trailing edge of the clock being the center of the window and with the preceding and subsequent leading edges representing the boundary of the window. Once the clock has been extracted, the determination of whether a window contains a "1" or a "0" bit is done by sensing whether a flux transition is present or absent in that window.

With that understanding in mind, the Read signal for side 0 appears on line 360. The reference clock for side 0 (REFCLK 0) which is applied via conductor 362, is programmed from the FDKM and is set to be nominally equal to the frequency of the clock encoded in the Read signal pattern. The phase detector 364, along with the voltage controlled oscillator (VCO) 366 and the 4-bit counter 368, form a phase-lock loop which functions to multiply the reference clock by 16, with that output appearing on line 370. Stated otherwise, the read window is effectively divided into 16 segments.

The data sync circuit 372 functions to synchronize the Read signal with the next 16×Clock signal on line 370 so that it can be used to reliably load the bit margin counter 374. When the data separator of FIGS. 9(a) and (b) is locked onto the Read signal, the 4-bit counter 374 will be making a transition from 1111 to 0000 at the same time that the transition is occuring on line 360. In this case, phase correction logic circuitry 378 places a 0000 code at the preset inputs of the bit margin circuit 374 and it continues to run the count as if it were free-running. On count 1000, line 380 goes high, clocking the RZ data flip-flop 382 to clock the data on the line 384. In this case, the data has been clocked exactly in the middle of the flux transition which, of course, is what is desired. If due to differences in the frequency of the reference clock and the frequency of the Read signal, the counter 374 will begin to drift out of synchronization with the Read signal. Phase correction logic 378 presets the counter with a value equal to the present phase plus one to make a phase adjustment. The magnitude of this phase adjustment is determined by the then state of the counter 374 and the previous two states thereof. The state of counter 374 at the time that line 370 goes high is an indication of the phase error of the recovered clock. This is captured in the bit margin port 375. A bit margin compare word stored in register 386 can be loaded from the FDKM's CPU. The 4-bit comparitors 388 and 390 function to compare the output of the bit margin port 375 with the upper and lower limits stored in the register 386 and, if the digital value is outside of these limits, an error is captured in the bit margin error detect circuit 392 which generates an Error signal on line 394 leading to the error status port. It is also possible to send the bit margin data back to the FDKM, via the buffer 395, which is coupled to the Way. The FDFM system of the present invention includes additional duplicate circuitry corresponding to FIGS. 9(a) and 9(b) for use in performing the data separator function for side 1 of the diskette. Again, because of the identical nature of that circuitry to what has already been described, it is deemed unnecessary to depict and describe it.

READ VERIFY—FDFM

Figure 10A:
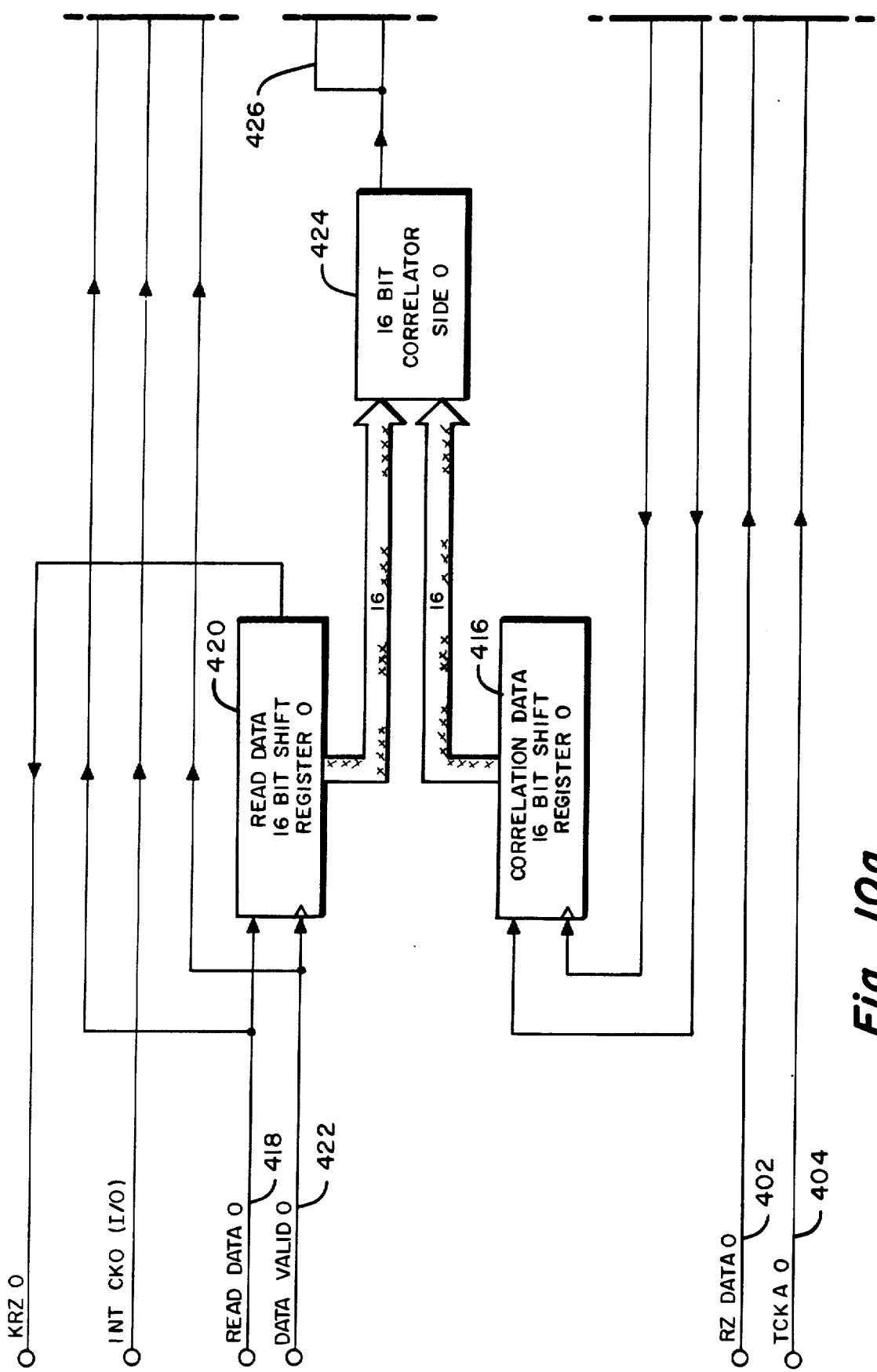
Figure 10B:
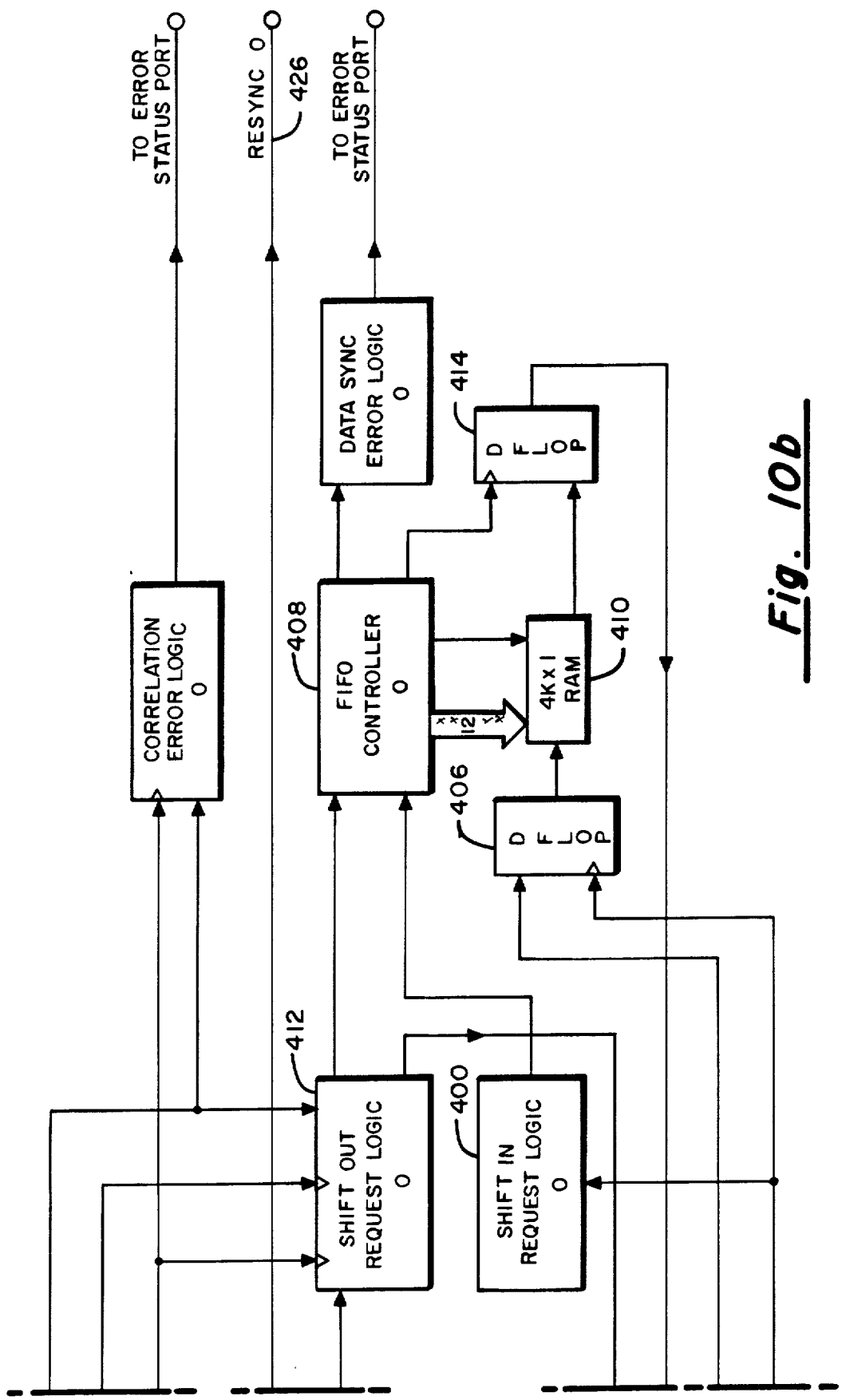

FIG. 10 is a more detailed block diagram of the Read Verify Section of FIG. 7(b). The shift-in request logic 400 controls the loading of data from the FDKM into the elastic buffer of the FDFM. It is controlled by TCK A clock. The RZ data to be used for verification, along with its associated clock, TCK A, are made available on the lines 402 and 404, respectively. The RZ data is clocked into the flip-flip 406 while, at the same time, the shift-in request logic 400 cause the FIFO controller 408 to address the 4K×1 storage RAM 410 so that the data is loaded into this buffer memory. When the 4K RAM 410 is partially loaded, the shift-out request logic 412 causes the FIFO controller 408 to clock data out of the RAM 410 through flip-flop 414 and shift the first 16 bits of verification data into the correlation data register 416. This is timed to be accomplished one revolution before the correlation pattern appears in the read data on the line 418.

Read data is continuously shifted through the shift register 420 by the Data Valid Clock signal appearing on line 422. If the data pattern in the register 420 exactly matches the 16-bit pattern in register 416, the output of the 16-bit correlator 424 enables the shift-out request logic 412 such that each subsequent data valid clock pulse causes a new bit to be shifted out of the elastic buffer comprised of the 4K×1 RAM 410. A dynamic situation now exists where data is being clocked out of the buffer by the Data Valid signal at a slightly different rate than data is being clocked in by the TCK A signal. However, the 4K buffer is sufficiently large to accommodate these variations over the length of time required to verify an entire track. Since both shift registers 420 and 416 are effectively being clocked from the same source, the output of correlator 424 remains valid as long as there is a one-to-one correspondence between the correlation data and read data. Each time the data from the disk matches the correlation register, the Resync line goes high. This signal is used in the Copy mode for synchronizing data transfers.

Referring next to FIG. 11, there is illustrated a more detailed block diagram of the Drive Control Section, the Way Interface Section and the DMA Sequencer Section of the FDFM unit. When the system is operating in the DMA mode, the FDKM initializes the FDFM via control port 430. After that, all timing for sequencing is derived from the contrived index (CIDX) which, when applied to the line 432, controls the duplication sequencer logic 434 to generate the Write Enable, Read Enable, Read/Verify Enable signals on the lines 436, 438 and 440, respectively.

DRIVE CONTROL—FDFM

Figure 11A:
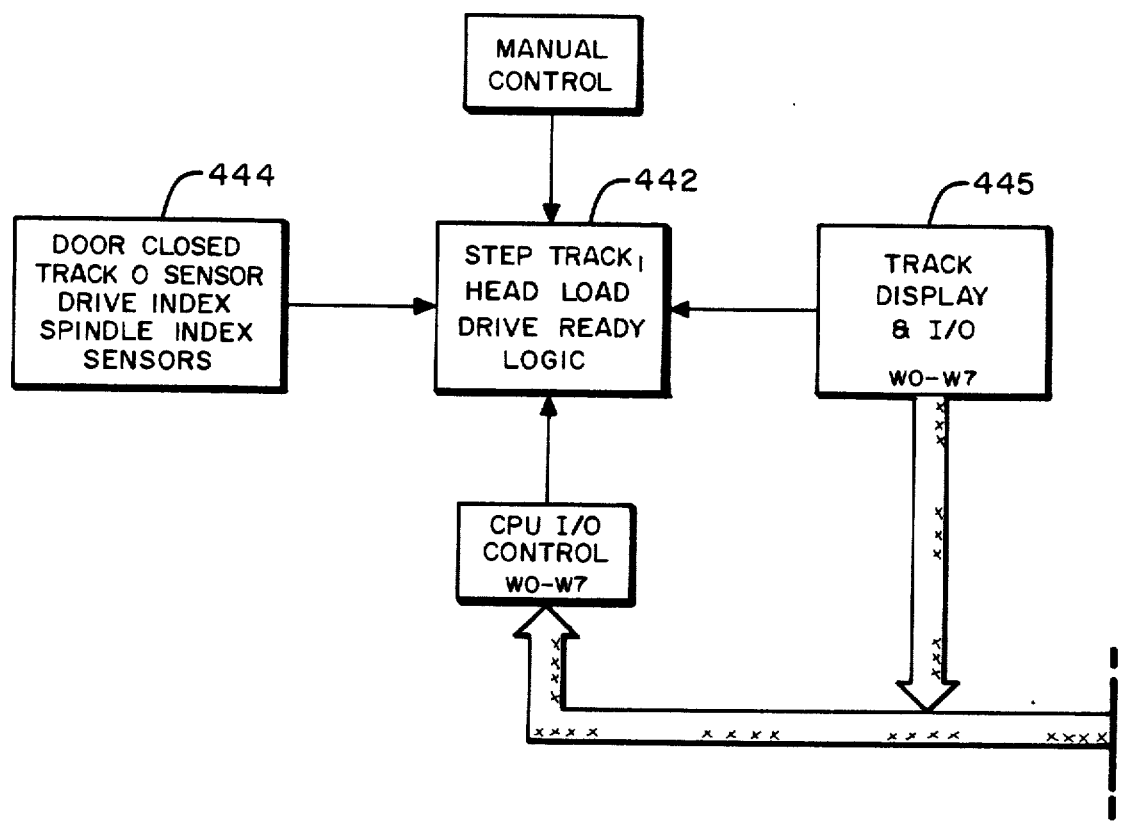

In the Drive Control Section illustrated in FIG. 11(a), the step track, head load, drive ready logic 442 operate relatively autonomously, sensing the door closure of the diskette drive, the drive index and the spindle index from the circuitry in the block 444. It is initialized from the read-out of the track position on the drive. Block 445 represents circuits which provide a visual representation of the track, which value can also be sent back, via the Way, to the CPU in the FDKM.

Figure 11B:
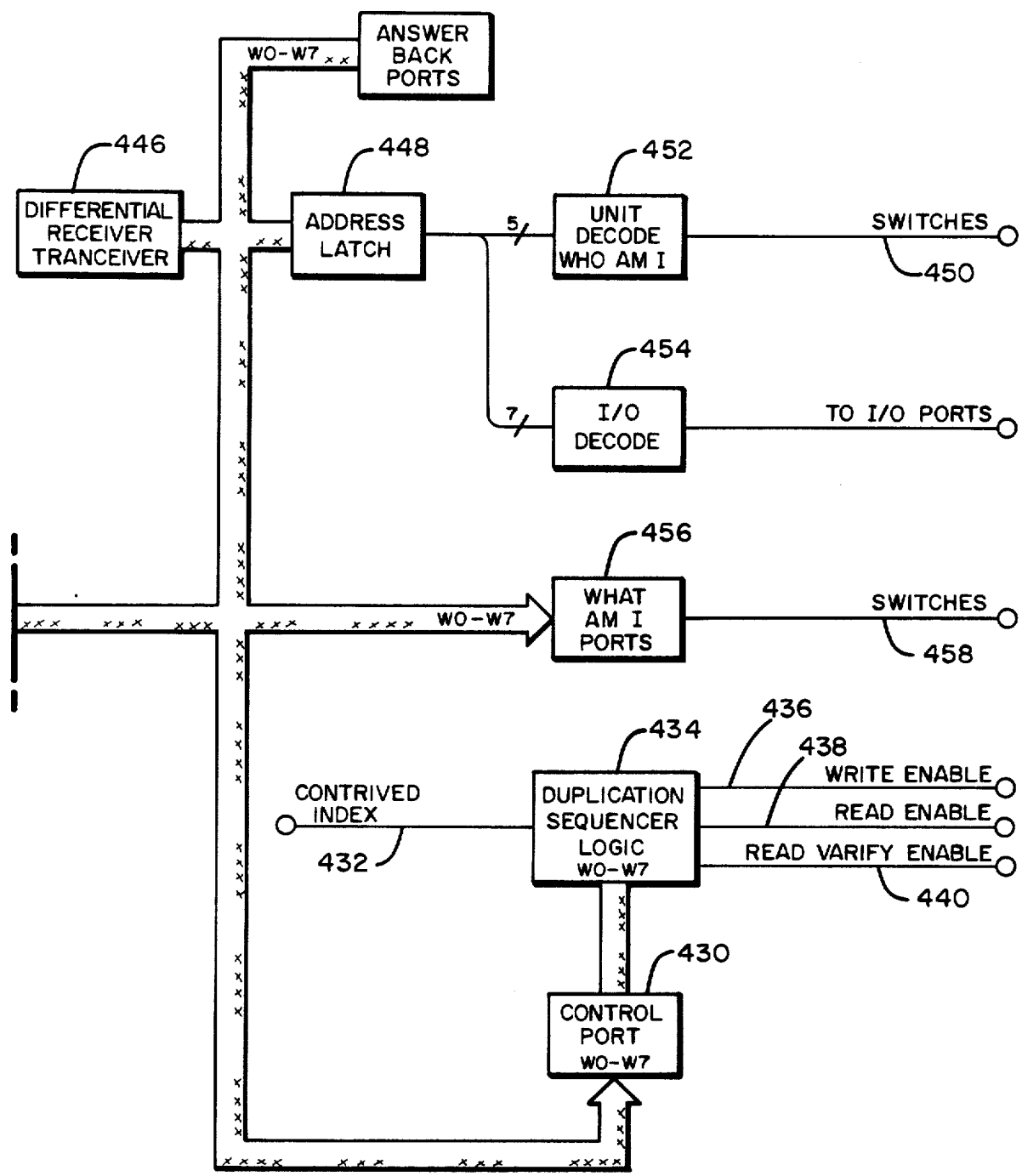

The portion of FIG. 11(b) dealing with the Way Interface Section includes a differential receiver/transceiver 446 which connects to a twisted pair cable forming the daisy-chain Way bus. In the CPU mode, the Address Latch Enable signal captures the Way address in address latch 448. The address of a particular FDFM (slave) is established by dialing a numerical value into manually-operated switches which communicate over the line 450 to a "Who Am I" unit decoder 452. If the upper five bits of the address latched into register 448 matches the unit decode or are set to all ones (broadcast), that particular FDFM will respond to the I/O commands. The lower 7 bits of the address are decoded by the I/O decode unit 454 to perform CPU read and write operations to various ports throughout the FDFM. The logic 456 decodes a digital value identifying what type of FDFM is configured. This is identified by the position of manually-set switches (not shown) whose binary values are applied over the line 458. By convention, unique identity codes are given for 5¼ in. diameter disk drives versus 8 in. disk drives, as well as for single speed and double speed recording. Disk drives of a particular manufacturer can also be reflected by the "What Am I" switches.

SYSTEM OPERATION

The CPU 16 directly or indirectly controls the operation of the entire system. Program subroutines are executed by the CPU from program store 126, triggered by either commands from the keyboard interface 18, the EIA interface 19, or semi-automatically, based on status information that the CPU receives from the system. Data for these programs is contained in the system random access memory 124. Communication from the CPU to the entire system is via address bus 108, data bus 110 and control bus 112. The data bus is used to communicate not only the data involved in the duplication process but control information as well. This control information is used to program the special purpose high-speed circuitry which enables the versatile, yet very fast parallel duplication process. Four operating modes will be described: (1) Initialization; (2) Duplication; (3) Read Verification; and (4) Copy.

The input/output control structure represented by control bus 112 is configured to enable the following registers or ports to be addressed by the CPU, via the data bus, to program the FDKM module.

1. Code select port 200 selects the type of recording code to be used and the direction of data flow through the translator, i.e., through encoder 206 or through decoder 210. This selection allows any of the industry standard codes to be automatically translated, i.e., FM, MFM, $M^2FM$, GCR, etc.

2. Programmable TCK generator 192 is programmed to establish a reference clock frequency, TCK, for the serial data transmission process which can be set to any of the frequencies used in industry standard diskette recording. Derivatives for this clock are used as a reference of the data separator to read information off the diskette and as a clock to transmit data in synchronism with the duplication process.

3. Four-bit control counter 168 is programmed to establish the length of the word being received from the diskette. This data provides framing information for the serial data such that it can be assembled word-by-word into the transition RAM memory 130.

4. Four-bit control counter 172 allows the program to establish the word lengths associated with the data being transmitted from the transition RAM to the diskette. Likewise, it provides framing information such that contiguous words from the transition memory can be assemblied into a single, continuous serial data stream.

5. The the D-structure code port 188 is programmed to select one of three possible write precompensation algorithms. Each precompensation algorithm computes a precompensation code based on the state of the neighbor bits. The desired precompensation code is not only a function of the adjoining data but also the recording format used. Hence, the programmability of the precompensation algorithm allows precompensation for all of the industry standard recording formats.

6. Programmable timer 236 is programmed to establish the correct frequency and phase relationship of the contrived index signal. This signal provides the timing to permit automatic sequencing through the track duplication, track read verify and track advance cycles.

The CPU also initializes one or more FDFM or slave modules via the Way interface indicated by transceiver 232 and differential receivers and transmitters 222, 224 and 228 and the twisted pairs of the Way bus itself represented by wires 220 and 226. The twisted pair bus is daisy-chained to interconnect a series of FDFM modules, each of which has a differential receiver transceivers 446, address latch 448 and I/O decode 454 as well as unit ecode 452. Direct communication between the CPU and the various FDFM modules is via the Way bus when the system is in the CPU mode. In this mode, the CPU first places an address on the Way bus which is latched in address latch 448. If the upper five bits of the address match the state of switches 450, the WHO AM I unit decode 452 determines that the communication is intended for its unit and responds accordingly. In addition, an all ones address is reserved to indicate a broadcast of information to all FDFMs at once.

The following ports or registers in the FDFM module are initialized by the CPU via the Way bus interface:

1. Programmable read filter 326 is programmed to establish the analog filter characteristics which correspond to the recording format to be used.

2. Programmable current generator 352 is programmed to establish the amplitude of write current required for the recording format to be used.

3. Bit margin error detection circuitry 392 is programmed with the timing tolerances on the bit margin, i.e., the time before or after the center of the timing window that the read pulse is detected. Read pulses outside a specified window are indicative of a media defect or recording anomaly. Each bit in the read verify cycle is checked against these limits and the occurrence of a single error causes the information to be latched in the error status report. At the end of a track or entire disk cycle, the CPU can interrogate this port to determine whether the duplication has been accomplished free of errors.

4. The step track, head load, drive ready logic 442 is addressed by the CPU to position the heads at the starting track for a copier duplication process. The sensors indicated by box 44 determine when the drive is ready for the duplication or copy operation and this information is relayed back to the CPU via the data bus. The CPU can be set in a mode such that duplication automatically begins when all of the drive sensors are determined to have been closed. This feature, along with automatic diskette handlers to load and unload the drives, enables the entire system to proceed through a stack of diskettes for duplication without operator-intervention.

DUPLICATION

Prior to the initiation of duplication, the transition RAM is loaded with an image of the information to be duplicated in a binary code form. Generally, the source of this data will be from the cartridge hard disk. However, alternative sources of data are the EIA interface 19, keyboard interface 18 and also a diskette which is read by one of the FDFM modules in the Copy mode to be described later.

The source data may be originally in either code bit or data bit form. If it is in code bit form, the CPU simply loads it into the transition RAM 130. If the source data is in binary coded data bit form, the CPU 16 encodes the data through the transistor into the transition RAM 130 based on the code from the format information contained in hard disk 21. While it is permissible to begin writing a track at any arbitrary angular position of the diskette, it is desirable to control the angular position of the track on the diskette. This is the purpose of the contrived index signal 234. In the Duplication process, the CPU achieves synchronization with the contrived index through an interrupt on interrupt controller 120. On the basis of this interrupt, the CPU reads one track of information from the system RAM 124 and loads it into the transition RAM 130. During this time, the transition RAM is in the CPU mode, which means that the transition RAM address on address bus 144 is derived from the CPU address bus 188. Data flows from the system RAM 124 over data bus 110 through encoder 206 into transition RAM 130. The transition RAM now contains one track of information encoded in the flux transition format, i.e., a "1" in each bit position that a transition will be recorded and a "0" in each bit position where no transition will be recorded.

Next, the transition RAM 130 and the Way bus are both placed in the direct memory access DMA mode. In the DMA mode, the address for the transition RAM 130 will be from the DMA counter and multiplexer 160. At the beginning of each Duplication cycle, this counter is set to a starting address previously determined by the CPU and counts sequentially through the block of addresses required to access the entire track. The TCK A & B logic circuitry 194 is enabled to generate the TCK A 196 and TCK B 198 signals which are sent over the Way bus to clock serial write data in the FDFM modules. The serial write data stream is assembled by unpacking the data from the transition RAM 130 in a synchronized manner. Data is read from the RAM as 16-bit parallel words and is transmitted over the transition RAM data bus 136. Each word is loaded at the correct time into a 16-bit, parallel-load, serial-out shift register which is continuously clocked by the reference clock signal TCK. Concurrent with the shifting of the Nth bit (where N is the word length) of each word out of the shift register, the next 16-bit word is loaded from the transition RAM. Serial data is shifted into the 16-bit serial-in, parallel-out shift register 180 with one of these outputs being used to define the return-to-zero data (RZ) 186. Based upon the state of the adjoining bits, both earlier and later, and the data structure code stored in port 188, the precompensation encoder 182 computes a 3-bit precompensation code, PC0-PC3 on line 190. The signed on lines 190, 186, 196 and 198 thus comprise the data and clock information required to write one bit in the track. The six bits of information for side 0 are transmitted over lines W0-W5 of the Way bus while the same information for side 1 is transmitted over lines W6-W11 of the Way bus. At the FDFM, the RZ data from line 186 of the FDKM is converted to non-return to zero data on line 340 while the clock lines are used to form the data valid signal 342, the clocks being TCK A & B 196 and 198.

The precompensation data from lines 190 appears at lines 344. This data is used to select one of eleven delay line taps from delay line 346 to be placed on line 350 via multiplexer 348. Line 350 is thus the transition timing information used to write flux transitions on the magnetic media. Each transition has been adjusted to be slightly earlier or later than the nominal reference time by the precompensation data to provide write precompensation. Each transition toggles switching current source 318 to reverse the direction of current flow in the read/write head with the amplitude of this current controlled by the programmable current generator 352.

READ VERIFY

This cycle assures that the information actually written to each diskette is identifcal to the original data contained in the transition RAM memory 130. In this cycle, the transition write data is transmitted to all the FDFM modules in a broadcast mode for a second time, while each FDFM reads the track just written and does a bit-by-bit comparison between the re-transmitted data and the data read from the track. Since it is not practical to exactly synchronize this operation bit-by-bit, an elastic buffer is used in each FDFM to allow local precise synchronization of the read and retransmitted data. As in the previous cycle, the RZ data and its associated clocks ae generated by the FDKM and are transmitted over the Way bus. This information is clocked into flip-flop 406 while a shift-in request is generated by the shift-in request logic 400. First-in, first-out controller 40% and 4K×1 random access memory 410 comprises an elastic buffer in which data can be shifted in and shifted out at slightly different rates while preserving the sequence of the data. Each pulse out of the shift-in request logic 400 loads a new bit of RZ data into the RAM memory 410 while each pulse out of the shift-out request logic 412 reads the next data bit from the RAM memory and loads it into flip-flop 414. While the shift-in request logic is controlled by the reference clock from the FDKM, the shift-out logic is controlled by the clock recovered from the read data represented by the data valid signal 422.

To perform verification, it is necessary to identify the beginning of the track in the serial data. This is performed by the correlation circuitry 416, 420 and 424. At the beginning of the verification cycle, correlation data register 416 is loaded, via the elastic buffer, with a word either 10 or 16 bits long. This code represents the bit pattern indicative of the start of the track. Once this ID code has been loaded, the shift-out commands from logic 412 are temporarily suspended to freeze the data in this register 416 until a match occurs.

Magnetic flux transitions are sensed by the read/write head 250 and amplified by video amplifier 320. The programmable read filter 326 provides post-write compensation to compensate for peak shift in the magnetic recording process. The polarity of the read signal is determined by the read amplifier 327 whose output sets either a positive or a negative threshold from the peak enable circuit via line 330. The positive threshold is selected during a positive read signal phase while the negative threshold is selected during a negative phase. The value of the threshold can be programmed to be a specified percentage of the average peak amplitude of the read signal. Since the information of the read signal is contained in the time of the flux transitions, these flux transitions are detected by differentiating the read signal in circuit 338. If a positive going transition exceeds the positive threshold or a negative going transition exceeds the negative threshold, the zero-crossing detector 336 issues a pulse indicative of a valid transition, i.e., the peak 0 signal on line 360.

To interpret the data encoded in the flux transitions, it is necessary to first recover the clock signal from these same transitions. This is the function of the data separator circuitry shown in FIG. 9(a). The reference clock 362, which has its origin in the programmable TCK generator 192 of the FDKM, provides a reference to a phase-lock loop comprised of the phase detector 364, voltage control oscillator 366 and divide by 16 counter 368. Since the reference clock is nominally of the same frequency as the clock to be recovered from the data, the output of the voltage control oscillator 366 is nominally 16 times the frequency of the encoded clock to be recovered nominally. Thus, each clock pulse out of the VCO 366 defines a period of time which is 1/16th of the nominal window of the read data. Data synchronizing circuit 372 takes the read peak signal, i.e., the flux transition, and synchronizes it to the next clock phase out of VCO 366. This signal is used to preset 4-bit counter 374 with the output of phase correction logic 378. The most significant bit of counter 374 on line 380 represents the recovered clock signal. When the leading edge of this signal is exactly in the center of the window defined by the flux transitions times, the 4-bit counter is preset, such that it effectively free-runs, i.e., the preset value is, in fact, the next count. Due to small differences between the reference clock and the encoded clock, the phase of the 4-bit counter 374 will begin to drift out of the window and this drift is sensed by the phase correction logic 378 which computes a preset value for the counter to restore it back into the phase, i.e., the clock in the center of the transition window.

The state of counter 374 at the instant of a flux transition is an indication of the bit timing error of that transition. This information passes through bit margin port 375 and is compared to the word stored in bit margin compare register 386 which is a representative of the bit margin tolerance. The results of the comparators 388 and 390 determine whether a flux transition has occurred outside the bit margin time window. The recovered clock signal 380 is used to clock the RZ data circuitry 382 such that the output on line 384, the read data signal, is the recovered digital value of the data.

The read data from the track to be verified is shifted through the 16-bit shift register 420 and at each data bit time that the output of the 16-bit correlator 424 is tested. When there is a bit-by-bit correspondence between shift registers 416 and 420, the start of track has been identified and correlation has begun. Now, each Data Valid clock signal 422 not only shifts read data through the shift register 420 but also enables the shiftout logic 412, such that the data from the FDKM is also shifted in synchronism through shift register 416. If there is complete correlation between the data read and the data re-transmitted, the output of the correlator 422 will be continuously valid, indicating a good track. Any error will cause a lack of correlation and generates a read verify error. At the end of the verification cycle, the CPU interrogates the error status report of each FDFM module to determine whether the correlation was complete.

COPY

When the form of the duplication source data is diskette to be replicated, one of the FDFM modules can be used to read the diskette and copy the information from the FDFM back to the FDKM.

As in the Read Verify cycle, the flux transitions are converted to the read data signal 384 and the data valid signal 380. These are transmitted across the Way bus to the FDKM where they appear as the RZ data signal 162 and the data valid clock 166. Data is continuously shifted in to the 9 to 16-bit serial-in, parallel-out shift register 164. When the number of bits representative of a complete word as defined by 4-bit control counter 168 have been shifted-in, a write request to the transition RAM memory 130 is generated and buffer 170 is enabled to put the assembled word onto the transition data bus 136. This word is written into the transition RAM memory 130 and the DMA counter 160 is incremented such that the entire track is packed in flux transition word format into the transition RAM memory. When an entire track has been assembled into the transition RAM, the memory is put into the CPU mode such that the CPU generates transition RAM addresses via address bus 108, multiplexer 158 and transition RAM address bus 144. Data passes from the transition RAM memory 130 to the transition data bus 136, through bus transceiver 140 to translator bus 138, through decoder 210 to CPU data bus 110, and then to CPU 16. The CPU 16 then generates a write command to write this word to the hard disk section 21. Thus, the data from the diskette being copied is now stored on the hard disk and can be used as source data for a subsequent duplication cycle.

AUTOMATIC OPERATION

The duplicate, read verify, and copy modes have been described as cycles which are done a track-by-track basis. To copy or duplicate or read verify an entire disk, the system can automatically step from one track to the other. This action is triggered by the contrived index signal which is a pulse issued for each revolution of the diskette spindle. On the first contrived index, the heads are advanced to the next track position while the transition RAM is either loaded for Duplicate cycle or emptied for a Copy cycle. On the second revolution of the spindle, the copy or duplicate cycle is completed. Optionally, a third revolution of the disk can be used for the read verify cycle following which the heads are stepped again. Thus, a duplicate or a copy is accomplished in two revolutions of the spindle per track while a duplicate followed by a read verify is accomplished in three revolutions of the spindle per track. At the end of a complete diskette duplication verification cycle, the CPU can direct the diskette to be automatically unloaded and sent to one of a number of bins based on information that the CPU has regarding the material duplicated and the error status port information. Diskettes can thus be sorted on the basis of either content or quality or both. The CPU can also direct that diskettes from a supply magazine be loaded into the disk drives for another duplication cycle.

Having described the system hardware as well as the overall organization in general terms with the aid of the block diagrams of FIGS. 1-11, consideration will next be given to the details of the circuit implementation of the various sections heretofore described where those sections may not be of standard or otherwise well-known construction. For example, in that details of the CPU are readily available in the product literature available from Intel Corporation pertaining to its 8086 microprocessor system, it is not deemed necessary to set that descriptive material out in detail in this specification. Similarly, the integrated circuit chips used in implementing the logic design of this system are generally commercially available and each manufacturer of such integrated circuit chips provides data sheets, specifications and application notes concerning those devices, thus making it unnecessary to discuss those chip parameters.

FDKM WAY INTERFACE

Figure 12A:
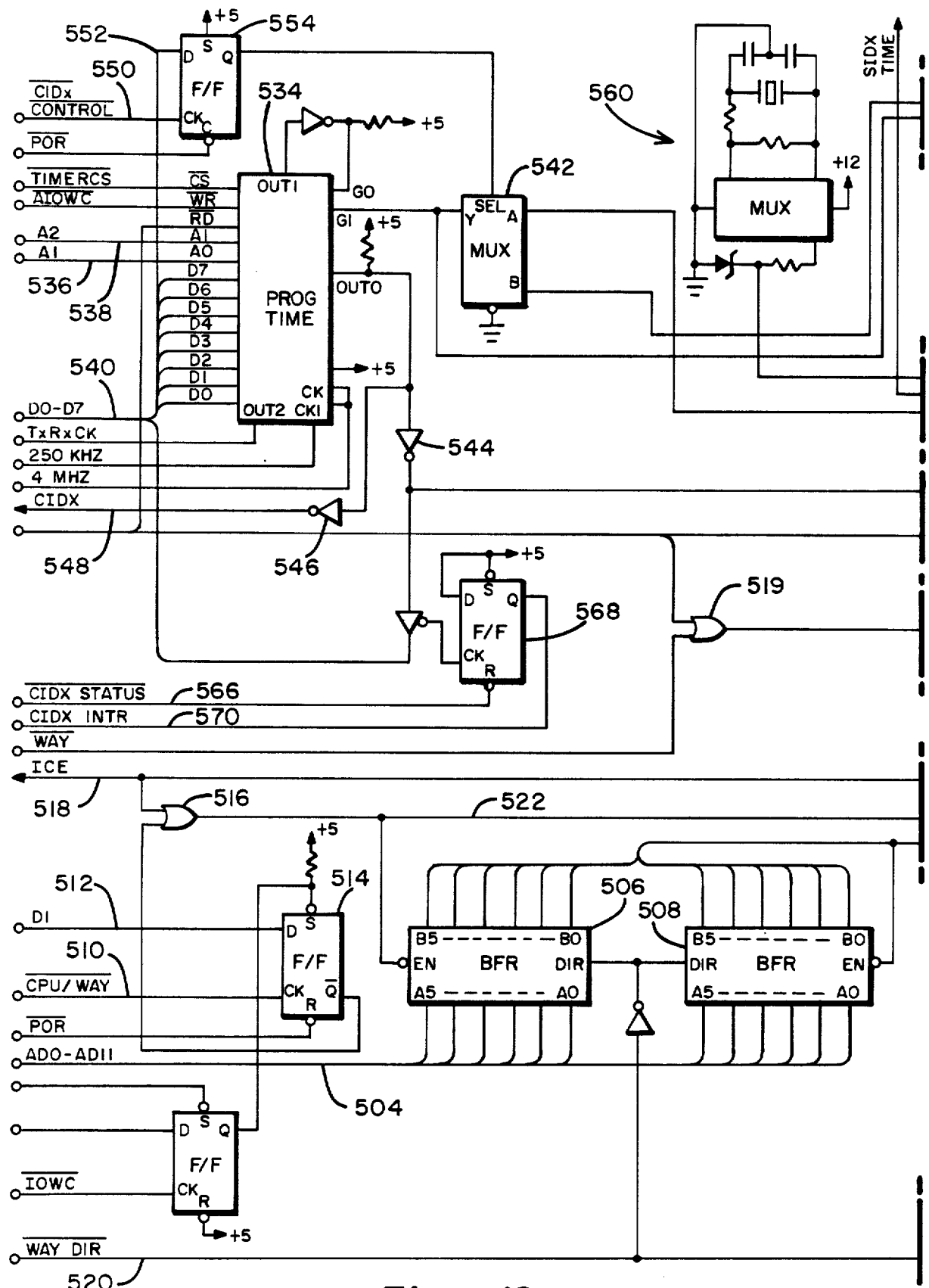
FIGS. 12-15 are logic diagrams showing details of specific portions of the FDKM module.
Figure 12B:
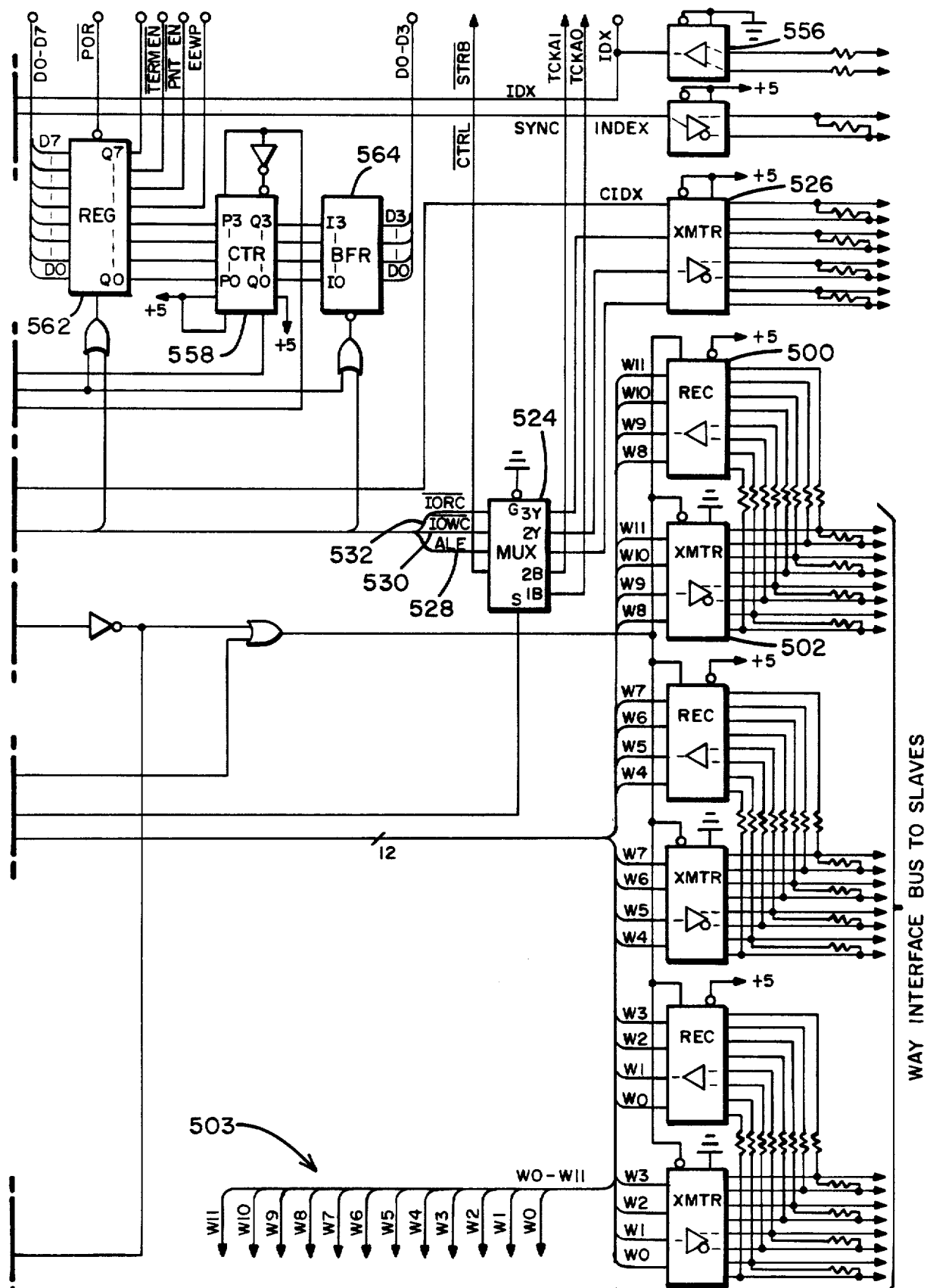

FIGS. 12(a) and 12(b) together show the detailed logic diagram of the FDKM Way interface. The quad-differential receiver chips 500 and the quad-differential transmitter chips 502 are representatives of the circuitry used to provide a bidirectional interface to the Way internal bus $W_0$ to $W_{11}$ identified generally by numeral 503. That is, additional transmitter and receiver chips are included in the system so as to provide bidirectional transmission of 12 bits of data over the bus. Communication to the CPU address data bus 504 (FIG. 12(a)) is via the bidirectional buffer integrated circuit chips 506 and 508. The CPU enables this path by selecting the control line $\overline{\text{CPU/WAY}}$ 510 with the D1 bit set on the data bus line 512. This causes the flip-flop 514 to set, propagating a low signal through OR 516 to enable the bidirectional buffers, provided the ICE line 518 is also low. The Way Direction signal ($\overline{\text{WAY DIR}}$) on line 520 is derived from OR circuit 519 and determines whether data will be transmitted or received over the Way bus. When the CPU/WAY communication path is selected, line 522 also causes the A-input of the multiplexer 524 to propagate the CPU control signals to the Way control lines driven by the transmitter 526, i.e., Address Latch Enable 528, I/O Write Control 530 and I/O Read Control 532. When the CPU addresses the $\overline{\text{CPU/WAY}}$ control line 510 with data bit D1=0, the line 522 goes high, disabling the bidirectional buffers 506 and 508 and disconnecting the CPU from the Way data interface. Now, multiplexer 524 selects the B-input such that the control signals required for the DMA mode are propagated to transmitter 526, i.e., CIDX, $\overline{\text{CTRL STRB}}$, TCK A1, TCK A0. The design of the Way interface provides the ability for the CPU to put it into two distinctly different operating modes with very different control organizations.

The contrived index (CIDX) is generated by a programmable timer 534 (FIG. 12(a)). The programmable timer can be addressed by way of lines 536 and 538 to load in programmable count over the data bus 540. One count is the hold-off time for the CIDX and the second count is the width of the CIDX. It is triggered by the output of a multiplexer 542 into input G1 of the programmable timer and the output is on the terminal labeled "OUT" and is inverted by buffers 544 and 546 to form the Contrived Index signal on line 548. The CIDX reference is selected by the CPU, via control line 550 and data bit 12 arriving over line 552. The output of flip-flop 554 is either set to accept the IDX signal from the slaves via receiver 556 (FIG. 12(c)) or is cleared to accept ripple-carry output of presettable counter 558. The counter 558 is continuously clocked by the 60 Hz square wave oscillator 560.

An 8bit register 562 determines the value of the present of the counter 558. If a count of 10 is loaded into register 562, the counter 558 will divide by 10 and produce 6 Hz Contrived Index signal. If the count is increased to 12, the Contrived Index will be 5 Hz. If the CPU selects the SIDX time control line with a "Write" command, register 562 will be loaded, via the data bus, with the SIDX count. If the same control line is selected with a Read command, the outputs of the quad-buffer 564 allows the outputs of counter 558 to be sensed by the CPU via the data bus.

The CPU has two methods of determining the Contrived Index status. If the CPU selects CIDX status line 566 (FIG. 12(a)) with a Read command, the state of the CIDX line is placed on the line labeled D0 via buffer 546 to be sensed by the CPU. The same command also resets flip-flop 568 so that the leading edge of the CIDX pulse causes the flip-flop to be clocked back to the Set condition, thus generating a CIDX interrupt on line 570.

FDKM TRANSLATOR

FIG. 13 illustrates a detailed logic diagram of the FDKM translator. In implementing this device, it was found convenient to utilize so-called programmable array logic, commonly referred as "PALs". As an alternative to constructing logic circuits out of discrete components, such as CMOS, OR, AND and NOT circuits, flip-flops, counters, etc., the resulting logic can often be implemented by "programming" nicrome fuses on a PAL chip. The system of the present invention utilizes a number of these devices and they are basically of two forms. The first is a field Programmable Logic Array (PLA) of the type manufactured by the Signetics Corporation and the nature of that device is best described by means of a programmed truth table. The system of the present invention also uses PALs manufactured by Monolithic Memories, Inc. and, here, the nature of the PAL is best defined by Boolean equations. Given the truth table or the equations, a skilled designer is in a position to implement the logic in conventional discrete form or otherwise. For the sake of completeness, the appendix to this application includes the definition of the PALs used in the present invention either by means of truth tables or sets of equations.

With that understanding in mind, the programmable logic arrays 600 and 602 correspond to the encoder 206 of the block diagram of FIG. 5 while the PAL 604 corresponds to the decoder 210 of FIG. 5. The octal bus transceivers 606 and 608 comprise the bidirectional buffer 212 of FIG. 5. The lines labeled D0–D15 are the CPU data but 110 (FIG. 2(a)). the lines labeled X0–X15 are the lines forming the transition data bus 136 (FIG. 4(a)). The inputs to the PALs 600, 602 and 604 arriving by way of lines 610 and 612 allow up to eight different encode/decode combinations.

The general mode of translation is set by the CPU in applying signals over the data bus 110 to a quad-flip-flop chip 614 and the flip-flop 616.

Flip-flops 618 and 620 can be set or cleared by the CPI I/O when inserting data into a format or by translating logic when doing sequential block transfers. The rules for encoding the code bits uses the previous data bit for MFM and the previous clock and previous data bits for MMFM. When decoding the data bits for MFM, FM and MMFM, only the even code bits, which represent the binary data, are need. For GCR, which translates 10 code bits to 8 data bits, only the 10 most significant bits are used in translation. Thus, X0, X2, X4, X6, X8, X10, X12 and X14 are needed for FM, MFM and MMFM, and X17–X15 are needed for GCR.

FDKM TRANSITION RAM

Figure 14A:
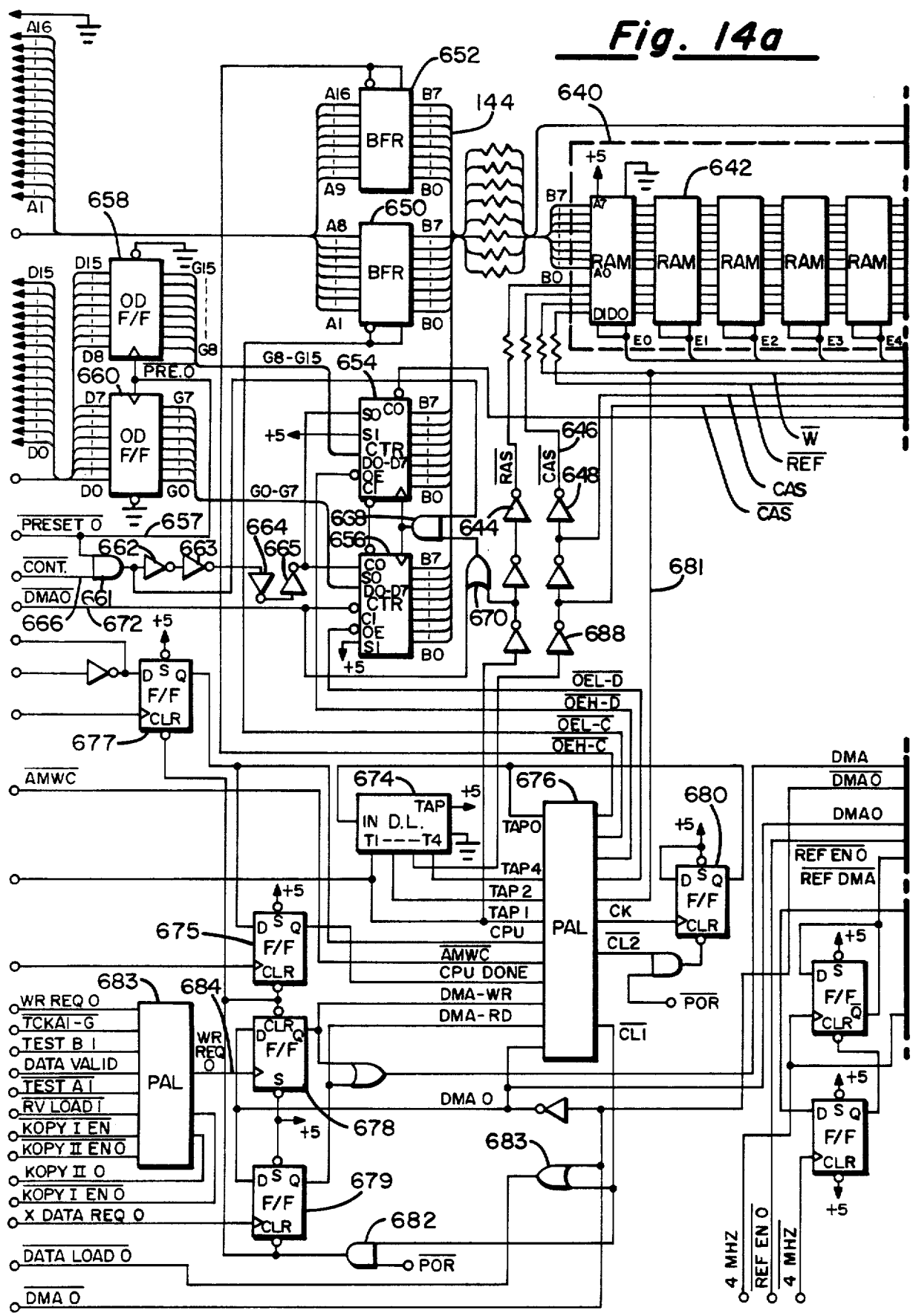
Figure 14B:
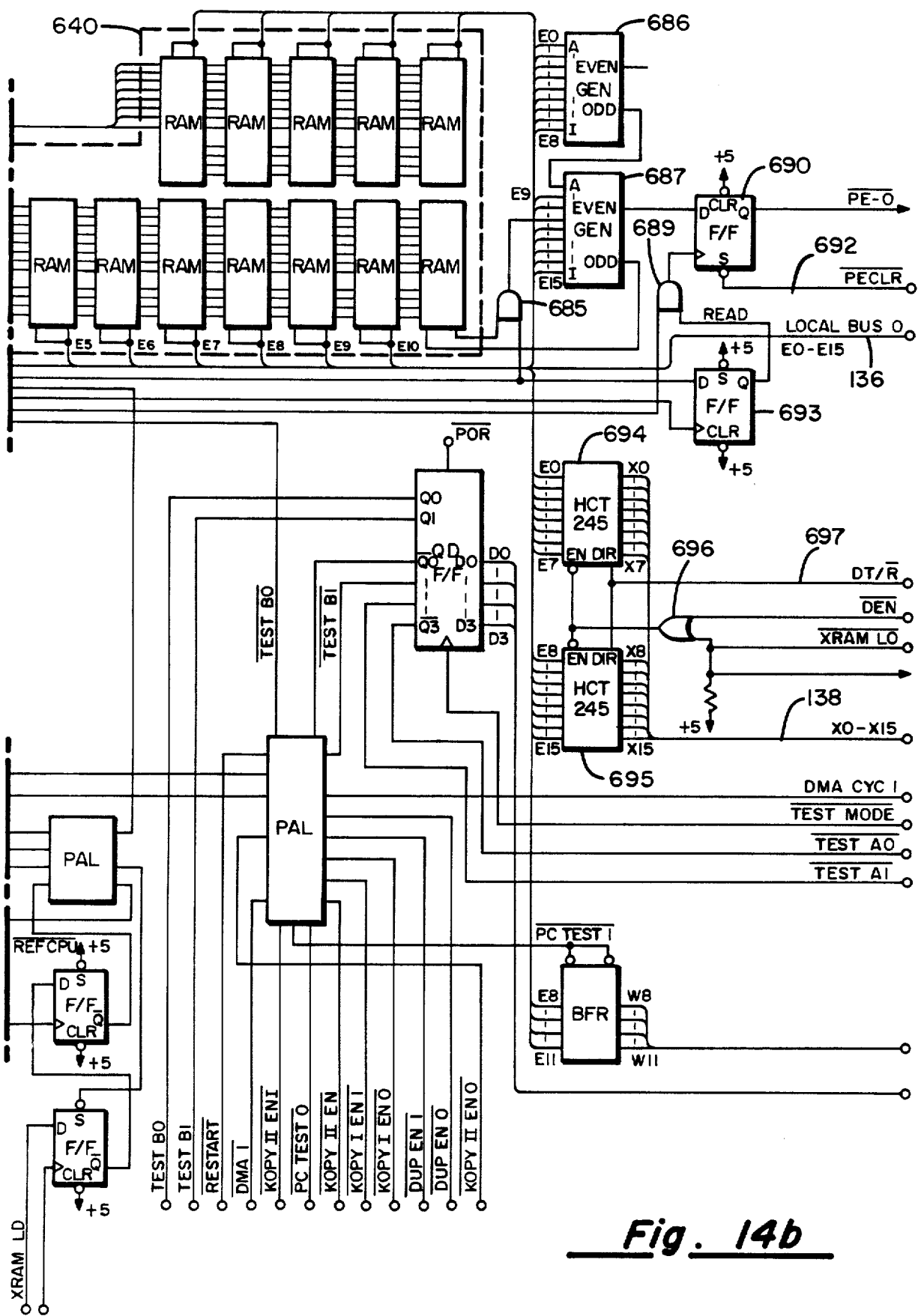

FIGS. 14(a) and 14(b) together depict the detailed logic diagram of the transition RAM used in the FDKM unit. The 64K×17-bit word dynamic RAM is shown as being enclosed by the broken line box 640. The single block represents seventeen 64K×1-bit dynamic RAM chips, one of which is represented by the block 642, all 17 being bussed together. The RAM address bit A0–A7 are provided by the bus 144 (FIG. 3(a)) whose individual lines are labeled B0–B7. The RAM memory address is time-multiplexed in that the lower eight bits of the address, which correspond to the row address, are loaded first and are latched by the row address select (RAS) output of inverter 644. Then, the higher order bits, i.e., address bits 8–15, are presented to the RAM and are latched by the column address select (CAS) line 646 going low at the output of inverter 648.

In the CPU mode, the source of the address is the CPU address bus 108 in FIG. 2(a). During the RAS cycle, the octal buffer 650 is enabled to present the lower half of the address bits, A$_1$–A$_8$, to the RAM address lines A$_0$–A$_7$. During the CAS cycle, octal buffer 652 is enabled to gate the upper half of the CPU address bits A$_9$–A$_{16}$.

The DMA mode requires sequential addresses from a CPU derived preset value. The sources of the DMA address are the 8-bit presettable counters 654 and 656, which are cascaded to form a single 16-bit presettable counter. To preset this counter, the CPU addresses the $\overline{\text{PRESET}}$ 0 line 657 and presents the preset value on the data bus. This causes the preset data to be latched into octal D-flip-flops 658 and 660. The $\overline{\text{PRESET}}$ 0 signal also propagates through AND gate 661 and inverters 662–665 to activate the S0 lines on counters 654 and 656. This acts as a Preset Enable which sets the counters to the values contained in the octal D-flip-flops 658 and 660. The $\overline{\text{CONTINUE}}$ line 666 going low will also preset the counters.

The 8-bit presettable counters 654 and 656 will be clocked when either input of AND gate 668 goes low. This can be caused by a $\overline{\text{PRESET}}$, a $\overline{\text{CONTINUE}}$ or by an $\overline{\text{INCREMENT}}$ at the end of the memory cycle, via the OR gate 670, the action of which will be described later hereinbelow.

If the $\overline{\text{DMA}}$ 0 line 672 is high, clocking does not change the state of the counter. However, if it is low, it forces a carry into the lower stage and the address is incremented.

Timing for the transition RAM cycle is provided by a delay line 674 and a programmable logic array (PAL) 676. The Boolean equations for this PAL are provided in the appendix to this application.

There are five different types of memory cycles which can be executed; CPU Read, CPU Write, DMA Read, DMA Write and Refresh. The memory cycle is initiated by setting flip-flop 677 to initiate a CPU cycle or setting flip-flop 678 to initiate a DMA Write cycle or by setting flip-flop 679 to initiate a DMA Read cycle. Any of these actions causes the CK output of PAL 676 to go high, thus setting flip-flop 680 and initiating the propagation of a pulse down the delay line 674. The output taps on the delay line 674 provide the leading edge of a timing pulse at 50, 100, 150 and 200 nanoseconds after the leading edge of the output from flip-flop 680. These particular times are referred to as T0–T4 in the subsequent discussion.

If either DMA READ or DMA WRITE lines have been selected, the PAL output enable low ($\overline{\text{OEL}}$) will be high from T0 to T2, to enable the outputs of counter 656 for the lower half of the DMA address. At the time tap 1 of the delay line goes high, it propagates a signal through inverter 644 to cause the $\overline{\text{RAS}}$ line to go low and latch the row address in the DRAM 640. The trailing edge of the tap 1 pulse will subsequently increment the DMA counter via NOR gate 670 and the AND gate 668 if the $\overline{\text{DMA}}$ 0 line 672 is low. The output enable high (OEH) signal is high from time T2 to T4 and causes the higher order bits of the DMA address to be enabled from counter 654. At T3, the leading edge of the T3 or tap 3 pulse, propagates through inverter 648 to cause the $\overline{\text{CAS}}$ line 646 to go low, thereby completing the memory address cycle.

For a DMA Write cycle, output $\overline{\text{W}}$ of PAL 676 on line 681 will be low, causing the data present on the transition data bus 140 (FIG. 3) to be written into the RAM. On a DMA Read cycle, the output W of PAL 676 will be high, causing the data in the addressed word of the RAM to be placed on the transition bus 140. In the DMA mode, output $\overline{\text{CL2}}$ will go low at time T4, resetting the flip-flop 680 and thus propagating a trailing edge to delay line 674. When this trailing edge reaches tap 1, output $\overline{\text{CL1}}$ also goes low to reset flip-flop 677 or 675, 678 or 679, via AND gate 682 and OR gate 683 to terminate the memory cycle.

A REFRESH PAL 683 generates a write request (WR REQ) on line 684 for a variety of input conditions which are labeled on the lines entering the left side of the PAL 683.

For a transition RAM Write cycle, the write bits are placed on local bus 136, bits E0–E15 being loaded on the first 16 bits of the RAM data word. For a write cycle the $\overline{\text{W}}$ output of PAL 676 is low, thus the output of AND gate 685 is a zero. If the parity for the bits on E0–E8 is odd, the output of the parity generator 686 will be a one. Odd parity means that there are an uneven number of 1's in that part of the word. The output is combined with the bits E9–E15 and a parity generator 687 to generate odd parity at its output, representing the parity of the entire 16-bit word. This is written as data into the 17th bit of the RAM memory word.

On a Read cycle, the $\overline{\text{W}}$ line 681 is high, thus the data output from the parity bit propagates through AND gate 685 and is combined with the other 16 bits to establish the parity generation. If any of the bits in the word are not identical to what has been written, including the parity bit, the "even" output of the parity generator 686 will be low and will cause the flip-flop 690 to reset, thus generating a parity interrupt to the processor. This space is cleared by the CPU addressing the parity error clear line 692 which goes low to set the flip-flop 690.

During a Write cycle, the data input to flip-flop 693 is low such that the leading edge of the signal emanating from tap 3 of the delay line 674 through inverters 688 clears the flip-flop 693, disabling AND gate 689. This assures that the parity check is made only in the Read cycle. Data is gated between bus 136 and 138 by the bidirectional buffers 694 and 695. Data flow is enabled when either of the inputs of OR gate 696 go low, and the lines DT/R signal on line 697 determines the direction. When this line is high, data is transferred from the bus 138 to 136 and when it is low data is transferred from the bus 136 to 138.

FDKB PARALLEL-TO-SERIAL, SERIAL-TO-PARALLEL AND RV LOAD CIRCUITS

Figure 15A:
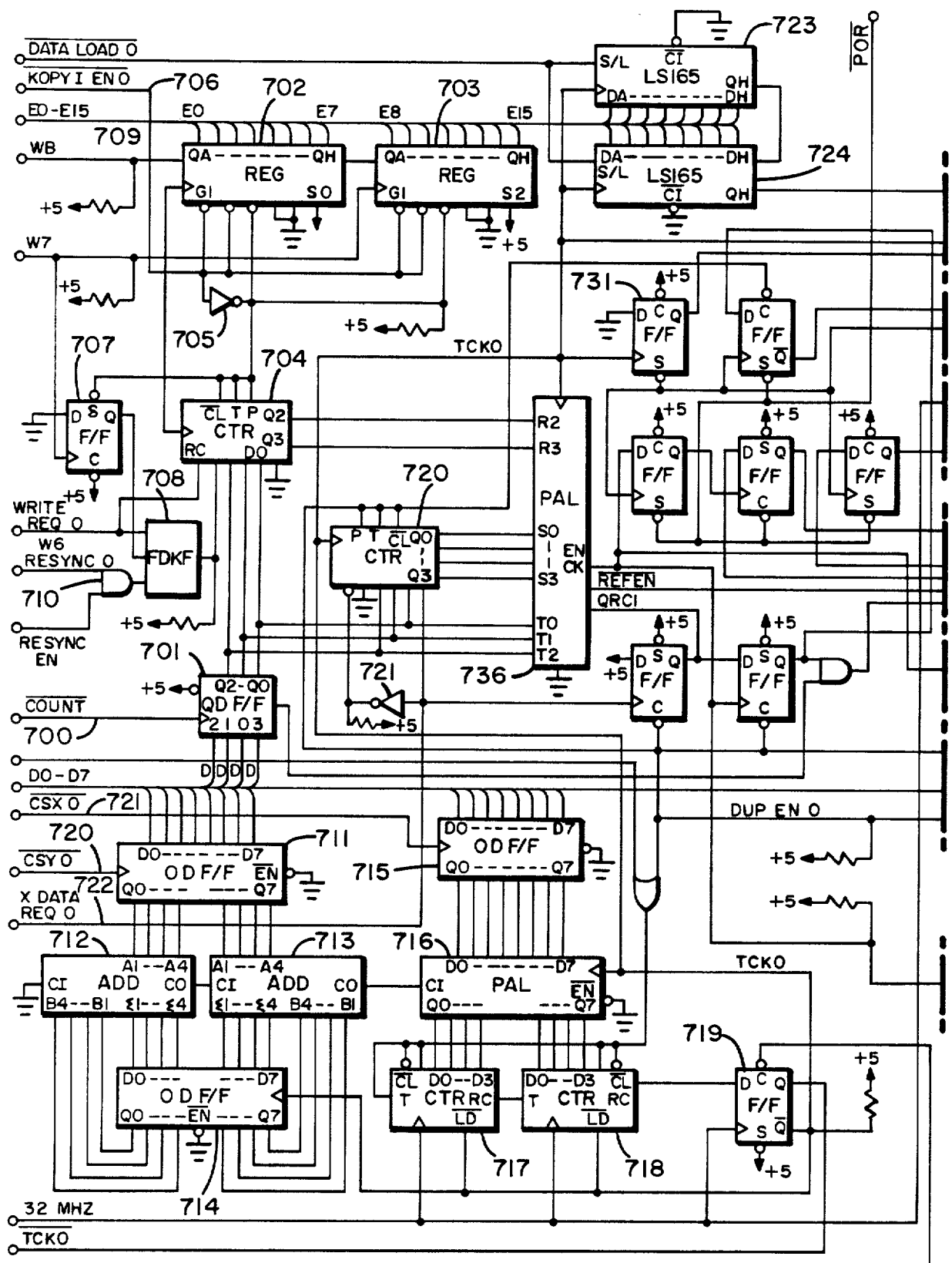
Figure 15B:
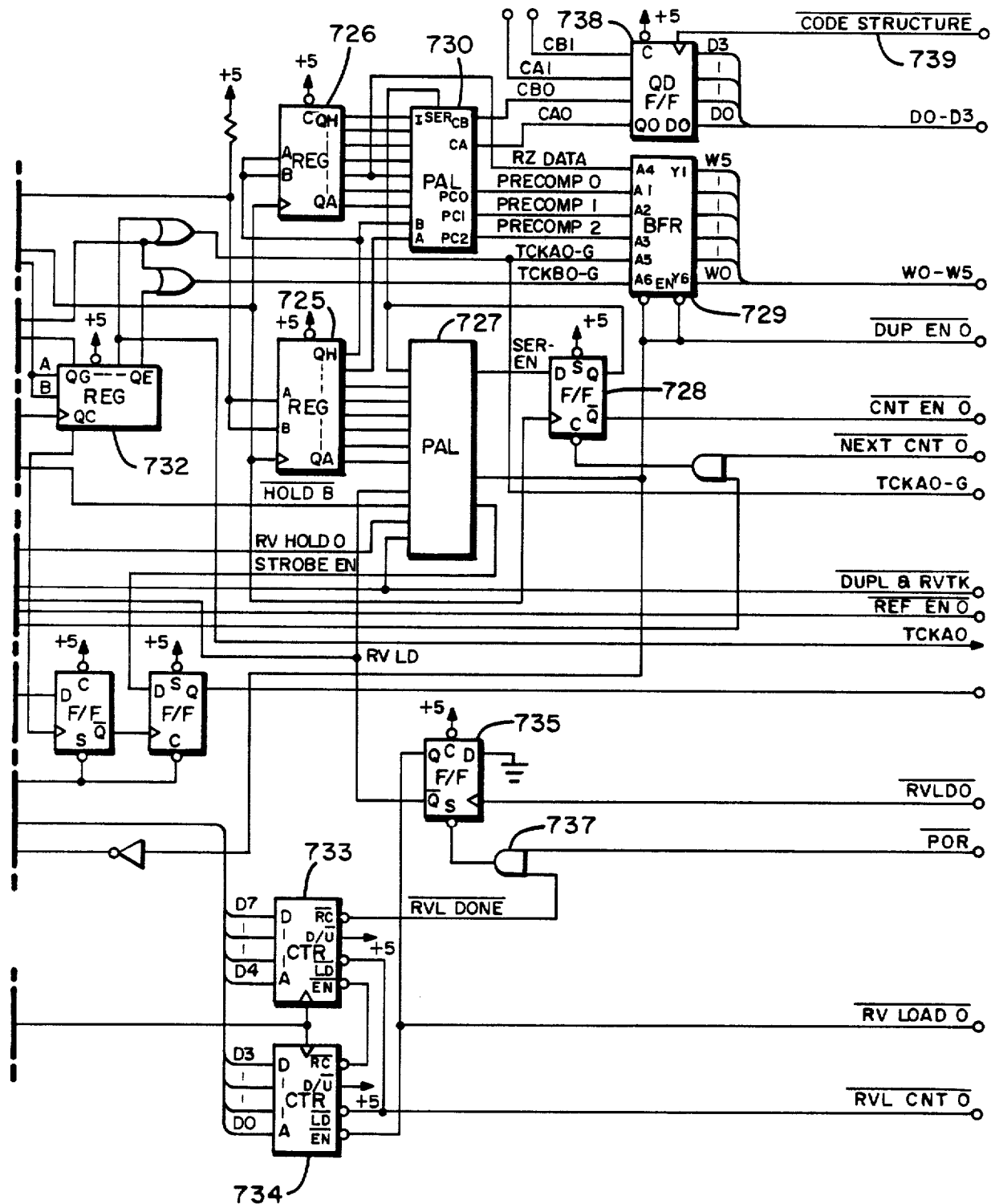

FIG. 15 shows a detailed logic diagram of the FDKB parllel-to-serial, serial-to-parallel converter and read verify load circuitry.

To copy data from the disc to the transition RAM, the Kopy I mode, it is necessary to assemble the serial data into words of a specified length and transfer the entire word in parallel into the transition memory. The length of this word can be programmed to be anything between 9 and 16 bits. When the CPU selects the COUNT line 700, the lower 4 bits of the data bus are latched into quad-D flip-flop 701. The value placed in this register is programmed to be 16 minus the length of the word to be assembled, e.g., for a 10 bit word, the count in 701 would be 6. Eight bit shift registers 702 and 703 are cascaded to form a 16 bit register into which the serial data will be assembled. Shift registers 702, 703 and presettable counter 704 are all held clear by the output of inverter 705 until the KOPY I EN0 signal on line 706 goes low indicating the beginning of a copy cycle.

Serial data and its associated clock come across the way interface on bit lines W8 and W7, respectively. Each clock pulse shifts the serial data to the right in shift register 702, 703. Inverter 705 also holds flip-flop 707 in the set position prior to the copy cycle. The first clock pulse clears flip-flop 707, disables AND gate 708, releasing the "load" signal on presettable counter 704 such that it will increment with each clock pulse. Thus, counter 704 has been preset to the count programmed into register 701.

When counter 704 overflows, the ripple carry output generates a Write Request, which causes the data on the bus 709 to be loaded into the transition RAM memory. At the same time, AND gate 708 is temporarily enabled to preset counter 704 to the value held in latch 701. This cycle repeats with the words being assembled sequentially in the transition RAM until the Kopy I cycle is complete.

The serial data is generally not continuous across sector gaps. The data separator loses synchronization and generates a re-sync signal and starts again at the beginning of valid data. Such a re-sync signal can be transmitted back across the Way on bit 4 to propagate through AND gate 710 and AND gate 708 to generate a load of counter 704. In this way, the framing is also re-synchronized on each re-sync.

When transferring data from the transition RAM to the disc, things are more complicated in that not only does the data have to be unpacked in words of specified length, but it has to be done at a rate that is synchronous with the reference clock frequency of the diskette. The programmable clock frequency is derived by circuit components 711-719 in a fashion to be described.

Octal flip-flops 711 and 715 contain the digital values which determine the clock frequency. They are loaded from the data bus when the CPU selects the CSY0 signal or the CSX0 signal lines 720, 721 respectively. The conventional way of building a programmable clock is to use a fixed frequency and divide that down by digital value repeatedly loaded in a presettable counter.

The approach used herein achieves a higher effective frequency resolution or accuracy than can be achieved with integer division techniques.

Register 715 contains the whole number part of the programmable diviser while register 711 contains the fractional part of the diviser. The clock frequency to be divided down is the 32 megahertz clock derived from a crystal oscillator. Four bit presettable counters 717 and 718 are cascaded to form a 8 bit presettable counter. They are continuously clocked by the 32 megahertz clock. When the counter overflows, the ripple carry output causes the D flip-flop 719 to set for one clock cycle during which it generates the preset enable for counters 717 and 718. The source of the data for the preset is register 715 with a count adjustment performed by the decrementer PAL 716. Each time the counters 717 and 718 are preset, the octal flip-flop 714 is also clocked. The data inputs to this flip-flop are its previous state plus the fractional count contained in register 711. This repeated addition will periodically generate a carry-out signal from the 8-bit adder comprising the cascaded chips 712 and 713.

The carry-out signal generates a carry-in input to the 7-bit decrementer PAL 716. The logic of this PAL is such that the presence of a carry-in adjusts the preset value to a count for the fractional value in flip-flop 711. The resultant programmable clock frequency at the output of Q of 719 is the signal TCK0.

Presettable counter 720 manages the framing of the data is a manner similar to counter 704. Each overflow of the counter causes a preset enable via inverter 721 and the value of the preset is determined by the count in register 701. The ripple carry also generates an X DATA REQ O signal on line 722 which puts the next word from the transition RAM onto the bus 709. The 8-bit shift registers 723 and 724 are cascaded to form a 16-bit shift register. The DATA LOAD signal from the transition RAM causes a parallel load to all 16 bits into these registers at the beginning of each word. The TCK0 signal continuously clocks the data such that there is an uninterrupted stream of data from the Q7 output of shift register 724. Eight bit shift registers 725 and 726 are cascaded to form another 16-bit shift register which follows the previous one. Data out of 724 is shifted into 725 and from 725 into 726.

The bit pattern 1000001 is an illegal pattern in all recording codes. Therefore, it can be inserted in the data stream to flag the generation of a monogram. When this pattern is shifted into the positions QA through QG of shift register 725, the output of PAL 727 causes flip-flop 728 to set generating the CNT EN0 signal which initiates the monogram function. The QC output of shift register 726 is the RZ data and goes to input I4 of a hex buffer 729. The write precompensation encoder PAL 730 computes a 3-bit precompensation code on the basis of the states of the neighboring adjacent bits, 4 bits ahead and 4 bits behind the RZ data bit. The RZ data, its associated precompensation code and the clock signals TCKA0-G and TCKB0-G are transmitted over the Way interface W0-W5.

The TCKL A and TCLK B signals are generated in the following manner. Prior to the leading edge of the TCK0, clock flip-flop 731 is set. The leading edge of the TCK clock sets flip-flop 731 which provides a 0 at the DIN terminal of shift register 732. This shift register is clocked by the 32 megahertz clock and 6 clock pulses later, output Q6 high to again set flip-flop 731. Output Q0 of shift register 732 provides the TCKA0-G clock while output Q4 of shift register 732 provides a clock of the same width but delayed approximately 125 nanoseconds. These delays assure that the data is stable at the destination before the clocks arrive.

Presettable counters 733 and 734 are cascaded to form a single 8-bit presettable counter which contains the number of words that will be pre-loaded into the FDFM FIFO to start the read verify cycle. Counter 734 is enabled to begin counting when the computer selects the RV LOAD line to clock flip-flop 735 to the cleared state.

When the reference enable (REFEN) signal goes low, control PAL 736 is enabled such that the output ENCK generates a pulse for the beginning of each word, i.e., when counter 720 overflows. Each of these pulses clocks counters 733 and 734. When counter 733 overflows, the flip-flop 735 is set via AND gate 737 to terminate the read verify load cycle.

The quad-latch 738 loads the code structure word when the CPU selects the CODE STRUCTURE line 739. Bits 0 and 1 provide three combinations of precompensation code for the 0 side circuitry, while bits 2 and 3 provide the corresponding information for side 1 circuitry.

FDFM WRITE CIRCUIT

Figure 16A:
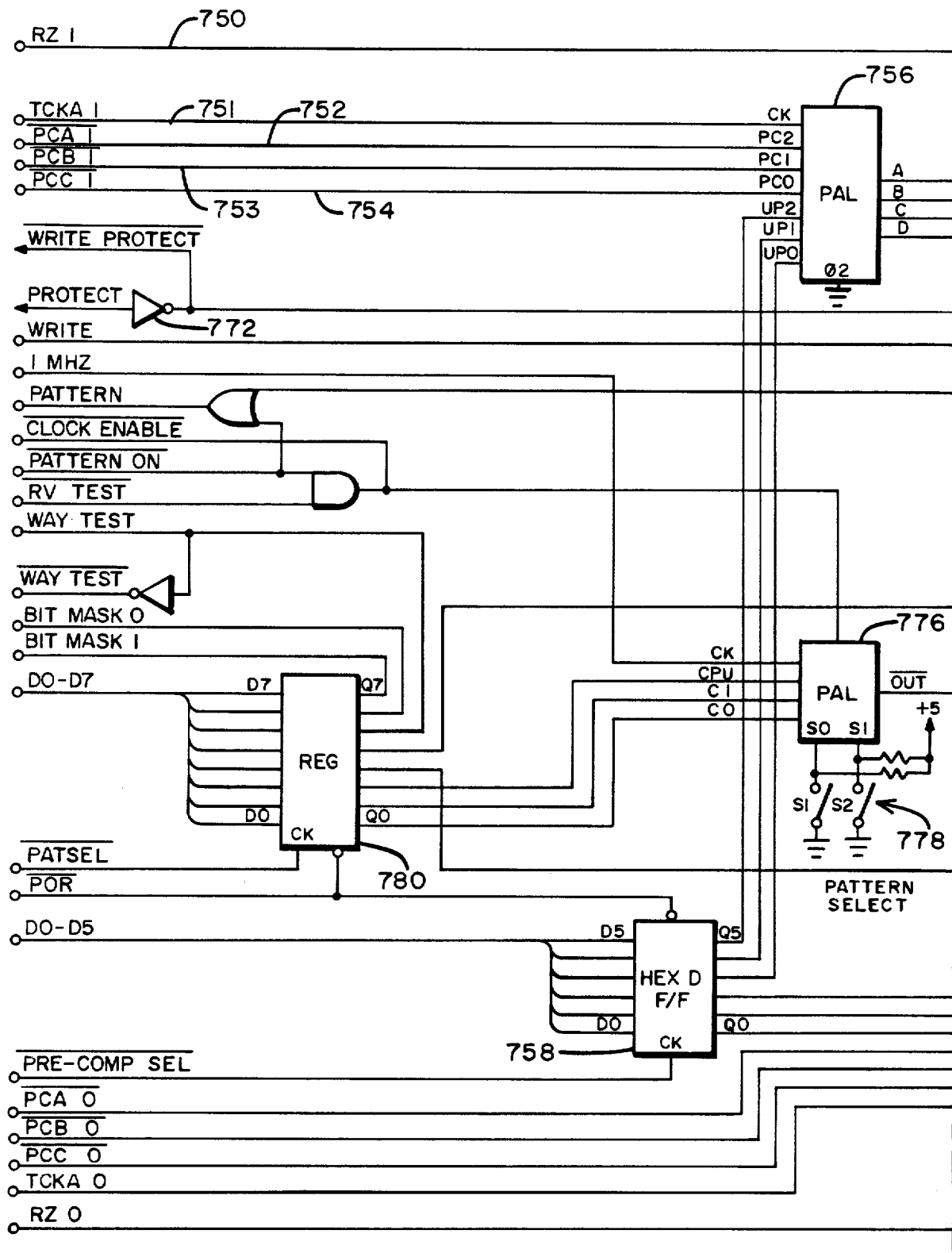
FIGS. 16-23 are logic diagrams showing details of specific sections of the FDFM module.
Figure 16B:
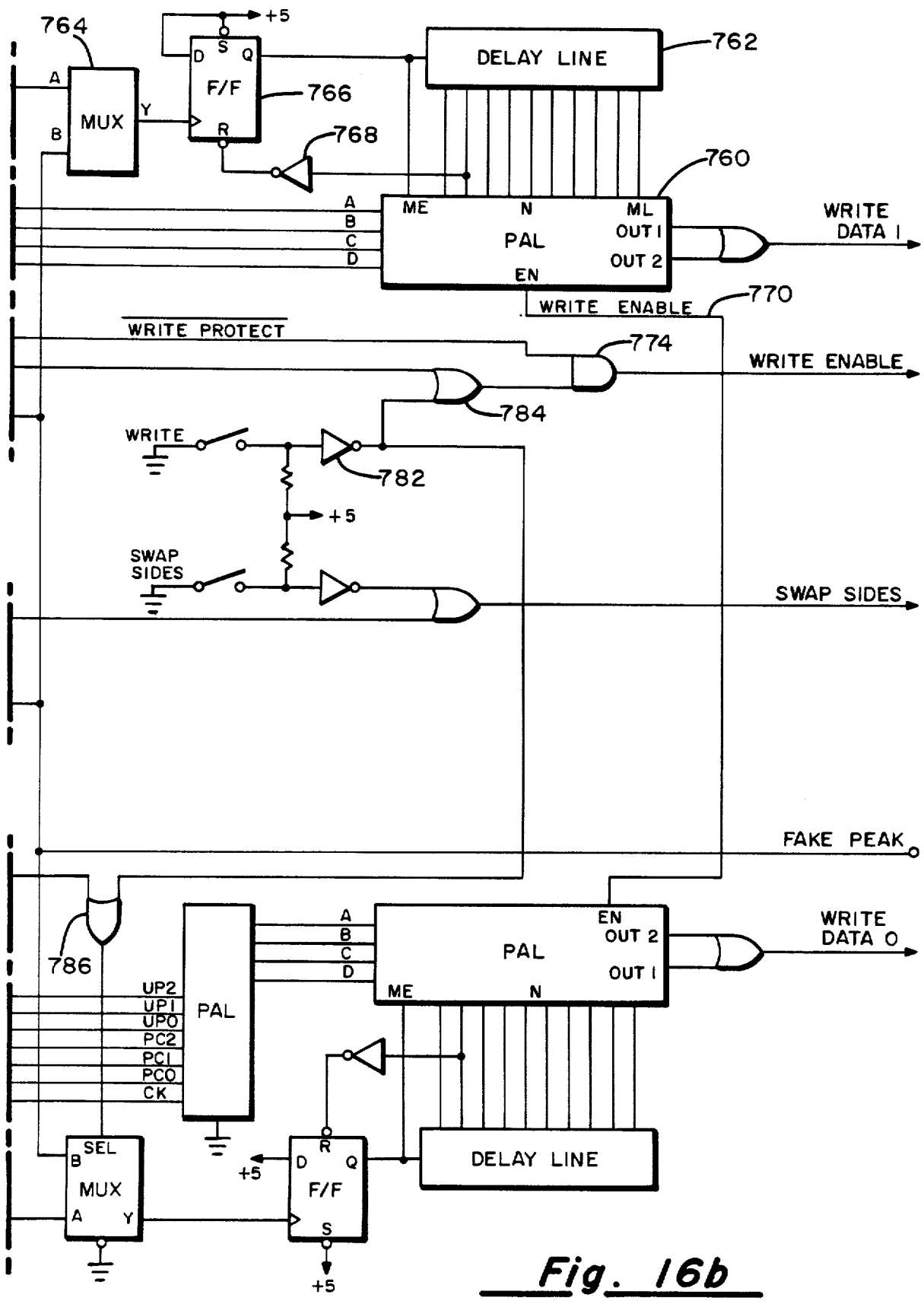

FIG. 16 illustrates the detailed logic diagram of the FDFM write circuit control board. In normal operation, the write data is communicated via the Way on lines 750-754. The signal TCK A is the clock for the RZ data and its associated precompensation bits, A, B and C. The amount of precompensation which is to be associated with each precompensation code is determined by the precompensation PAL 756. The register 758, which can be loaded from the CPU via the precomp select line and the data bus from the Way interface, contains three bits of code which represent the type of precompensation to be employed for both the side 1 and side 0 portions of the Write circuit. The upper three bits from register 758 form the inputs 5, 6 and 7 of the PAL 756. The three bits of the microprocessor code and the three bits of the precompensation code are logically combined to provide a specific binary value of precompensation which is generated at the PAL 756 output A-D on the leading edge of the TCK A clock pulse. These outputs go to the select inputs of the 11-input multiplexer 760 to select one of 11 possible time positions for the delay line 762. The TCK A clock is staggered from the RZ data such that the input multiplexer is stable at the time of an RZ transition. The RZ signal propagates through multiplexer 764 to set the flip-flop 766 and propagate the pulse down delay line 762. The time relationship between the output of the multiplexer 760 and leading edge of the RZ data is now a function of the precompensation code generated by PAL 756. Tap number 2 on the delay line 762 resets flip-flop 766 via inverter 768 so that it is ready for the next RZ pulse. If the write enable line 770 is high, the output of multiplexer 760 is enabled and precompensated write data is sent to the write circuitry. A low signal to the input of inverter 722 will disable AND gate 774 and disable the write operation.

Pattern generator PAL 776 is capable of generating four unique test patterns useful for diagnostic purposes. The test pattern can be selected via either the switches 778 which control the S0 and S1 inputs to the PAL or via the CPU in the FDKM via a bit register 780. The CPU can cause this register to be loaded with data from the data bus by selecting the pattern select (PATSEL) line. If the output from the third stage of the register 780 is a "1", the CPU overrides the manual switches in determining the test pattern selection. The write switch at the input of inverter 782 allows the test pattern to be actually written to the drive. The AND gate 774 is enabled by way of OR gate 784 to generate the Write Enable and OR gate 786 causes the B-input, i.e., the test pattern data, of multiplexer 764 to be sent on to clock the flip-flop 766. Bit 4 of the 8-bit register 780, when set to a "1", will swap sides of the read/write heads. Bit 5 of the register 780 can be set to generate to a Way test, while bits 6 and 7 thereof are set to provide four combinations of bit mask for the read verify correlator for sides 0 and 1.

FDFM DATA SEPARATOR

Figure 17A:
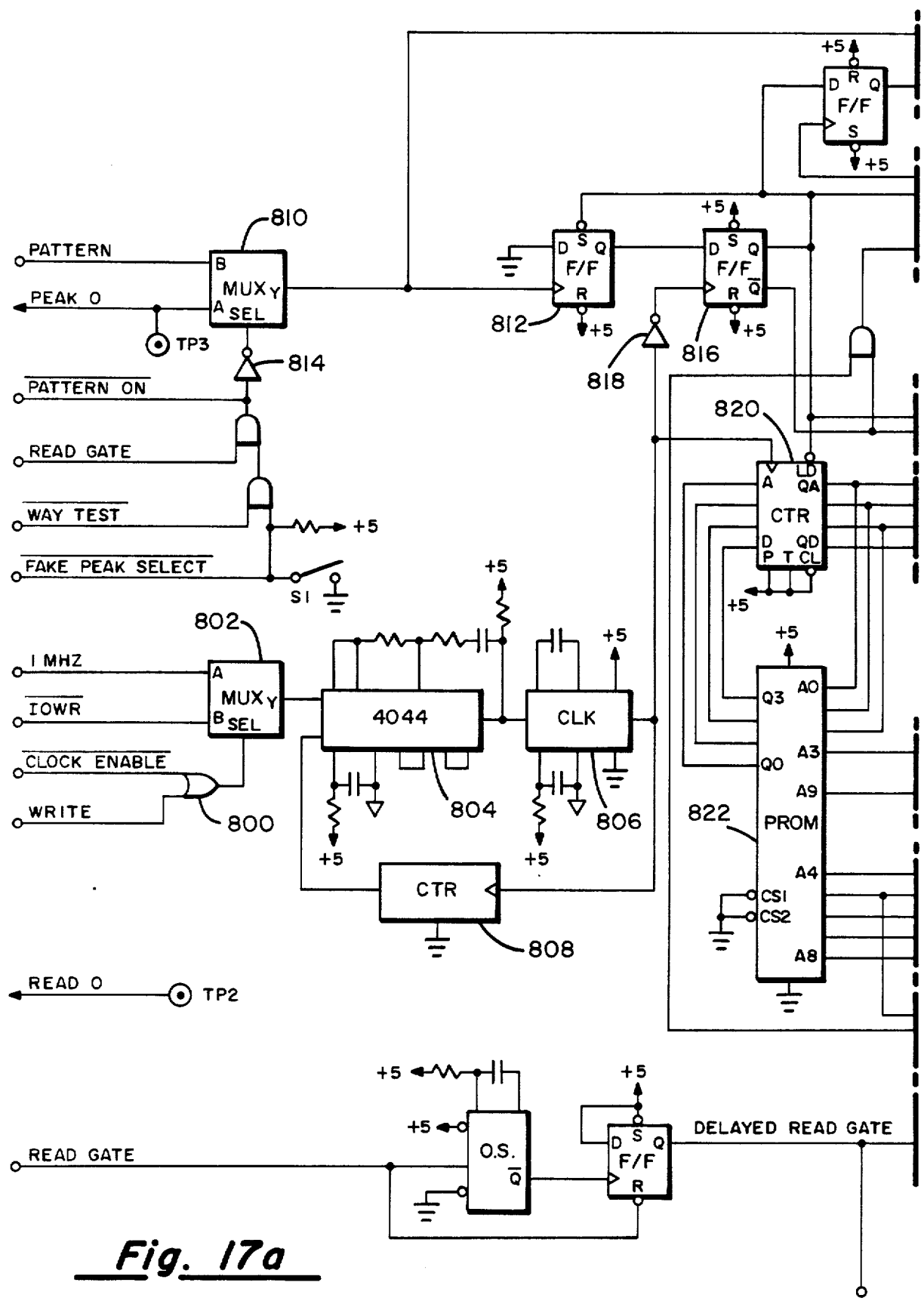

FIG. 17 is a detailed logic diagram of the FDFM data separator. The reference clock is selected via the OR gate 800 which routes either the 1 MHz clock or the signal, IOWR, through multiplexer 802. The circuits 804, 806 and 808 form a phase-lock loop which multiplies the reference clock by 16. In the following discussion, the period of the clock signal coming from the phase-lock loop, i.e., out of the VCO 806, is referred to as the window segment, that is, a 1/16th of the time interval of a window.

Normally, read data propagates through multiplexer 810 to clock the flip-flop 812. Alternatively, test pattern data can be selected via inverter 814. The flip-flops 812 and 816 resynchronize the read data to the 16× clock. The leading edge of the read data pulse clocks the flip-flop to a cleared position, since the data input is zero. The next segment period that inverter 818 goes positive, the flip-flop 816 is clocked, thus clearing it and causing the flip-flop 812 to be set. Now, one segment later, flip-flop 816 will again be clocked. This time the D-input is high and the flip-flop returns to its Set condition. Thus, there is produced at the output of the flip-flop 816 a one segment wide pulse which is resynced to the data.

The presettable counter 820 is continuously incremented by the 16× clock. The re-synced data pulse causes the counter 820 to be preset to the outputs Q0-Q3 of the programmable read-only memory (PROM) 822, while the current state of counter 820 is latched into register 824. The purpose of the PROM 822 is to apply a correction count if the presettable counter has drifted in phase from the Read signal. If it is exactly in phase, the PROM will preset the counter with the value 0000, which would have been the next state if it had just simply been free-running. When flip-flop 816 is clocked back to the Set condition, register 826 is clocked, putting the four bits of the register 824 into bit position 0-4 and putting the outputs of stages Q2 and Q3 of the register 826 into bit positions 4 and 5. Thus, at the time of each load of the counter 820, the address inputs of the PROM 822 are as follows:

Address lines 0-3 are set to the current count of the counter 820;

Address bits 4, 5 and 6 are set to a value representing one-half of the previous count;

Address bits 7 and 8 are set to a value equal to one-fourth of the count two intervals previous.

PROM 822 is programmed such that the outputs Q0–Q3 equal the sum of these three values, thus providing a correction to counter 820 to maintain it in phase with the read data. If the KOPY II EN line 828 is high, the output from the PROM 822 is simply the values A0–A3 plus 1. Thus, there is no correction applied to the counter. It is allowed to free-run, which is the condition desired for the blind-copy mode. In the blind-copy mode, it is not intended that the data be recovered, but merely the particular clock segment be identified in which a transition has occurred. By allowing the counter to free-run and transmitting the count contained in the presettable counter 820 to the Way via latch 824, the data can be recovered by analyzing the pattern of that data which will be located in the transition RAM. The CPU loads the bit margin value into the quad D flip-flop 830 by selecting CSBM 0 line 832. When flip-flop 816 resets, it also clocks flip-flop 834 which latches the state of AND gate 836. If the counter is lagging behind the data by more than the count stored in the register 830, its output will be low. Either condition will cause a zero to be latched into flip-flop 834 which, in turn, will cause the flip-flop 838 to illuminate the margin error indicator 840 via inverter 842. The output $Q_d$ of counter 820 thus is the recovered clock. That is, it is the clock which is separated or recovered from the data and which is then used to clock the data through inverter 844 and 846 and flip-flop 848.

The output QI goes through inverters 844 and 846 to the e,ovs/Q/ of flip-flop 848 which generates the edges of the window or recovered clock. The flip-flop at 850 is set to 0 at the edge of the window, and to 1 if a flux reversal occurs in the window. The output of the flip-flop at 850 feeds the flip-flop at 852 which outputs 0 for no flux reversal and a 1 for a flux reversal during the previous window.

READ VERIFY

Figure 18A:
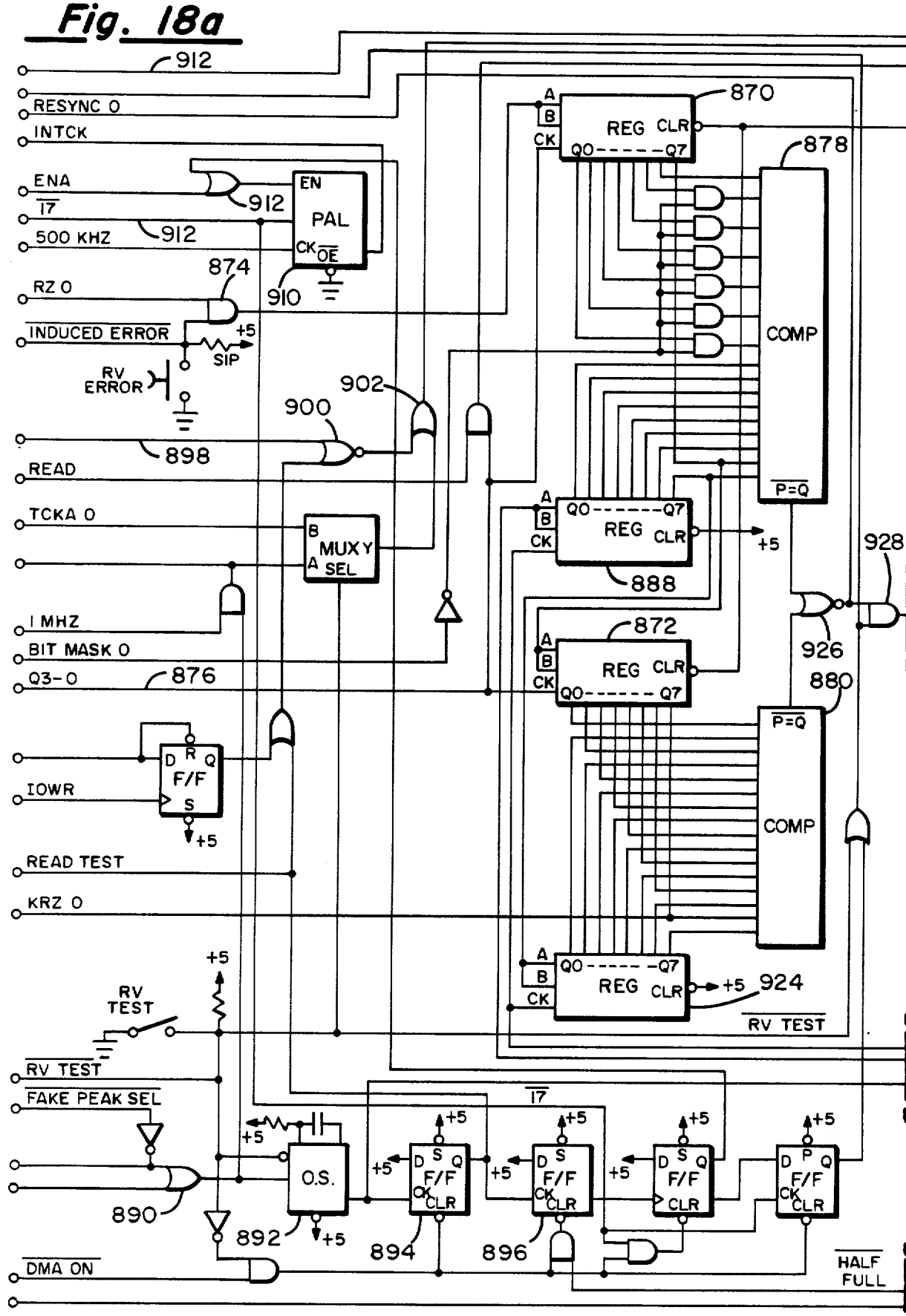
Figure 18B:
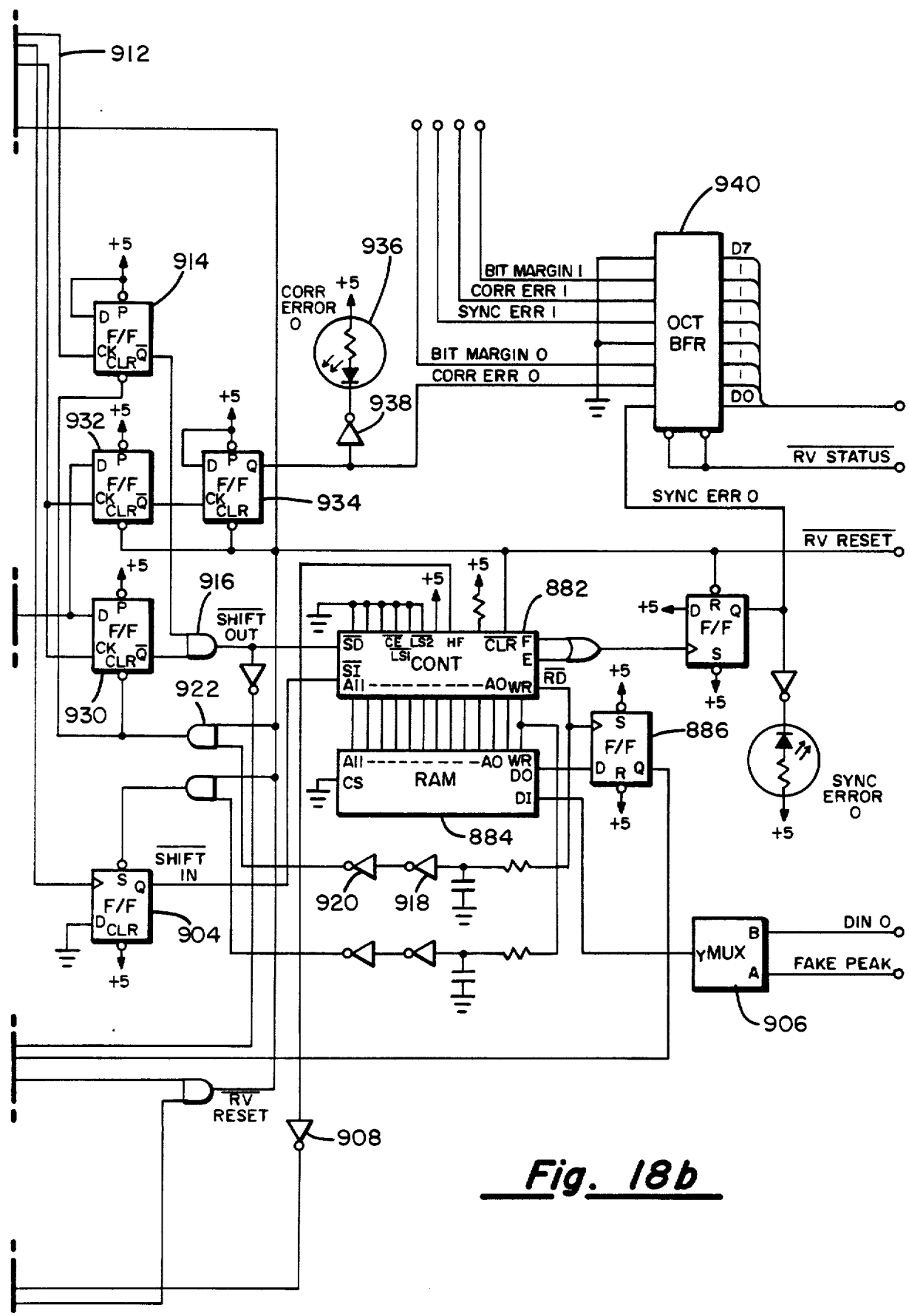

Referring next to FIG. 18, there is shown the detailed logic diagram of the FDFM read verify circuit. It includes two 8-bit shift registers 870 and 872 which are cascaded to form the 16-bit Read Data shift register corresponding to the circuit 420 in FIG. 10(a). Return to Zero (RZ) data propagates through AND gate 874 and is continuously clocked through the Read Data shift register by signal Q3-0 on line 1 876. The comparators 878 and 880 are cascaded to form the 16-bit comparator or correlator corresponding to the block identified by numeral 416 in FIG. 10(a). A FIFO controller 882, the RAM memory 884 and the flip-flop 886 correspond to the FIFO controller 408, RAM 410 and D-flip-flop 414 in FIG. 10(b), respectively. Data out of the elastic buffer is propagated through flip-flop 886 and into the data inputs of the shift register 888.

The RV 0 signal on line 898 propagates through NOR gate 900 and OR gate 902 to clear flip-flop 904 and enable the shift-in of data to the RAM buffer 884 by means of the FIFO controller 882. Data input is via the B-input of multiplexer 906. The ENA input enables the PAL circuit 910 via OR gate 912. This PAL is programmed in accordance with the equations shown in the appendix hereto. This PAL functions to create a signal to which remains low for 17 cycles of the internal clock which forms a part of the sequencer yet to be described.

The internal clock re-enters the logic of FIG. 18(a) on line 912 and is used to clock the flip-flop 914 to the Set condition, which causes the $\overline{Q}$ output to go low resulting in the output of AND gate 916 also going low, generating a shift-out command to the FIFO controller 882. The $\overline{RD}$ signal out of the FIFO controller 882 propagates through the inverters 918 and 920 as well as through AND gate 922 to reset the flip-flop 914. Thus, each leading edge of the internal clock causes a bit to be shifted out of the buffer and into the correlation register. After 17 shifts, the 17 signal out of the PAL 910 goes high, stopping the shift-out process. The 16-bit word now in shift registers 888 and 924 corresponds to the data pattern that will signal the beginning of the track.

When a 16-bit correlation is detected, both inputs to NOR gate 926 will be low, causing its output to go high, thus enabling AND gate 928. The next Q3-0 clock pulse on line 876 not only clocks the shift registers 870 and 888, but also sets flip-flop 930 to cause a shift-out of data from the buffer RAM. The flip-flop 930 is reset in the same manner that flip-flop 914 was reset. The result is that as long as there is a correlation between the two shift registers, they will shift in synchronism, both off of the same Q3-0 clock. The first time that flip-flop 930 sets, flip-flop 932 is also set, causing its Q line to go low. If correlation is lost before the end of Read Verify cycle, the data input to flip-flop 932 goes low. The flip-flop is then clocked to a Zero state, causing flip-flop 934 to set, indicating a correlation error. This lights the Correlation Error indicator 936 via inverter 938 and also provides an input to the octal buffer chip 940. This allows the CPU to determine the Read/Verify status by selecting the $\overline{RV\,STATUS}$ and causing the inputs of the octal buffer 940 to be captured on the data bus. This register allows the information on the bit margin, the correlation error and the sync error to also be sensed.

Figure 17B:
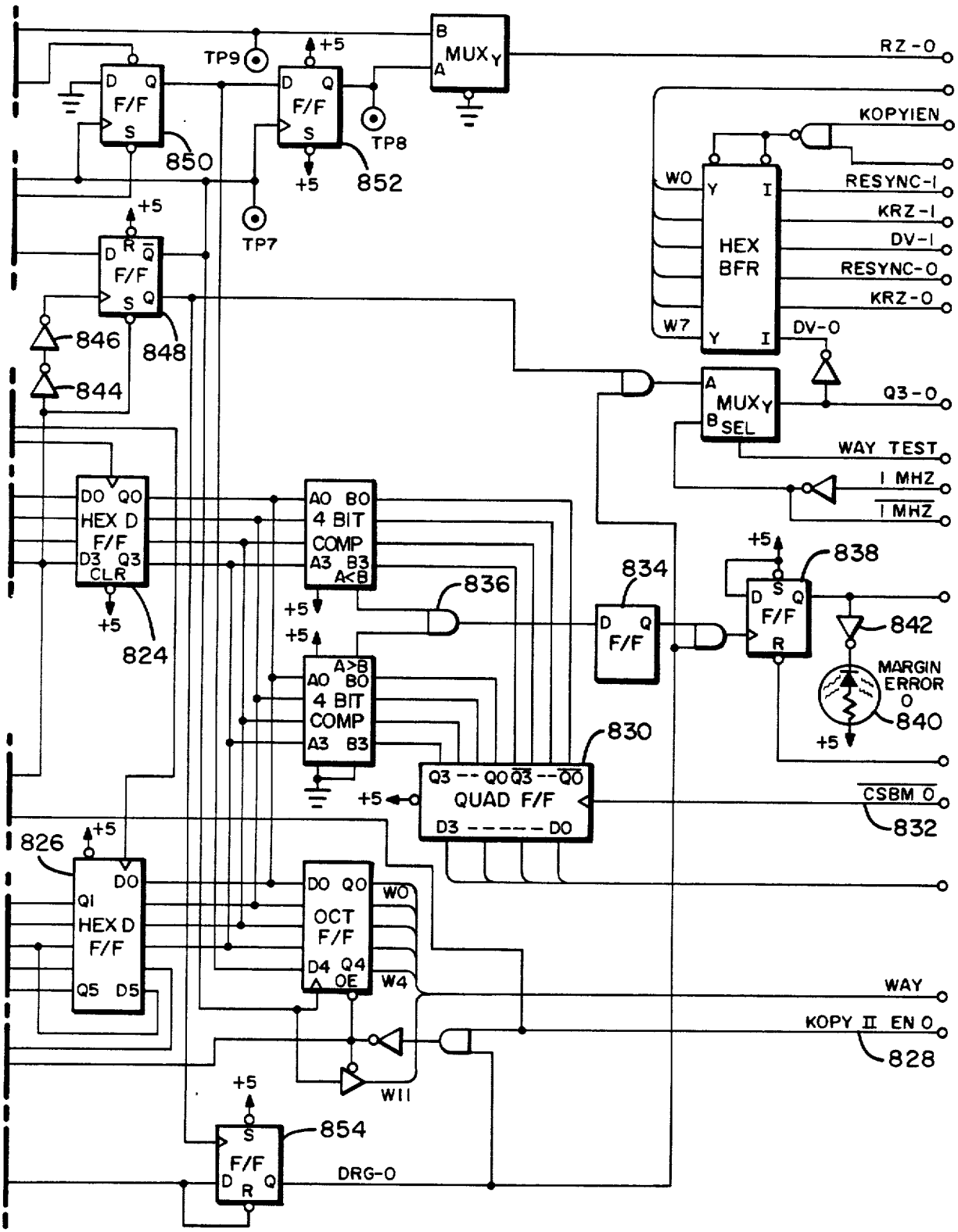

A delayed read gate is synchronized to the window edge output at 854 (FIG. 17(b)) and enables the Read Verify sequence.

SEQUENCER

Figure 19A:
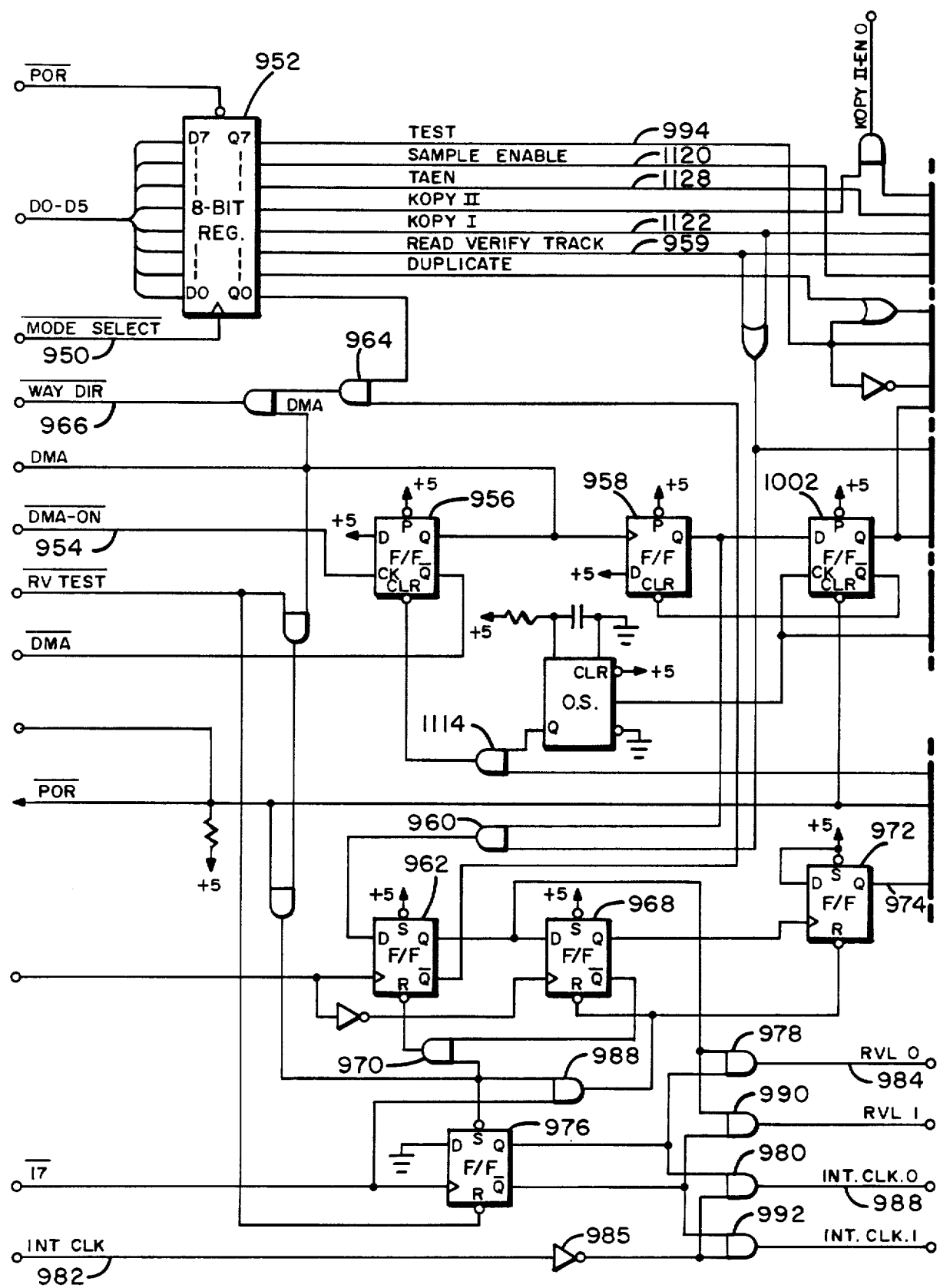
Figure 19B:
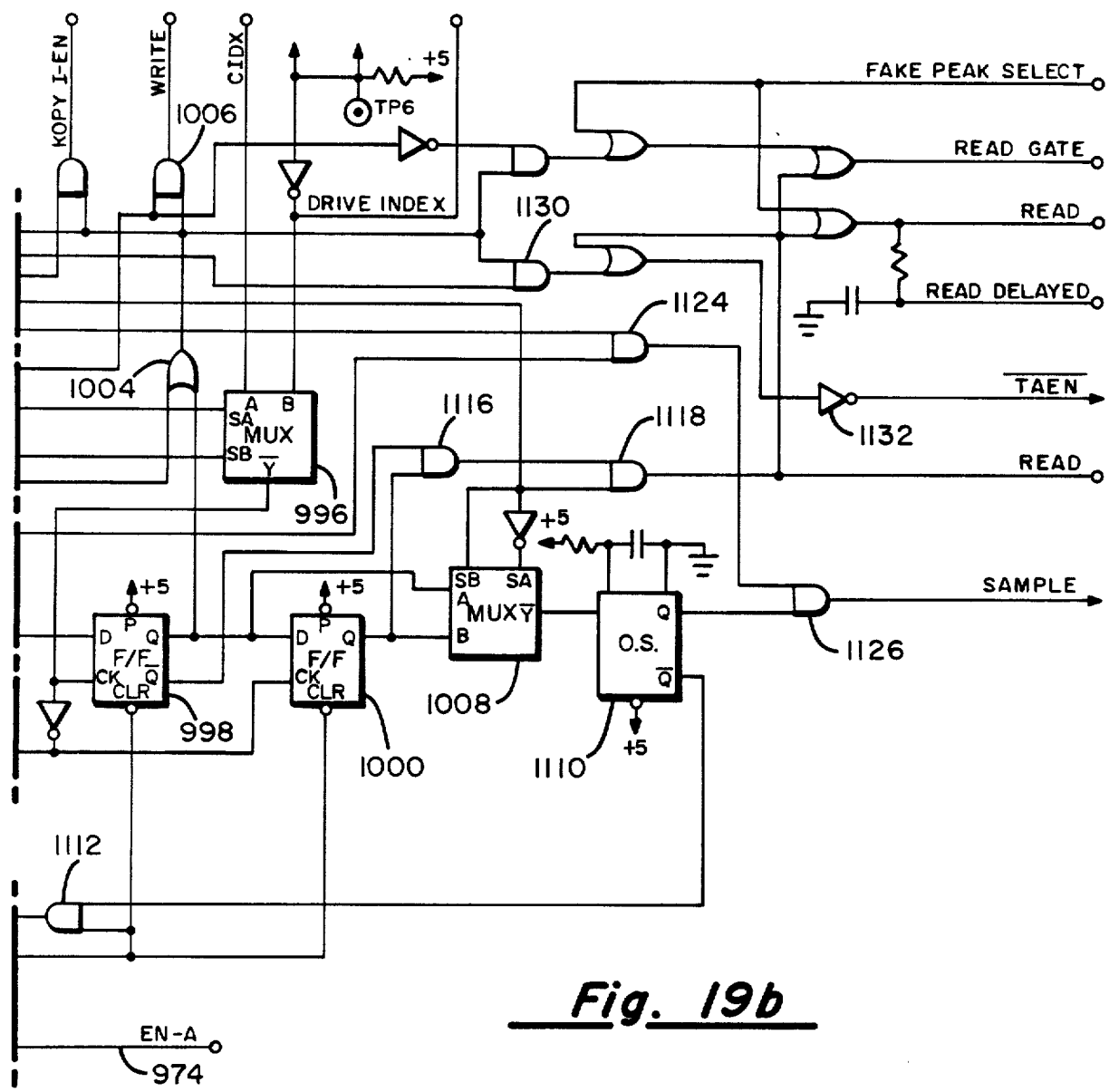

FIGS. 19(a) and 19(b) together show a detailed logic diagram of the FDFM control board sequencer. This circuitry controls the overall timing of the FDFM. The CPU determines the mode of operation of the sequencer by addressing the mode select line 950 causing the data on the data bus to be loaded into the 8-bit register 952. These eight bits define the operating mode of the FDFM. There are three basic modes of operation. The first is the KOPY I or KOPY II mode in which there is a step cycle where a new track is accessed and a Read cycle, each requiring one revolution of the disk. The second mode of operation is a Duplicate cycle which involves a step cycle revolution and a write cycle revolution of the disk. The third is the Read Verify which requires a step cycle, a write cycle and a read-verification cycle.

Considering first the Read Verify mode, the CPU initiates this cycle by addressing the $\overline{DMA\text{-}ON}$ line 954. The trailing edge of the signal sets flip-flop 956 which clocks flip-flop 958 to the Set state. With the read verify track line 959 high and the flip-flop 958 set, AND gate 960 is enabled. Thus, on the leading edge of the next Address Latch Enable signal from the CPU, flip-flop 962 is set. While this flip-flop is set, the gate 964 is disabled causing the $\overline{\text{WAY DIR}}$ line 966 to go high and reverse the Way direction to go from FDFM to FDKM. This feature is used during the copy mode when a sync word is loaded out to the slave.

On the trailing edge of the Address Latch Enable signal, flip-flop 968 is clocked to the Set condition and flip-flop 962 is reset via AND gate 970. The Q-output of flip-flop 968 clocks flip-flop 972 to the Set state, causing the Enable A line to go high. This enables the output of the PAL 910 on the Read Verify circuit (FIG. 18(a)) such that the 500 KHz clock appears at the output. With flip-flops 962 and 976 set, AND gates 978 output at 984 enables read verify load for side 0. With the flip-flop 976 set, the output of the PAL arrives on line 982 as the Initial Clock (INTCLK), propagates through the inverter 985 and generates 500 KHz clock pulses on the Initial Clock 0 lines. The former signal shifts data out of the FIFO into the correlation register while the latter signal shifts data in to the FIFO buffer. At the end of 17 clock pulses, the correlation data is properly positioned in the correlation shift register and output 17 goes low to reset flip-flop 972 via AND gate 988 returns high to clock the flip-flop 976 to its Reset state. A second Address Latch Enable pulse generates a similar cycle, this time with the flip-flop 976 in the Reset condition such that the Read Verify Load (RVL) is performed on side 1 rather than side 0 with AND gates 990 and 992 enabled.

The state of the TEST line 994 determines the selection of multiplexer 996 to select either the contrived index or the drive index as a Timing Reference Index signal. The flip-flop 998 is clocked on the leading edge of the index while flip-flops 972 and 1000 are clocked on the trailing edge. Hence, on the trailing edge of the next index signal at the DMA ON command on line 954, flip-flop 1002 is clocked to the Set condition, enabling the Write command via OR gate 1004 and AND gate 1006 to start the write cycle. On the leading edge of the next index pulse, flip-flop 998 sets while on the trailing edge of the same pulse, the flip-flop 1002 resets while flip-flop 1000 sets. With the read verify track line high, the B-input to the multiplexer 1008 is selected so that the setting of flip-flop 1000 triggers one-shot 1110 which resets the flip-flop 956 via AND gates 1112 and 1114. At this time, OR gate 1004 determines the Write interval by enabling AND gate 1006, while AND gate 1116 determines the Read interval by enabling AND gate 1118. All other sequences or modes require only two cycles. In this instance, the read verify track line is low, causing the A-inputs of the multiplexer 1008 to be selected. Thus, the triggering of the one-shot 1110 to terminate the cycle occurs when flip-flop 998 sets, one revolution earlier. If the SAMPLE ENABLE line 1120 is high along with either the KOPY I line 1122 or the READ VERIFY TRACK line 969 also being high, AND gate 1124 is enabled such that the triggering of one-shot 1110 will also generate a sample pulse at the output of AND gate 1126 at the end of the Read cycle. If the Track Average Enable line (TAEN) 1128 is high, AND gate 1130 will be enabled during the time that either flip-flops 1002 or 998 is set to cause the output of inverter 1132 to go low, the result of which is to enable the capture of the Track Average signal.

FDFM STATUS CONTROLS

Figure 20A:
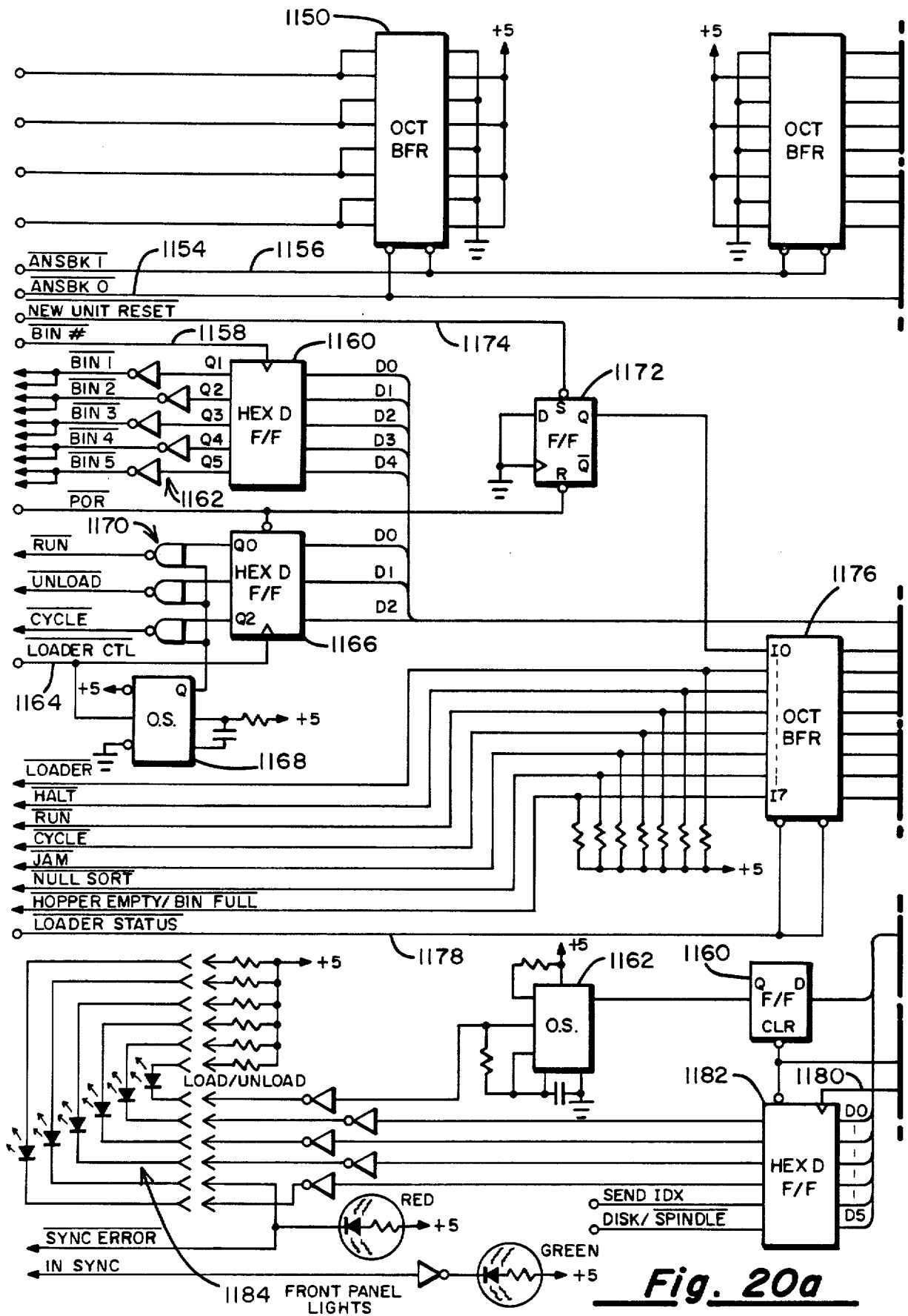
Figure 20B:
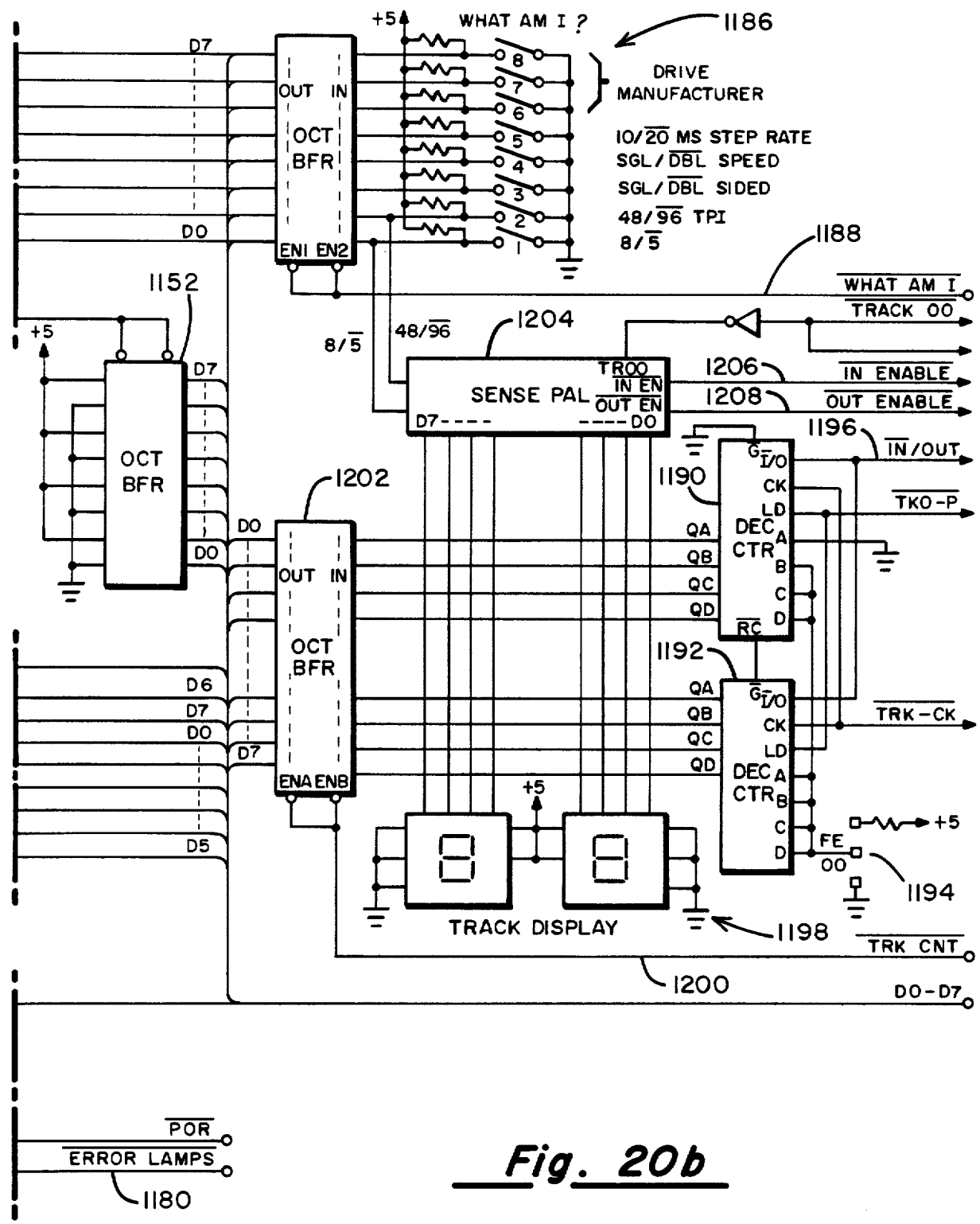

The logic diagram comprising FIGS. 20(a) and 20(b) illustrate the FDFM control board containing the circuitry for advising the FDKM and the user as to the status of the FDFM. The octal buffers 1150 and 1152 are used for diagnostic purposes to place test patterns on the Way interface. When the CPU selects the $\overline{\text{ANSBK1}}$ line 1154, a 0101 pattern is placed on bits 8-11 of the Way bus. At the same time, a 01010101 pattern is placed on the data bus. Selection of the ANSBK1 line 1156 provides the complement of these test patterns.

Selection of the $\overline{\text{BIN \#}}$ line 1158 causes data from the CPU to be loaded into register 1160 which controls the selection of the output bins on the autoloader slaves where diskettes are to be deposited after testing via the drivers which are indicated generally by numeral 1162. If data bit 5 is a binary "1" signal, the $Q_6$ output from register 1160 triggers the one-shot timer circuit 1162 to blink the Load/Unload indicator on the front panel of the module containing the control board.

Selection of the $\overline{\text{LOADER CONTROL}}$ line 1164 causes data from the CPU to be latched into register 1166 which controls the Run, Unload and Cycle portion of the diskette sorting system used. Details of the diskette handling, loading and sorting system are set out in the Johnson et al application, Ser. No. 402,841, filed July 29, 1982, and entitled HORIZONTAL FLEXIBLE DISK LOADING AND SORTING/COLLATING MECHANISM.

These commands are controlled by data bits D0-D2, respectively. Each time this register is clocked, one-shot 1168 is also triggered to generate a pulse of 3.3 milliseconds to enable the AND gates indicated generally numeral 1170.

On power-up, flip-flop 1172 is reset, if a new unit is put on line without a power interruption, a $\overline{\text{NEW UNIT RESET}}$ line 1174 goes low to set the flip-flop 1172, providing an indication on input $I_0$ of octal buffer 1176 that the unit is new on the line or that power has failed and come back on. The NEW UNIT line goes high when the FDKM strobes teh NEW UNIT RESET port.

When the CPU selects the $\overline{\text{LOADER STATUS}}$ line, the status of the new unit is signaled by way of the data bus to provide the CPU with complete status information on that newly added unit. The CPU can communicate error and status information to the operator by selecting the $\overline{\text{ERROR LAMPS}}$ line 1180 which clocks CPU data into a 6-bit register 1182 to selectively illuminate the front panel error/status LED indicators which are indicated generally by the numeral 1184.

The switches 1186 provide the CPU with information concerning the drive-type of the particular FDFM in question. The three upper switches allow the entry of a 3-bit code for designating the drive manufacturer. Additional switches, when open or closed, signify a step rate of either 10 or 20 milliseconds per step, whether the drive is single or double speed, whether single or double sided recording and whether 48 or 96 tracks per inch, and whether an 8 in. or a 5 in. diameter diskette is involved. When the computer selects the "WHAT AM I" line 1188, this status information is placed on the data bus.

The two 4-bit counters 1190 and 1192 are cascaded to form an 8-bit HEX counter. The drive control provides three signals to this counter with a Clock signal each time the heads are stepped, a Direction signal (in/out) and a Reference Position signal, TK0. This latter signal loads the counter to a Preset condition which is jumper-selectable via terminals 1194. The track counter is clocked each time the heads are stepped and the direction of count is determined by the e,ovs/IN/ /OUT signal on line 1196. Thus, the counter maintains a current count of the head position for the drive. This is displayed in a Hexidecimal (HEX) form on the 7-segment track display 1198. When the CPU selects TRK CNT line 1200, the octal buffer 1202 is enabled and the track count in a HEX representation is placed on the data bus. The track limit sense PAL 1204 is programmed to sense if the track count is stepped outside of allowable limits. The allowable limits are a function of the number of tracks per inch and the diameter of the diskette which are indicated by the "WHAT AM I" switches 1186. If the track count reaches the upper limit, the $\overline{\text{IN ENABLE}}$ line 1206 goes high to inhibit the drive from further step-in operations. Likewise, if the track count reaches the lower limit, the $\overline{\text{OUT ENABLE}}$ line 1208 goes high to inhibit the drive from stepping-out.

FDFM WAY INTERFACE

Figure 21B:
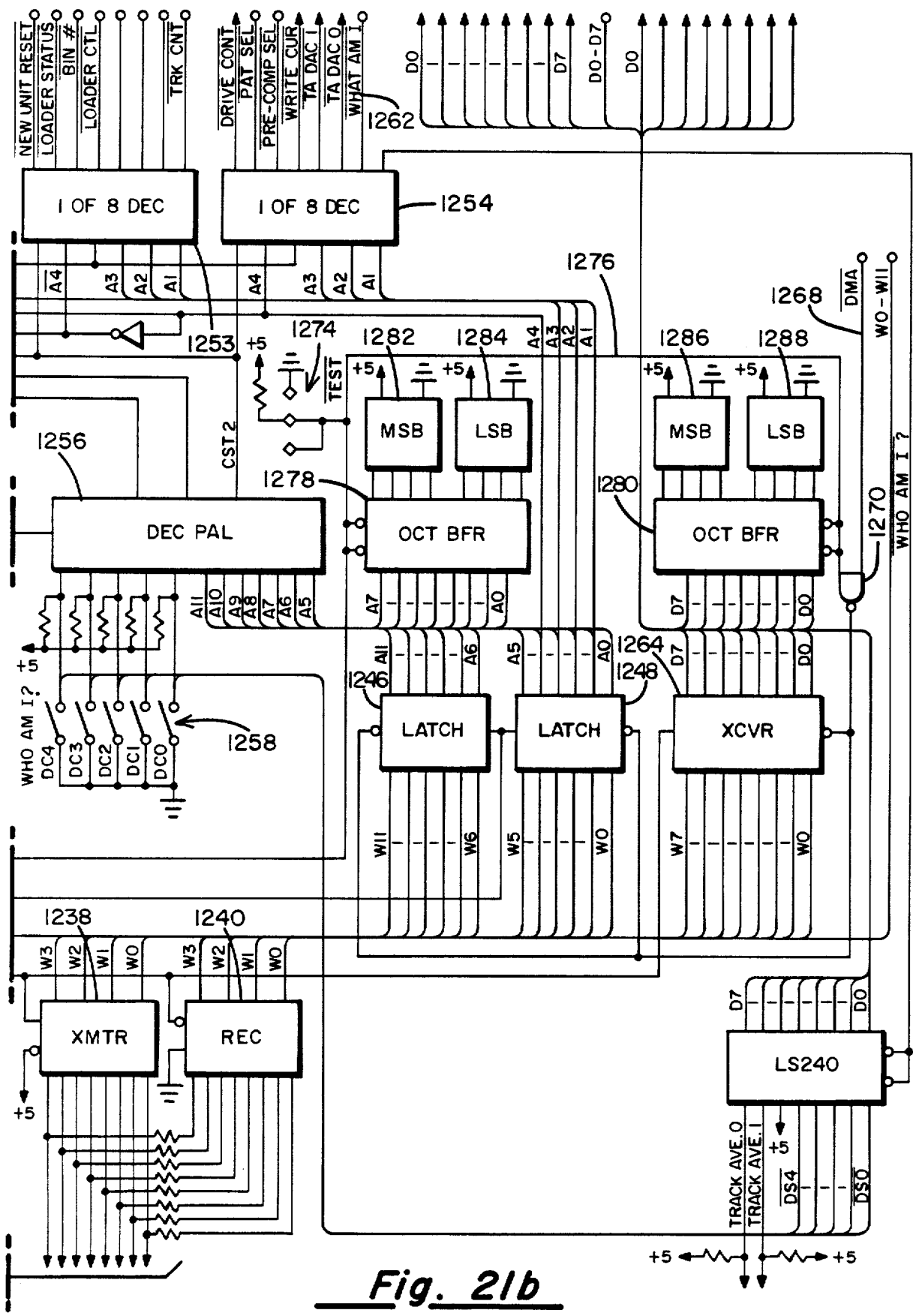

FIGS. 21(a) and 21(b) together are a logical block diagram of the FDFM Way interface. It is to be recalled from the previous discussion of the FDKM that the Way interface is a bidirectional bus controlled by the FDKM and can be diasy-chained to a plurality of FDFM slave modules, each of which can be selectively addressed. The address is multiplexed across the Way data lines W0-W11. Control is provided by the four control lines i.e., CONTRIVED INDEX, ADDRESS LATCH ENABLE, $\overline{\text{IO READ}}$, $\overline{\text{IO WRITE}}$ on the lines 1220, 1222, 1224 and 1226, respectively. These four control signals are arranged to be received by a quad-differential receiver circuit 1228 while the bidirectional data transmission over lines W0-W11 is accomplished by the quad-transmitter and quad-receiver pairs 1230/1232, 1234/1236 and 1238/1240. The direction of data flow across the Way is determined by NAND gate 1242. When it is enabled, the quad-differential receivers are selected so that data can flow from the CPU within the FDKM to the FDFM.

To understand the operation of the Way, it is to be recalled that it is made to operate in four modes, namely, CPU Read, CPU Write, DMA Read and DMA Write. As a convention in the following discussion, the direction of data flow from the CPU to the FDFM will be referred to as the "normal direction".

The normal condition for the FDFM when there is no active cycle is that the WAY DIR line 1244 is high and the IO RD line 1224 is also high, thus the NAND gate 1242 is enabled and the Way is in its normal direction. The CPU places the address on the Way bus which is propagated through the octal transparent latches 1246 and 1248. On the trailing edge of an ALE pulse, the data at the inputs of the transparent latches 1246 and 1248 is captured and held statically on the address bus $A_0-A_{11}$. This address is decoded into a selection of one of all of the output lines shown in one of the five decoder chips 1250-1254. Address bits $A_1$, $A_2$ and $A_3$ perform the one-of-eight selection. The Way Address Decoder PAL 1256 generates one of three address group selects 00 to 1F or 20 to 3F or 40 to 5F (Hex), depending on the state of address bits $A_5$ to $A_{11}$ and the condition of the "WHO AM I" switches which are indicated generally by numeral 1258. No address group lines are selected unless address bits $A_5-A_9$ correspond, bit-for-bit with the switch settings of the switches 1258. This provides for unique addressing of one of all of the FDFMs connected on to the bus. An exception to this is an all one's code on bits $A_5-A_9$ which is interpreted as the broadcast mode in which all FDFMs respond.

Address bits 10 and 11 provide the address group code. By this process, then, the CPU in the FDKM can uniquely address one control line in one FDFM. After the address has been latched and decoded, the IO RD line 1224 goes low causing the output of OR gate 1260 to uniquely select one of the outputs of decoders 1250-1254. If, for example, the WHAT AM I line 1262 is selected, the output buffer associated with that control would put the data from the "WHAT AM I" switches (FIG. 20(b)) on to the data bus and now since NAND gate 1242 is disabled, there is a data path through octal bus transceiver 1264 and the differential transmitters back over the Way bus to the CPU.

For a CPU Write cycle, the address selection process is substantially identical, except this time the $\overline{\text{IO WR}}$ line 1226 is low and NAND gate 1242 is not disabled, thus the direction of the Way bus stays in its normal mode. Again, the output OR gate 1260 goes high, causing the selected output to go low. On the trailing edge of the IO write pulse, the control line is D-selected and clocks the data present on the data bus into the selected register.

The DMA mode is initiated by a CPU write which selects the $\overline{\text{DMA-ON}}$ line 1266. Once the DMA cycle has been initiated, the $\overline{\text{DMA}}$ line 1286 goes low causing the output of NAND gate 1270 to go high and disable the transparent latches 1246 and 1248 as well as the bus tranceiver 1246, thus isolating the address and data bus from the Way. The 12 Way data lines are now redefined per the DMA mode and are used to clock the write data and precompensation codes for the DMA write operation or the transition data for the copy operation. The direction of the Way is controlled by the FDFM sequencer via the $\overline{\text{WAY DIR}}$ line 1244 and the $\overline{\text{DMA}}$ line 1272, either of which can disable NAND gate 1242 to reverse the Way data direction.

A jumper can be provided at 1274 to ground the $\overline{\text{TEST}}$ line 1276 and put the FDFM in an off-line test and diagnostic mode. This allows trouble-shooting of the FDFM without a FDKM present. With this line low, NAND gate 1270 is disabled, disconnecting the address bus and the data bus from the Way bus, while at the same time octal buffers 1278 and 1280 are enabled. By dialing a test address into mechanical-type switches 1282 and a data test pattern in thumb wheel switches 1286 and 1288, any of the FDFM I/O ports can be exercised for test purposes by depressing the ENTER switch 1290 which sets the flip-flop 1292 to initiate a test cycle.

READ CIRCUIT—FDFM

Figure 22A:
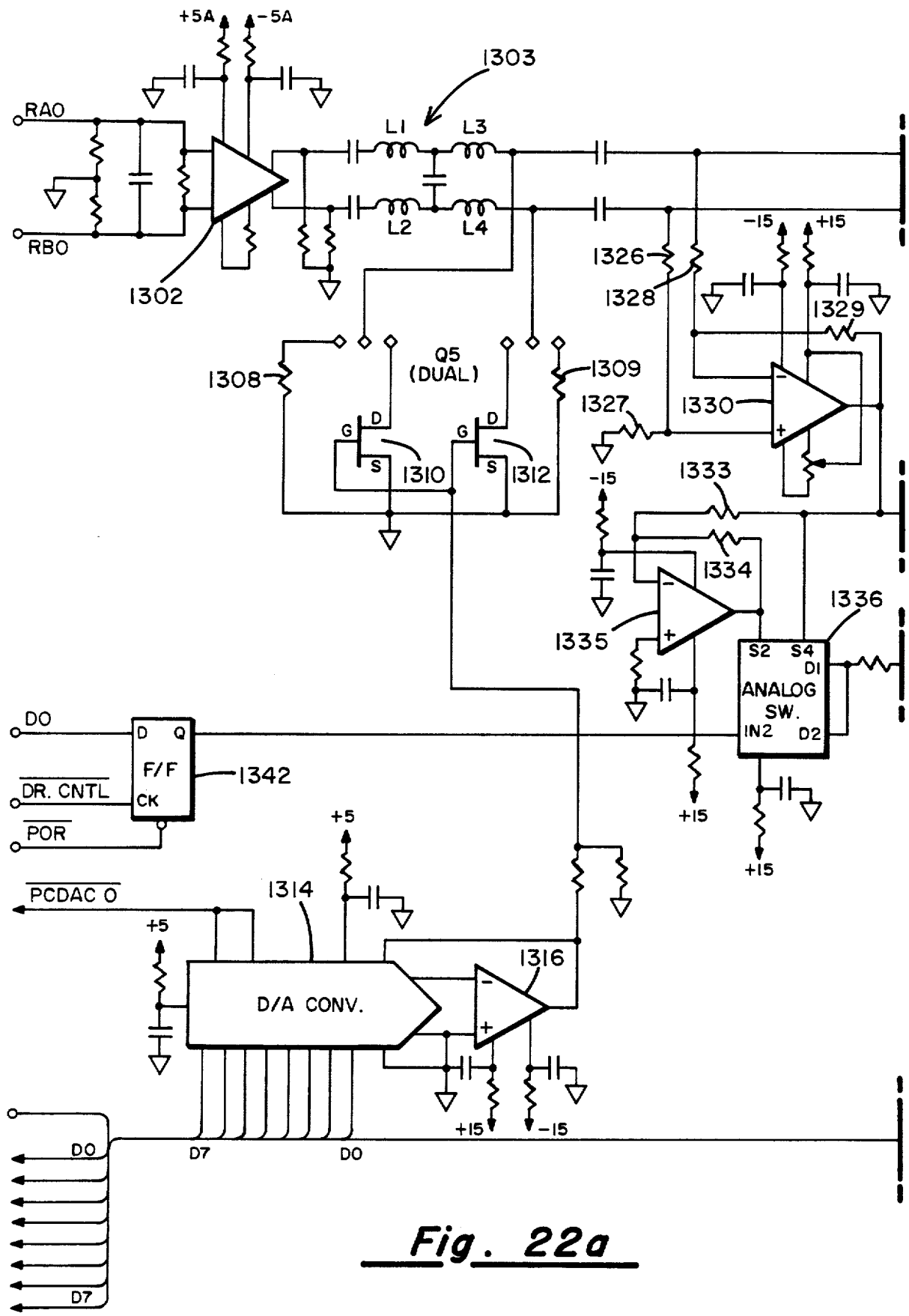
Figure 22B:
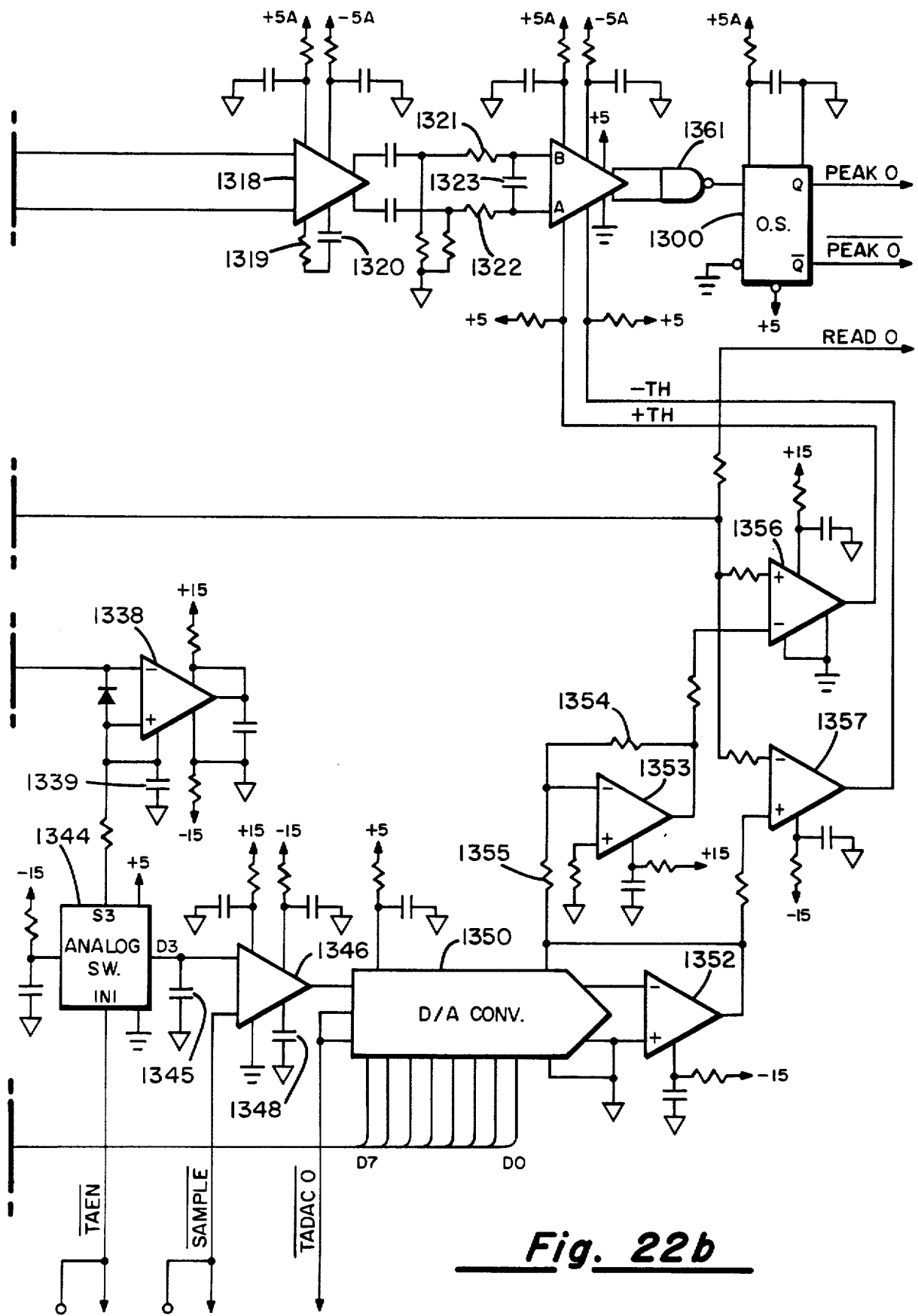

FIG. 22 shows a detailed circuit diagram of the FDFM drive read circuit. The purpose of this circuit is to sense magnetic flux transitions and amplify the read signal, filter it, differentiate it and determine the crossing above threshold to provide a trigger to one-shot 1300 for each flux transition, regardless of polarity. The read chain starts with a differential video amplifier 1302 which has a gain of approximately 400. The output of the video amplifier passes through a three-pole, passive, low-pass read filter 1303. This filter slightly peaks the nominal 2f (125 killohertz) signal which also causes the 2f signal to slightly lead the 1f and other lower frequencies. The effect of this filter is to apply post-read compensation for the peak shift effects associated with magnetic recording. Nominal performance of the filter is accomplished if jumpers are installed to connect resistors 1308 and 1309 into the circuit. Alternatively, the filter characteristics can be made programmable if the jumpers are connected to the drains of the matched dual junction field effect transistors 1310 and 1312. Programming of the filter characteristics is accomplished by digital-to-analog converter 1314. In the preferred embodiment, this circuit is a type AD7524 manufactured by Analog Devices, Inc., which contains the digital register on the chip, or within the circuit. Data to program the digital-to-analog converter is provided from the CPU via data lines D0 through D7 and is latched into the converter when the CPU selects the $\overline{PCDAC0}$ line 1314. Amplifier 1316 functions as a unity gain buffer on the output of the digital-to-analog converter. Thus, its output is proportional to the digital value contained within the internal register. As this voltage is increased, the drain-to-source resistance of transistors 1310 and 1312 is reduced, causing the phase shift between the 1f and 2f signal components to increase.

Following the filter is video amplifier 1310 which acts as a differentiator, due to resistor 1319 and capacitor 1320 which form a high pass filter whose pole is 10 times the nominal 2f frequency. The read signal then passes through a low pass filter comprised of resistors 1321, 1322 and capacitor 1323 whose pole is also 10 times the 2f frequency. The result is that the input to comparator 1324, which functions as a 0-crossing detector, is a balanced differential signal wherein the positive flux transitions have been converted into positive going peaks and the negative flux transitions have been converted into negative going peaks. Interposed with the valid large amplitude peaks are other peak signals associated with noise and inflections of the read signal. To discriminate the valid from the invalid 0 crossings, it is required that the peak threshold not cross 0 but that it cross a specified threshold.

The network comprised of resistors 1326 through 1329 establishes a gain of 10 for operational amplifier 1330. The differential read signal at the input to the differential 1318 is thus converted to a single ended signal 10 times larger. The resistor network 1333 and 1334 establishes a unity inverting gain for operational amplifier 1335. Analog switch 1336 connects either the output of amplifier 1330 or the output of amplifier 1335 to the input of peak detector 1338 depending on the state of the negative $\overline{NEG\text{-}TA}$ line 1340. Amplifier 1338 is connected to function as a peak detector such that the voltage stored on capacitor 1339 is equal to the peak value of the read signal.

It is desirable that the CPU be able to program the threshold reference to either the average peak positive signal or the average peak negative signal. This selection is determined by flip-flop 1340. When the CPU selects the drive control line, the state of bit 0 on the data bus is latched into flip-flop 1342. If this value is a 0, S4 is connected to D1 of analog switch 1336 so that the charge on capacitor 1339 follows the peak positive signal. When a 0 is latched into flip-flop 1342, S2 is connected to D2 of analog switch 1336 and the voltage on capacitor follows the negative peak read signal due to the inversion of amplifier 1335. When the track average enable signal $\overline{(TAEN)}$ from register 952 (FIG. 19(a)) is 0, S3 is connected to D3 of analog switch 1344 such that the track average signal is now stored on capacitor 1345.

Circuit 1346 is a sample and hold circuit which switches the voltage on capacitor 1345 to capacitor 1348 when the $\overline{SAMPLE}$ signal from the sequencer (FIG. 19) goes low. The sampled track average signal is provided to the input of multiplying digital analog converter 1350. The output of this circuit is the input voltage multiplied by the digital count stored in the 8-bit internal register divided by 256. This multiplying digital-to-analog converter is programmed in the same manner as the D/A converter 1314 when the CPU selects the $\overline{TADAC0}$ line.

The output of operational amplifier 1352 provides a unity gain to the A to D signal while the output of operational amplifier 1353 provides a unity inverted gain of the same signal due to feedback resistors 1354 and 1355. The effect of this is to establish positive and negative thresholds at comparators 1356 and 1357 respectively, which are a programmable percentage of the peak read signal, either positive or negative. When the read signal exceeds this positive threshold, OP AMP 1324, at the time of the 0 crossing, i.e., the leading edge of the differentiated signal, triggers one-shot 1300 via NAND gate 1361. Similarly, at the 0 crossing if the negative going signal goes below the negative threshold, one-shot 1300 is triggered.

The programmability of these thresholds, as a percentage of either the positive or negative peak, allows discs to be read which may be partially degraded or damaged and the information to be recovered which would be unrecoverable by conventional read circuitry.

WRITE CIRCUIT—FDFM

Figure 23A:
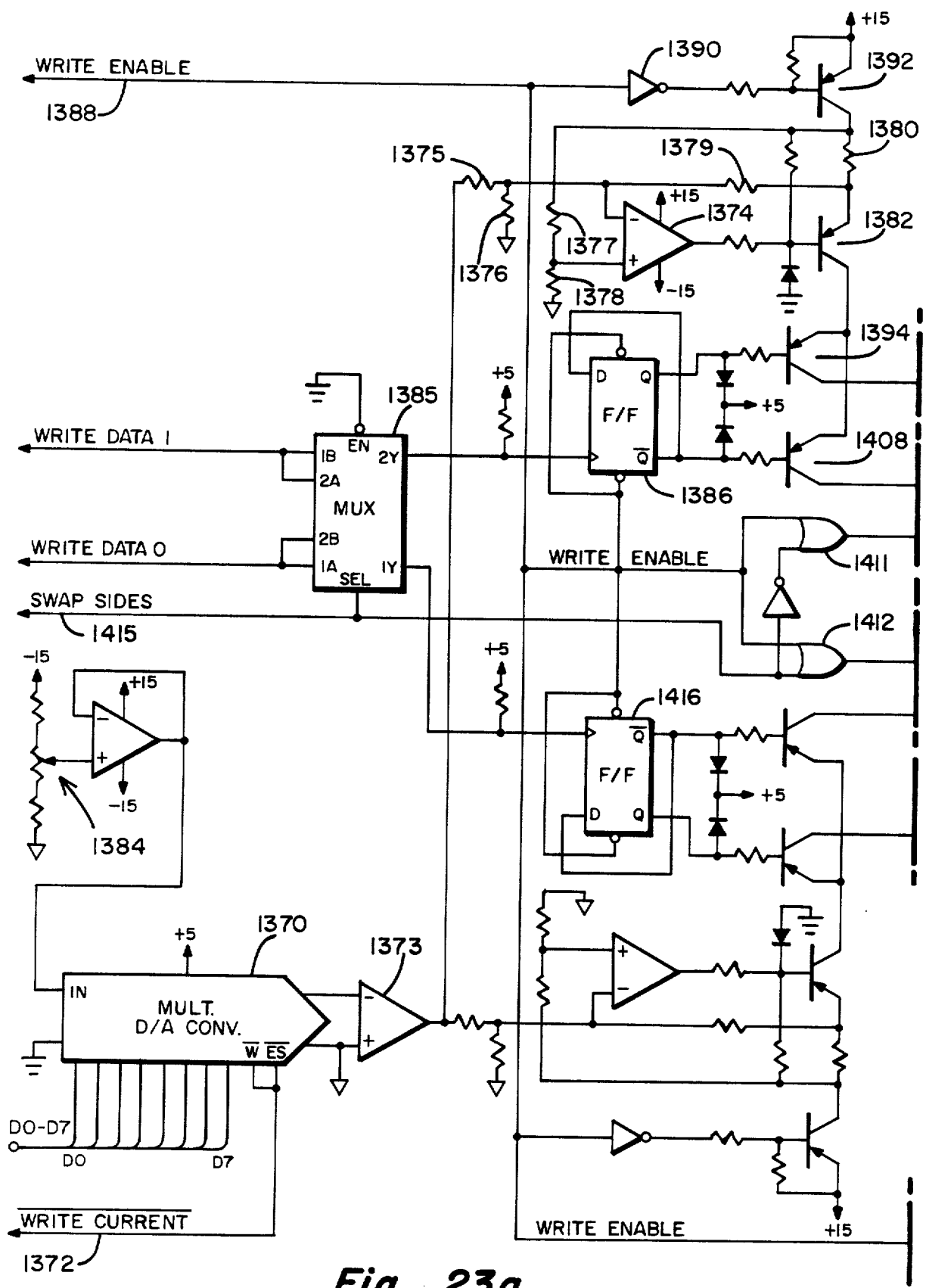
Figure 23B:
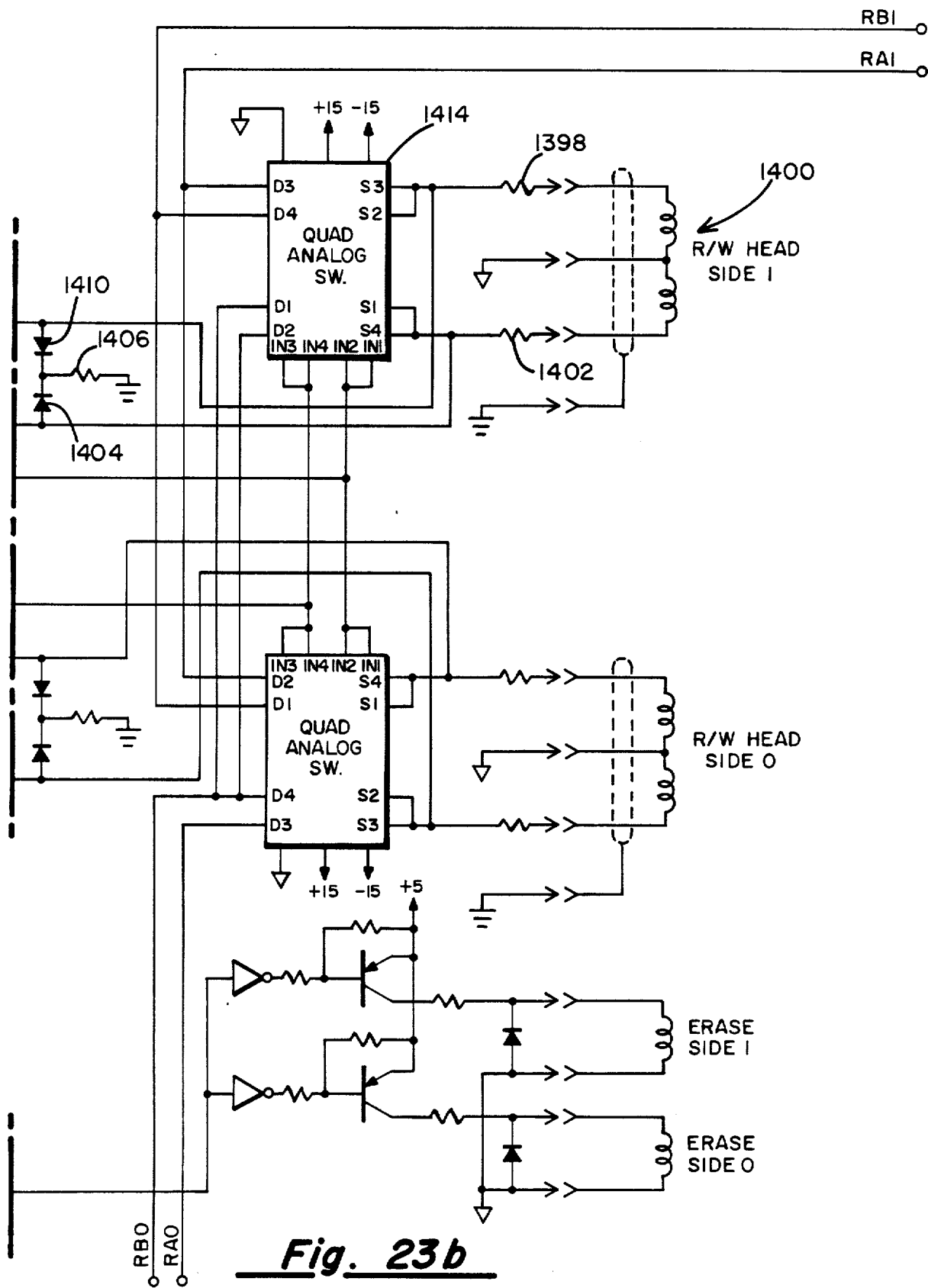

FIG. 23 shows a detailed schematic circuit diagram of the FDFM write circuit and read/write switches. It will be recalled that in magnetic recording 1's are represented by flux transitions and 0's are represented by no flux transition. The purpose of the write circuit is to reverse the direction of the current in the read/write head each time a pulse indicating a 1 appears on the write data line. In conventional diskette systems, the write current can be fixed because the other recording parameters are also fixed. To make the FDFM capable of emulating various recording standards, it is necessary that the write current be made programmable.

Multiplying digital-to-analog converter 1370 is programmed in when the CPU selects the $\overline{WRITE\ CURRENT}$ line 1372. The output voltage of the D/A converter passes through unity gain buffer 1373. Operational amplifier 1374 and the associated feedback network comprised of resistors 1375 through 1379 function to establish a voltage across resistor 1380 which is proportional to the output of the digital-to-analog converter by modulating the current through transistor 1382. Thus, the current flowing through the collector of transistor 1382 which will also be the current flowing through the read/write head, is regulated by the multiplying digital-to-analog converter. Potentiometer 1384 is set to a voltage such that with a value of all 1's loaded into the digital-to-analog converter, the write current will be ten milliamps. Any other count programmed then will program a specified percentage of this ten milliamp maximum.

In normal operation, the WRITE DATA 1 passes through multiplexer 1385 to the clock of flip-flop 1386. Each write data pulse toggles flip-flop 1386 to reverse the current direction. Write current is generated when the $\overline{WRITE\ ENABLE}$ line 1388 goes high, causing the output of inverter 1390 to go low, turning on transistor 1392. The current follows the following path when flip-flop 1386 is reset: current flows out of the +15 volt supply, through transistor 1392, resistor 1380, transistor 1382, into the emitter of transistor 1394, out of the collector of transistor 1394, through conductor 1396, through resistor 1398, read/write head 1400, resistor 1402, diode 1404, resistor 1406 to ground. With flip-flop 1386 set, the current path is through the components 1392, 1380 and 1382, into the emitter of transistor 1408, out of its collector, through 1402, read/write head 1400, through 1398, diode 1410, resistor 1406, to ground. Notice that the direction of current flow through the read head has been reversed.

When the Write Enable line 1388 is high, the outputs of OR gates 1411 and 1412 are both high. Thus, all sections of the quad analog switch 1414 are open. In the normal read mode, the Write Enable and the Swap Sides line 1415 are both low. Thus, the output of OR gate 1411 is high but the output of OR gate 1412 is low to enable inputs IN3 and IN4 of switch 1414. This causes S3 to be connected to D3 and S4 to be connected to D4 such that read/write head 1400 is connected to the lines RB1 and RA1 going to the side 1 data separator. When the Swap Sides line 1415 is high, the states of OR gates 141 and 1412 are reversed such that S1 is connected to D1 and S2 is connected to D2 causing the read/write head 1400 to be swapped to the 0 side data separator.

The Swap Sides line in the one state also switches multiplexer 1385 such that Write Data 1 is routed to flip-flop 1416 while Write Data 0 is routed to clock flip-flop 1386. The ability to swap sides is a useful feature in doing trouble shooting and fault isolation.

APPENDIX I

TABLE OF CONTROL SIGNALS GENERATED BY CPU

| | |
|---|---|
| $\overline{\text{MODE}}$ | $\overline{\text{CSX 0}}$ |
| $\overline{\text{CNTLD 0}}$ | $\overline{\text{CSY 0}}$ |
| $\overline{\text{CNTLD 1}}$ | $\overline{\text{RVL CNT 0}}$ |
| $\overline{\text{PRESET 0}}$ | $\overline{\text{RVLD 0}}$ |
| $\overline{\text{SIDX TIME}}$ | $\overline{\text{CSX 1}}$ |
| $\overline{\text{PRESET 1}}$ | $\overline{\text{CSY 1}}$ |
| $\overline{\text{RESTART}}$ | $\overline{\text{RVL CNT 1}}$ |
| $\overline{\text{PECLR}}$ | $\overline{\text{RVLD 1}}$ |
| $\overline{\text{CODE STRUCTURE}}$ | $\overline{\text{SET-PC}}$ |
| $\overline{\text{COUNT}}$ | $\overline{\text{CL-PC}}$ |
| $\overline{\text{ONCE}}$ | $\overline{\text{SET-PD}}$ |
| $\overline{\text{ONCE +}}$ | $\overline{\text{CL PD}}$ |
| $\overline{\text{DUPL EN}}$ | $\overline{\text{TRANS}}$ |
| $\overline{\text{KOPY EN}}$ | $\overline{\text{POR}}$ |
| KOPY I | KOPY II |
| RV TRACK | |

APPENDIX II

DEFINITION OF PROGRAMMABLE LOGIC ARRAYS

Figure 13A:
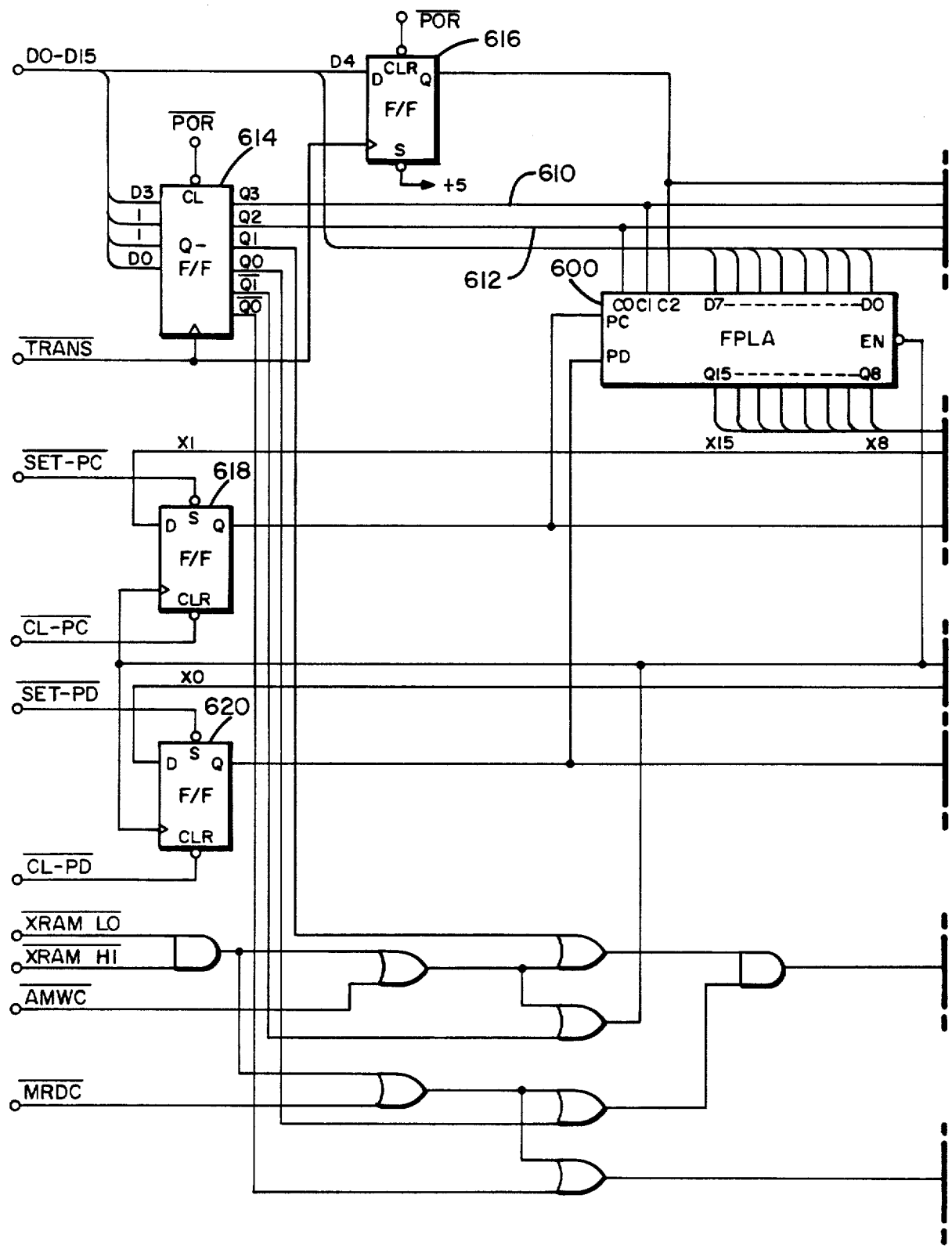

PAL 600 - FIG. 13(a)

PROGRAM TABLE ENTRIES

| INPUT VARIABLE | | | OUTPUT FUNCTIONS | | OUTPUT ACTIVE LEVEL | |
|---|---|---|---|---|---|---|
| Im H | Īm L | Don't Care — (dash) | Prod Term Present in Fp A | Prod Term Not Present in Fp . (period) | Active High H | Active Low L |
| NOTE Enter (—) for unused inputs of used P-terms | | | NOTES 1 Enters independent of output polarity 2 Enter (A) for unused outputs of used P-terms | | NOTES 1 Polarity programmed once only 2 Enter (H) for all unused outputs | |

PRODUCT TERM[1]

ACTIVE LEVEL[1]: H H H H   H H H H

| NO | INPUT VARIABLE[1] 15 14 13 12 11 10 9 8 7 6 5 4 3 2 1 0 | OUTPUT FUNCTION[1] 7 6 5 4 3 2 1 0 |
|---|---|---|
| 0  | L L L — — — — L L — — — — — — — | A . . . . . . . |
| 1  | — L — — — — — — H — — — — — — — | . A . . . . . . |
| 2  | L L L — — — — — L L — — — — — — | . . A . . . . . |
| 3  | — L — — — — — — — H — — — — — — | . . . A . . . . |
| 4  | L L L — — — — — — L L — — — — — | . . . . A . . . |
| 5  | — L — — — — — — — — H — — — — — | . . . . . A . . |
| 6  | L L L — — — — — — — L L — — — — | . . . . . . A . |
| 7  | — L — — — — — — — — — H — — — — | . . . . . . . A |
| 8  | L L H — — — — — — — — — — — — — | A . . . . . . . |
| 9  | L L H — — — — — — — — — — — — — | . . A . . . . . |
| 10 | L L H — — — — — — — — — — — — — | . . . . A . . . |
| 11 | L L H — — — — — — — — — — — — — | . . . . . . A . |
| 12 | L H L — — — — — L — — — — — — — | A . . . . . . . |
| 13 | L H L — — — — — — — L L — — — — | A A . . . . . . |
| 14 | L H L — — — — — H — — — — — — — | . A . . . . . . |
| 15 | L H L — — — — — L L L H — — — — | . A . A . . . . |
| 16 | L H — — — — — — — H — — — — — — | . . A . . . . . |
| 17 | L H L — — — — — — — H — — — — — | . . . A . . . . |
| 18 | L H L — — — — — H — — L — — — — | . . . A . . . . |
| 19 | L H L — — — — — — — — H — — — — | . . . . A . . . |
| 20 | L H L — — — — — L — L — — — — — | . . . . A . . . |
| 21 | L H L — — — — — — — — — L — — — | . . . . . A . . |
| 22 | L H L — — — — — — — — — — — L L | . . . . . A A . |
| 23 | L H L — — — — — — — — — H — — — | . . . . . . A . |
| 24 | L H L — — — — — — — — — L L L H | . . . . . . A . |
| 25 | L H — — — — — — — — — — — H — — | . . . . . . . A |
| 26 | L H H — — — — — — — — H — — — — | A . . . . . . . |
| 27 | L H H — — — — — — H — — H — — — | A . . . . . . . |

APPENDIX II-continued
DEFINITION OF PROGRAMMABLE LOGIC ARRAYS

| | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| 28 | L | H | H | — | — | — | — | — | — | — | L | — | — | — | — | — | . | A | . | . | . | . | . | . | . |
| 29 | L | H | H | — | — | — | — | — | H | L | H | — | — | — | — | — | . | A | . | A | . | . | . | . | . |
| 30 | L | H | H | — | — | — | — | — | H | — | H | L | — | — | — | — | . | A | . | A | . | . | . | . | . |
| 31 | L | H | H | — | — | — | — | — | L | — | — | — | — | — | — | — | . | . | . | A | . | . | . | . | . |
| 32 | L | H | H | — | — | — | — | — | — | — | — | H | — | — | — | — | . | . | . | . | A | . | . | . | . |
| 33 | L | H | H | — | — | — | — | — | H | — | L | — | — | — | — | — | . | . | . | . | A | . | . | . | . |
| 34 | L | H | H | — | — | — | — | — | — | — | — | — | — | — | H | — | . | . | . | . | . | A | . | . | . |
| 35 | L | H | H | — | — | — | — | — | — | — | — | — | H | — | — | H | . | . | . | . | . | A | . | . | . |
| 36 | L | H | H | — | — | — | — | — | — | — | — | — | — | — | L | — | . | . | . | . | . | . | A | . | . |
| 37 | L | H | H | — | — | — | — | — | — | — | — | — | H | L | H | — | . | . | . | . | . | . | A | . | . |
| 38 | L | H | H | — | — | — | — | — | — | — | — | — | H | — | H | L | . | . | . | . | . | . | A | . | . |
| 39 | H | L | L | — | — | — | L | L | L | — | — | — | — | — | — | — | A | . | . | . | . | . | . | . | . |
| 40 | H | L | L | — | — | — | — | L | L | L | — | — | — | — | — | — | . | . | A | . | . | . | . | . | . |
| 41 | H | L | L | — | — | — | H | — | L | L | — | — | — | — | — | — | . | . | A | . | . | . | . | . | . |
| 42 | H | L | L | — | — | — | L | L | — | L | L | — | — | — | — | — | . | . | . | . | A | . | . | . | . |
| 43 | H | L | L | — | — | — | — | — | H | L | L | — | — | — | — | — | . | . | . | . | A | . | . | . | . |
| 44 | H | L | — | — | — | — | — | H | L | — | L | L | — | — | — | — | . | . | . | . | . | . | . | A | . |
| 45 | H | L | L | — | — | — | H | — | L | — | L | L | — | — | — | — | . | . | . | . | . | . | . | A | . |
| 46 | H | L | L | — | — | — | — | — | — | H | L | L | — | — | — | — | . | . | . | . | . | . | . | A | . |
| 47 | | | | | | | | | | | | | | | | | | | | | | | | | |

| PIN NO. | 20 | 21 | 22 | 23 | 24 | 25 | 26 | 27 | 2 | 3 | 4 | 5 | 6 | 7 | 8 | 9 | 10 | 11 | 12 | 13 | 15 | 16 | 17 | 18 |
|---|---|---|---|---|---|---|---|---|---|---|---|---|---|---|---|---|---|---|---|---|---|---|---|---|
| VARIABLE NAME | C2 | C1 | C0 | | | | PC | P0 | D7 | D6 | D5 | D4 | D3 | D2 | D1 | D0 | Q15 | Q14 | Q13 | Q12 | Q11 | Q10 | Q9 | Q8 |

Figure 13B:
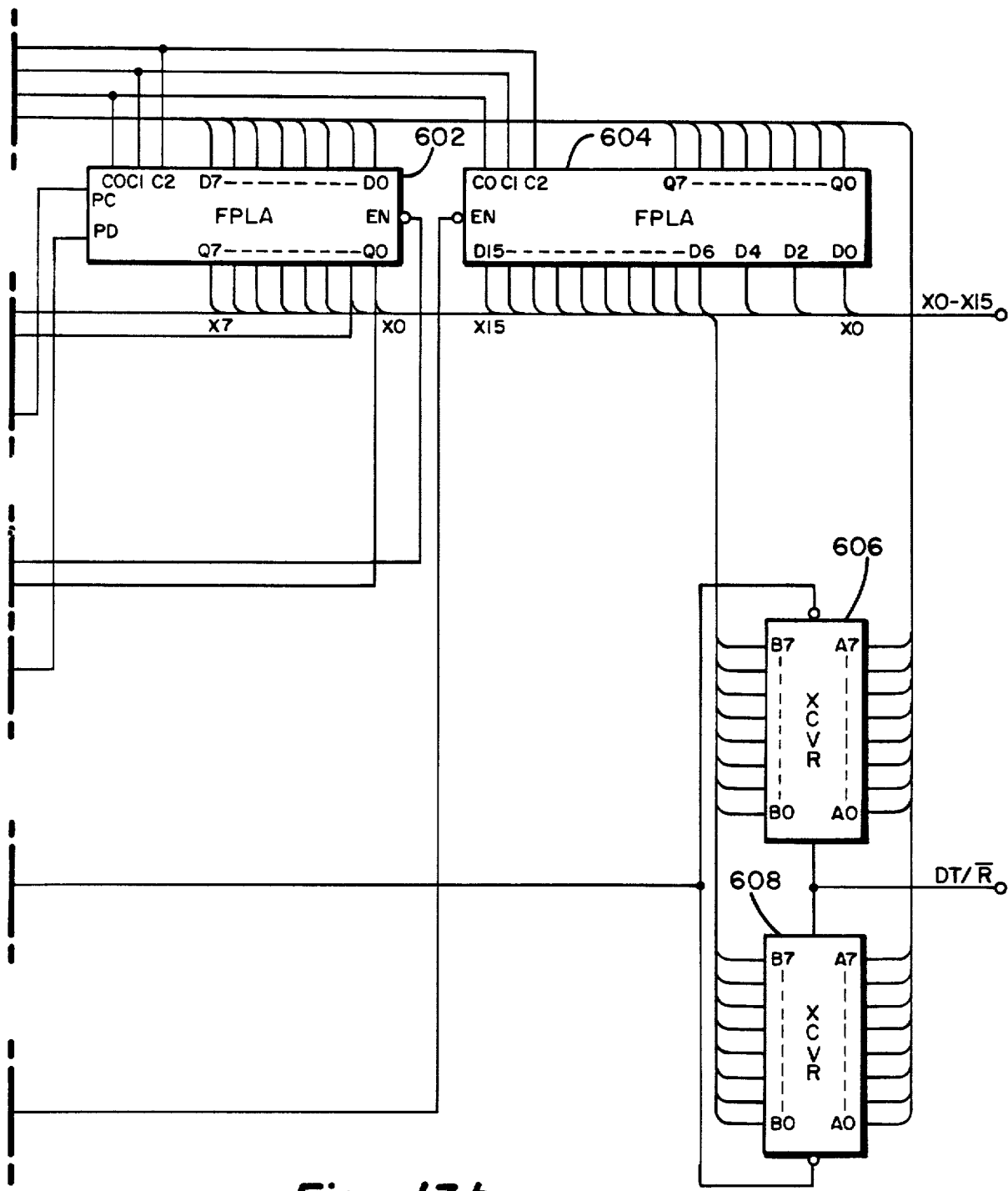

PAL 602 - FIG. 13(b)
PROGRAM TABLE ENTRIES

| INPUT VARIABLE | | | OUTPUT FUNCTIONS | | OUTPUT ACTIVE LEVEL | |
|---|---|---|---|---|---|---|
| Im | Im | Don't Care | Prod Term Present in Fp | Prod Term Not Present in Fp | Active High | Active Low |
| H | L | — (dash) | A | . (period) | H | L |

NOTE
Enter (—) for unused inputs of used P-terms

NOTES
1 Enters independent of output polarity
2 Enter (A) for unused outputs of used P-terms

NOTES
1 Polarity programmed once only
2 Enter (H) for all unused outputs

| | PRODUCT TERM[1] | | | | | | | | | | | | | | | | ACTIVE LEVEL[1] | | | | | | | |
|---|---|---|---|---|---|---|---|---|---|---|---|---|---|---|---|---|---|---|---|---|---|---|---|---|
| | INPUT VARIABLE[1] | | | | | | | | | | | | | | | | H H H H | | | | H H H H | | | |
| NO | 15 | 14 | 13 | 12 | 11 | 10 | 9 | 8 | 7 | 6 | 5 | 4 | 3 | 2 | 1 | 0 | OUTPUT FUNCTION[1] | | | | | | | |
| | | | | | | | | | | | | | | | | | 7 | 6 | 5 | 4 | 3 | 2 | 1 | 0 |
| 0 | L | L | L | — | — | — | — | — | — | — | — | L | L | — | — | — | A | . | . | . | . | . | . | . |
| 1 | — | L | — | — | — | — | — | — | — | — | — | — | H | — | — | — | . | A | . | . | . | . | . | . |
| 2 | L | L | L | — | — | — | — | — | — | — | — | — | L | L | — | — | . | . | A | . | . | . | . | . |
| 3 | — | L | — | — | — | — | — | — | — | — | — | — | — | H | — | — | . | . | . | A | . | . | . | . |
| 4 | L | L | L | — | — | — | — | — | — | — | — | — | — | L | L | — | . | . | . | . | A | . | . | . |
| 5 | — | L | — | — | — | — | — | — | — | — | — | — | — | — | H | — | . | . | . | . | . | A | . | . |
| 6 | L | L | L | — | — | — | — | — | — | — | — | — | — | — | L | L | . | . | . | . | . | . | A | . |
| 7 | — | L | — | — | — | — | — | — | — | — | — | — | — | — | — | H | . | . | . | . | . | . | . | A |
| 8 | L | L | H | — | — | — | — | — | — | — | — | — | — | — | — | — | A | . | . | . | . | . | . | . |
| 9 | L | L | H | — | — | — | — | — | — | — | — | — | — | — | — | — | . | . | A | . | . | . | . | . |
| 10 | L | L | H | — | — | — | — | — | — | — | — | — | — | — | — | — | . | . | . | . | A | . | . | . |
| 11 | L | L | H | — | — | — | — | — | — | — | — | — | — | — | — | — | . | . | . | . | . | . | A | . |
| 12 | L | H | L | — | — | — | — | — | — | — | — | — | L | L | L | H | A | . | . | . | . | . | . | . |
| 13 | L | H | L | — | — | — | — | — | — | — | — | — | — | — | H | — | A | . | . | . | . | . | . | . |
| 14 | L | H | L | — | — | — | — | — | — | — | — | — | H | — | — | L | A | . | . | . | . | . | . | . |
| 15 | L | H | L | — | — | — | — | — | — | — | — | — | — | — | — | H | . | A | . | . | . | . | . | . |
| 16 | L | H | L | — | — | — | — | — | — | — | — | — | L | — | L | — | . | A | . | . | . | . | . | . |
| 17 | L | H | H | — | — | — | — | — | — | — | — | — | H | L | H | — | A | . | . | . | . | . | . | . |
| 18 | L | H | H | — | — | — | — | — | — | — | — | — | H | — | H | L | A | . | . | . | . | . | . | . |
| 19 | L | H | H | — | — | — | — | — | — | — | — | — | L | — | — | — | A | . | . | . | . | . | . | . |
| 20 | L | H | H | — | — | — | — | — | — | — | — | — | — | — | — | H | . | A | . | . | . | . | . | . |
| 21 | L | H | H | — | — | — | — | — | — | — | — | — | H | — | L | — | . | A | . | . | . | . | . | . |
| 22 | H | L | L | — | — | — | L | L | — | L | — | L | L | — | — | — | A | . | . | . | . | . | . | . |
| 23 | H | L | L | — | — | — | — | — | H | L | — | L | L | — | — | — | A | . | . | . | . | . | . | . |
| 24 | H | L | L | — | — | — | — | — | — | — | H | L | L | — | — | — | A | . | . | . | . | . | . | . |
| 25 | H | L | L | — | — | — | — | H | L | — | L | — | L | L | — | — | . | . | A | . | . | . | . | . |
| 26 | H | L | L | — | — | — | H | — | L | — | L | — | L | L | — | — | . | . | A | . | . | . | . | . |
| 27 | H | L | L | — | — | — | — | — | — | H | L | — | L | L | — | — | . | . | A | . | . | . | . | . |
| 28 | H | L | L | — | — | — | — | — | — | — | — | H | L | L | — | — | . | . | A | . | . | . | . | . |
| 29 | H | L | L | — | — | L | L | — | L | — | L | — | — | L | L | — | . | . | . | . | A | . | . | . |
| 30 | H | L | L | — | — | — | — | — | H | L | — | L | — | L | L | — | . | . | . | . | A | . | . | . |
| 31 | H | L | L | — | — | — | — | — | — | — | H | L | — | L | L | — | . | . | . | . | A | . | . | . |
| 32 | H | L | L | — | — | — | — | — | — | — | — | — | H | L | L | — | . | . | . | . | A | . | . | . |
| 33 | H | L | L | — | — | — | — | H | L | — | L | — | L | — | L | L | . | . | . | . | . | . | A | . |
| 34 | H | L | L | — | — | — | H | — | L | — | L | — | L | — | L | L | . | . | . | . | . | . | A | . |

-continued

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 35 | H | L | L | — | — | — | — | — | — | H | L | — | L | — | L | L | . | . | . | . | . | . | . | A | . |
| 36 | H | L | L | — | — | — | — | — | — | — | — | H | L | — | L | L | . | . | . | . | . | . | . | A | . |
| 37 | H | L | L | — | — | — | — | — | — | — | — | — | — | H | L | L | . | . | . | . | . | . | . | A | . |
| 38 | | | | | | | | | | | | | | | | | | | | | | | | | |
| 39 | | | | | | | | | | | | | | | | | | | | | | | | | |
| 40 | | | | | | | | | | | | | | | | | | | | | | | | | |
| 41 | | | | | | | | | | | | | | | | | | | | | | | | | |
| 42 | | | | | | | | | | | | | | | | | | | | | | | | | |
| 43 | | | | | | | | | | | | | | | | | | | | | | | | | |
| 44 | | | | | | | | | | | | | | | | | | | | | | | | | |
| 45 | | | | | | | | | | | | | | | | | | | | | | | | | |
| 46 | | | | | | | | | | | | | | | | | | | | | | | | | |
| 47 | | | | | | | | | | | | | | | | | | | | | | | | | |
| PIN NO. | 20 | 21 | 22 | 23 | 24 | 25 | 26 | 27 | 2 | 3 | 4 | 5 | 6 | 7 | 8 | 9 | 10 | 11 | 12 | 13 | 15 | 16 | 17 | 18 |
| VARIABLE NAME | C2 | C1 | C0 | | | | | | PC | PP | D7 | D6 | D5 | D4 | D3 | D2 | D1 | D0 | Q7 | Q6 | Q5 | Q4 | Q3 | Q2 | Q1 | Q0 |

PAL 604 - FIG. 13(b)

PROGRAM TABLE ENTRIES

| INPUT VARIABLE | | | OUTPUT FUNCTIONS | | OUTPUT ACTIVE LEVEL | |
|---|---|---|---|---|---|---|
| Im | Īm | Don't Care | Prod Term Present in Fp | Prod Term Not Present in Fp | Active High | Active Low |
| H | L | — (dash) | A | . (period) | H | L |

| NOTE | NOTES | NOTES |
|---|---|---|
| Enter (—) for unused inputs of used P-terms | 1 Enters independent of output polarity<br>2 Enter (A) for unused outputs of used P-terms | 1 Polarity programmed once only<br>2 Enter (H) for all unused outputs |

| | PRODUCT TERM¹ INPUT VARIABLE¹ | | | | | | | | | | | | | | | ACTIVE LEVEL¹ [H][H][H][H] [H][H][H][H] OUTPUT FUNCTION¹ | | | | | | | |
|---|---|---|---|---|---|---|---|---|---|---|---|---|---|---|---|---|---|---|---|---|---|---|---|
| NO | 15 | 14 | 13 | 12 | 11 | 10 | 9 | 8 | 7 | 6 | 5 | 4 | 3 | 2 | 1 | 0 | 7 | 6 | 5 | 4 | 3 | 2 | 1 | 0 |
| 0 | — | L | — | — | H | — | — | — | — | — | — | — | — | — | — | — | A | . | . | . | . | . | . | . |
| 1 | — | L | — | — | — | — | H | — | — | — | — | — | — | — | — | — | . | A | . | . | . | . | . | . |
| 2 | — | L | — | — | — | — | — | — | H | — | — | — | — | — | — | — | . | . | A | . | . | . | . | . |
| 3 | — | L | — | — | — | — | — | — | — | — | H | — | — | — | — | — | . | . | . | A | . | . | . | . |
| 4 | — | L | — | — | — | — | — | — | — | — | — | — | H | — | — | — | . | . | . | . | A | . | . | . |
| 5 | — | L | — | — | — | — | — | — | — | — | — | H | — | — | — | — | . | . | . | . | . | A | . | . |
| 6 | — | L | — | — | — | — | — | — | — | — | — | — | — | H | — | — | . | . | . | . | . | . | A | . |
| 7 | — | L | — | — | — | — | — | — | — | — | — | — | — | — | — | H | . | . | . | . | . | . | . | A |
| 8 | L | H | L | — | H | — | H | L | — | — | — | — | — | — | — | — | A | . | . | . | . | . | . | . |
| 9 | L | H | L | L | H | — | — | H | — | — | — | — | — | — | — | — | A | . | . | A | . | . | . | . |
| 10 | L | H | L | — | — | H | — | — | — | — | — | — | — | — | — | — | . | A | . | . | . | . | . | . |
| 11 | L | H | L | H | L | — | H | — | — | — | — | — | — | — | — | — | . | . | A | . | . | . | . | . |
| 12 | L | H | L | L | H | — | H | — | — | — | — | — | — | — | — | — | . | . | A | . | . | . | . | . |
| 13 | L | H | L | H | L | H | — | H | — | — | — | — | — | — | — | — | . | . | . | A | . | . | . | . |
| 14 | L | H | L | H | — | L | H | H | — | — | — | — | — | — | — | — | . | . | . | A | . | . | . | . |
| 15 | L | H | L | — | — | — | — | — | — | H | — | H | L | — | — | — | A | . | . | . | . | . | . | . |
| 16 | L | H | L | — | — | — | — | — | L | H | — | — | H | — | — | — | . | A | . | . | . | . | . | A |
| 17 | L | H | L | — | — | — | — | — | — | — | H | — | — | — | — | — | . | . | A | . | . | . | . | . |
| 18 | L | H | L | — | — | — | — | — | H | L | — | H | — | — | — | — | . | . | . | . | . | A | . | . |
| 19 | L | H | L | — | — | — | — | — | L | H | — | H | — | — | — | — | . | . | . | . | . | A | . | . |
| 20 | L | H | L | — | — | — | — | — | H | L | H | — | H | — | — | — | . | . | . | . | . | . | . | A |
| 21 | L | H | L | — | — | — | — | — | H | — | L | H | H | — | — | — | . | . | . | . | . | . | . | A |
| 22 | L | H | H | — | H | — | L | H | — | — | — | — | — | — | — | — | A | . | . | . | . | . | . | . |
| 23 | L | H | H | H | H | — | H | — | — | — | — | — | — | — | — | — | A | . | . | . | . | . | . | . |
| 24 | L | H | H | H | — | H | L | H | — | — | — | — | — | — | — | — | A | . | . | . | . | . | . | . |
| 25 | L | H | H | — | — | H | — | — | — | — | — | — | — | — | — | — | . | A | . | . | . | . | . | . |
| 26 | L | H | H | H | L | H | — | H | — | — | — | — | — | — | — | — | . | . | A | A | . | . | . | . |
| 27 | L | H | H | H | — | — | H | — | — | — | — | — | — | — | — | — | . | . | A | . | . | . | . | . |
| 28 | L | H | H | — | H | — | H | H | — | — | — | — | — | — | — | — | . | . | . | A | . | . | . | . |
| 29 | L | H | H | H | — | — | H | — | — | — | — | — | — | — | — | — | . | . | . | A | . | . | . | . |
| 30 | L | H | H | H | — | — | H | H | — | — | — | — | — | — | — | — | . | . | . | A | . | . | . | . |
| 31 | L | H | H | — | — | — | — | — | — | H | — | L | H | — | — | — | . | . | . | . | A | . | . | . |
| 32 | L | H | H | — | — | — | — | — | H | H | — | H | — | — | — | — | . | . | . | . | A | . | . | . |
| 33 | L | H | H | — | — | — | — | — | H | — | H | L | H | — | — | — | . | . | . | . | A | . | . | . |
| 34 | L | H | H | — | — | — | — | — | — | — | H | — | — | — | — | — | . | . | . | . | . | A | . | . |
| 35 | L | H | H | — | — | — | — | — | H | L | H | — | H | — | — | — | . | . | . | . | . | . | A | A |
| 36 | L | H | H | — | — | — | — | — | H | — | — | H | — | — | — | — | . | . | . | . | . | A | . | . |
| 37 | L | H | H | — | — | — | — | — | — | H | — | H | H | — | — | — | . | . | . | . | . | . | . | A |
| 38 | L | H | H | — | — | — | — | — | H | H | — | — | H | — | — | — | . | . | . | . | . | . | . | A |
| 39 | L | H | H | — | — | — | — | — | H | — | — | H | H | — | — | — | . | . | . | . | . | . | . | A |
| 40 | | | | | | | | | | | | | | | | | | | | | | | | |
| 41 | | | | | | | | | | | | | | | | | | | | | | | | |
| 42 | | | | | | | | | | | | | | | | | | | | | | | | |
| 43 | | | | | | | | | | | | | | | | | | | | | | | | |

| | | | | | | | | | | | | | | | | | | | | | | |
|---|---|---|---|---|---|---|---|---|---|---|---|---|---|---|---|---|---|---|---|---|---|---|
| 44 | | | | | | | | | | | | | | | | | | | | | | |
| 45 | | | | | | | | | | | | | | | | | | | | | | |
| 46 | | | | | | | | | | | | | | | | | | | | | | |
| 47 | | | | | | | | | | | | | | | | | | | | | | |
| PIN NO. | 20 | 21 | 22 | 23 | 24 | 25 | 26 | 27 | 2 | 3 | 4 | 5 | 6 | 7 | 8 | 9 | 10 | 11 | 12 | 13 | | |
| | | | | | | | | | | | | | | | | | | | | | 15 | 16 | 17 | 18 |
| VARIABLE NAME | C2 | C1 | C0 | D15 | D14 | D13 | D12 | D11 | D10 | D9 | D8 | D7 | D6 | D4 | D2 | D0 | Q7 | Q6 | Q5 | Q4 | Q3 | Q2 | Q1 | Q0 |

PAL676 FIG. 14(a)
DYNAMIC MEMORY CONTROLLER
DMA/AMWC DMARD DMAWR CPU CPU-0 TAP0 TAP1 TAP2 GND
TAP4/DEL-D/OEH-D/OEL-C/OEH-C/W CK/CI1/CI2 VCC
OEL-D  =   TAP0*/TAP2*DMA
OEH-D  =   TAP2*DMA
OEL-C  =   TAP0*/TAP2*CPU
OEH-C  =   TAP2*CPU
W      =   DMAWR*DMA + AMWC*CPU
/CK    =   /DMARD*/DMAWR*/CPU
CI1    =   /TAP1*TAP2
CI2        TAP4*DMA + CPU-D*CPU
=D3*/CIN
DESCRIPTION:
  This PAL is used to control the necessary signals needed to access the
dynamic memory from both the CPU and DMA access.
PAL 683 FIG. 14(a)
REFRESH LOGIC
WRREQS TESTBN/TCKAN-0/KOPYIIENS DATAV DMA/REFEN/REFCPU
/REFDMA GND/RVLBN/TESTAN WRCKS KOPYIIS/KOPYIENS/REF
REFED REFEC/KOPYIEN VCC
/D6*D5*D4*D3*·  /TCKAN-S*TESTBN + ++
D2*D1*D0 =
              DATAV*KOPYIIENS*/TESTBN
KOPYIIS  =    KOPYIIENS*/TESTBN
/KOPYIENS =   /KOPYIEN*/TESTAN + /KOPYIEN*/RVLDN
REFED    =    DMA*REFEN
REFEC    =    /DMA*/REFCPU
/REF     =    /REFCPU/REFDMA
DESCRIPTION:
  This PAL is used to control the REFRESH of the dynamic memory.
NOTE:
  S means the signal is from the same side that the PAL is on.
  N means the signal is from the opposite side that the PAL is on.
PAL716 - FIG. 15(a)
7-BIT DECREMENTER
CK D0 D1 D2 D3 D4 D5 D6 CIN GND
/EN/Q0/Q1/Q2/Q3/Q4/Q5/Q6/Q7 VCC
Q0 : =  /D0*CIN + D0*/CIN
Q1 : =  /D1*D0*CIN + D1*/D0 + D1*/CIN
Q2 : =  /D2*D1*D0*CIN + D2*/D1 + D2*/D0 + D2*/CIN
Q3 : =  /D3*D2*D1*D0*CIN + D3*/D2 + D3*/D1 + D3*/D0 + D3*/CIN
Q4 : =  /D4*D3*D2*D1*D0 + D4*/D3 + D4*/D2 + D4*/D1 + D4*/D0 + D4*/CIN
Q5 : =  /D5*D4*D3*D2*D1*D0 + D5*/D4 + D5*/D3 + D5*/D2 +
        D5*/D1 + D5*/D0 + D5*/CIN
Q6 : =  /D6*D5*D4*D3*D2*D1*D0* + D6*/D5 + D6*/D4 ' D6*/D3 + D6*/D2 +
        D6*/D1 + D6*/D0 + D6*/CIN
Q7 : =  /D0*/D0
PAL736 - FIG. 15(a)
CONTROL PAL
CK R2 R3 S0 S1 S2 S3 T0 T1 GND/OE T2 QRC1 OUT 15 16 17/REFEN ENCK VCC
REFEN = S3*/S2 + R3*/R2
    /OUT : =  /T2*/T1*/T0*QRC1*/S3*S2*S1*S0 +
              /T2*/T1*T0*QRC1*S3*/S2*/S1*/S0 +
              /T2*T1*/T0*QRC1*S3*/S2*/S1*S0 +
              /T2*T1*T0*QRC1*S3*/S2*S1*/S0 +
              T2*/T1*/T0*QRC1*S3*/S2*S1*S0 +
              T2*/T1*T0*QRC1*S3*S2*/S1*/S0 +
              T2*T1*/T0*QRC1*S3*S2*/S1*S0 +
              T2*T1*T0*QRC1*S3*S2*S1*/S0
    /ENCK = QRC1*/OUT
    DESCRIPTION: This PAL provides the REFRESH ENABLE signal for the
    XRAM when in DMA mode, and the ENCK signal, which enables TCK-A &
    TCK-B at the proper time.
PAL727 - FIG. 15(b)
SERIALIZATION
QA QB QC QD RE RF SER RVLD/DUPL GND
RC RESYNC START/LD SEREN STREN/DUPLEN RVHOLD/HOLDB VCC
SEREN  =   SER + QA*/QB*/QC*/QD*/QE*/QF
/DUPLEN =  /RVHOLD*/RVLD*/HOLDB*/DUPL -continued

```
STREN =     RVHOLD + RVLD
/LD =       /RC*/START*/RESYNC
DESCRIPTION:
PAL730 - FIG. 15(b)
WRITE PRECOMP ENCODER
D0 D1/A/B/C/D/E/F/G GND/H/12/ISER
/15/16/PC0/PC1/PC2 VCC
PC0 -       /D0*/D1*D*/E*/F*/SER + D0*/D1*C*D*/E*F*/G*/SER +
            /D0*D1*A*B*C*D*/E*F*G*H*/I*/SER +
            /D*D1*B*C*D*/E*F*G*/H*/SER
PC1 =       /D0*/D1*/D*/E*F*/SER + /D0*/D1*D*/E*/F*/SER +
            D0*/D1*/C*D*/E*F*G*H*/SER + D0*/D1*B*C*D*/E*F*/G*/SER +
            /D0*/D1*/B*C*D*/E*F*G*H*I*/SER +
            /D0*D1*A*B*C*D*/E*F*G*/H*/SER + SER
16 =        /D0*/D1*/D*/E*F*/SER + /D0*/D1*D*/E*/F*/SER +
            D0*/D1*/C*D*/E*F*G*/SER + D0*/D1*C*D*/E*F*/G*/SER +
            /D0*D1*/B*C*D*/E*F*G*H*/SER
PC2 =       16 + /D0*D1*/A*B*C*D*/E*F*G*/H*/SER +
            /D0*D1*A*B*C*D*/E*F*G*H*/I*/SER +
            /D0*D1*B*C*D*/E*F*G*/H*/SER
PAL776 - FIG. 16(a)
WRITE PATTERN GENERATOR (FORMATTER, KOPY MODULE, QUALIFIER)
CK 2 S0 S1 C0 C1 CPU 8 9 GND EN/QD/QC/QB/QA/1F/6DB/PHD OUT VCC
QA =        /QA
QB =        QA*/QB +
            /QA*QB
QC =        QA*QB*/QC*/QD +
            /QA*QC*/QD +
            /QB*QC*/QD
QD =        QA*QB*QC*/QD +
            /QA*/QC*QD +
            /QB*/QC*QD
1F =        QA*QB
6DB =       QA*QB*/QC*QD +
            QA*/QB*/QD +
            QA*QB*QC*/QD
PHD =       QA*QB*/QC +
            QA*/QB*/QC*/QD +
            QA*QB*QC*/QD
    /OUT =  CPU*/C1*/C0*QA +
            CPU*/C1*C0*/1F +
            CPU*C1*/C0*/6DB +
            CPU*C1*C0*/PHD +
            /CPU*/S1*/S0*QA +
            /CPU*/S1*S0*/1F +
            /CPU*S1*/S0/6DB +
            /CPU*S1*S0*/PHD
PAL910 - FIG. 18(a)
INTCK COUNTER
CK 2 IN 4 5 6 7 8 9 GND/0E/STOP/QEN/QF/QE/QD/QC/QB/QA VCC
QEN =       IN
QA =        QEN*/QA
QB =        QEN*QA*/QB + QEN*/QA*QB
QC =        QEN*QA*QB*/QC + QEN*/QB*QC + QEN*/QA*QB*QC
QD =        QEN*QA*QB*QC*/QD + QEEN*/QC*QD + QEN*/QB*QC*QD +
            QEN*/QA*QB*QC*QD
QE =        QEN*QA*QB*QC*QD*/QE + QEN*/QD*QE + QEN*/QC*QD*QE +
            QEN*/QB*QC*QD*QE + QEN*/QA*QB*QCC*QD*QE
QF =        QEN*QA*QB*QC*QD*QE*/QF + QEN*/QE*QF
STOP =      QF
DESCRIPTION:
    Sets up the READ VERIFY circuit so that the invalid data is removed from the
shift registers.
PAL1204 - FIG. 20(b)
TRACK DECODER (HEX)
D0 D1 D2 D3 D4 D5 D6 D7 8IN GND
48TPI/OUT 13/27/4C/4F TRK00 18/IN VCC
27 =        /D7*/D6*D5*/D4*/D3*D2*D1*D0
4C =        /D7*D6*/D5*/D4*D3*D2*/D1*/D0
4F =        /D7*D6*/D5*/D4*D3*D2*D1*D0
OUT =       /TRK00
IN =        /8IN*48TPI*/27 + /8IN*/48TPI*/4F + 8IN*/4C
DESCRIPTION:
    This PAL controls the stepper limits two
        TRACK00                     ALL DRIVES
        TRACK 39 (27H)              5¼" 48TPI
        TRACK 79 (4FH)              5¼" 96TPI
        TRACK 76 (4CH)              8"
PAL1256 - FIG. 21(b)
WAY DECODER
/DS0/DS1/DS2/DS3/DS4 A11 A10 A9 A8 GND A7/CS1/CS3 UNITON A6 A5/NE1
/NE2/CS5 VCC
```

-continued

```
NE1  =   DS0*/A7 + /DS0*A7 + DS1*/A8 + /DS1*A8 + DS2*/A9 + /DS2*A9
NE2  =   DS3*/A10 + /DS3*A10 + DS4*/A11 + /DS4*A11
CS1  =   /NE1*/NE2*/A6*/A5 + UNITON*A11*A10*A9*A8*A7*/A6*/A5 +
         /DS0*/DS1*/DS2*/DS3*/DS4*/A6*/A5
CS3  =   /NE1*/NE2*/A6*A5 + UNITON*A11*A10*A9*A8*A7*/A6*A5 +
         /DS0*/DS1*/DS2*/DS3*/DS4*/A6*A5
CS5  =   /NE1*/NE2*A6*/A5 + UNITON*A11*A10*A9*A8*A7*A6*/A5 +
         /DS0*/DS1*/DS2*/DS3*/DS4*A6*/A5
DESCRIPTION:
   CS1 = I/O addresses 00 - 1F;
   CS3 = I/O addresses 20 - 3F;
   CS5 = I/O addresses 40 - 5F;
```

The invention has been described in considerable detail in order to comply with the Patent Statutes and to provide those skilled in the art with the information needed to apply the novel principles, and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. A system for replicating a magnetic recording member containing recorded information patterns located on said member in plural tracks in accordance with a predetermined format, comprising:
   (a) slave module means including
      (1) drive means for moving said recording member to be copied relative to a transducing head for detecting magnetic flux transitions stored on said magnetic member, and
      (2) data recovery means coupled to said transducing head for recovering data representing signals and clock signals from said flux transitions,
   (b) master module means including
      (1) a programmable microprocessor having random access memory means associated therewith for storing programs of instructions and data representing signals at addressable locations therein, said programs corresponding to a plurality of distinct operating modes,
      (2) serial-to-parallel data converter means for converting said flux transition from a serial sequence to a parallel representation of said flux transitions,
      (3) further memory means coupled to receive said parallel representations of said flux transitions from said serial-to-parallel data converter means and to store said parallel representations of said flux transitions as words of a predetermined length at addresses corresponding to a predetermined clock rate,
      (4) direct memory access control means for said further memory means initialized by said programmable microprocessor for assembling all of the words which had been recorded on a single track of said magnetic recording member in said further memory means,
      (5) translator means controlled by said microprocessor for assembling the contents of said further memory means into a particular binary code word format which depends upon the encoding scheme employed on said recording member,
      (6) means responsive to the presence of all words from a given track on said recording member in said further memory means for transferring said words sequentially to predetermined memory locations in said random access memory means of said programmable microprocessor; and
   (c) a serial data bus coupled between said data recovery means of said slave module means and said serial-to-parallel data converter means in said master module means for transferring said serial sequence of detected flux transitions from said slave module means to said master module means under control of said programmable microprocessor and dependent upon the mode specified by a program being executed by said programmable microprocessor.

2. A system for making duplicate copies of prerecorded flexible diskettes, comprising in combination:
   (a) a master module including
      (1) a mass storage device for storing binary encoded data signals including the words representing the image of the information to be duplicated;
      (2) microprocessor means having random access memory means associated therewith for storing a program of instructions for controlling operation of said mass storage device,
      (3) translator means coupled in communication with said mass storage device for converting said binary encoded data signals to flux transition representations of said data,
      (4) further memory means coupled to the output of said translator means for temporarily storing, in sequence, the flux transition representations for words to be recorded on a single track of a flexible diskette,
      (5) programmable timing means coupled to said microprocessor means,
      (6) parallel-to-serial converter means coupled to receive said flux transition representations of words in parallel and to produce a serial train of said flux transition representations under control of said programmable timing means;
   (b) slave module means including
      (1) drive means for rotating a diskette to be recorded upon at a controlled rate, said drive means including means for producing an index pulse upon each revolution of said diskette,
      (2) transducing means positioned in recording relationship to said diskette,
      (3) means responsive to said index pulse for stepping said transducing head to a different track position,
      (4) write current generating means connected to said transducing head and coupled to receive said serial train of flux transition representations for recording same on said diskette; and (c) a bidirectional, serial data bus having data line means coupling said parallel-to-serial converter means in said master module and said write current generating means in said slave module means and at least one control line for coupling said index pulses from said slave module to said programmable timing means and said microprocessor means whereby said microprocessor means maintains synchronization of the transfer of information to be recorded over said data lines means.

3. The system as in claim 2 and further including means for verifying the accuracy of the recording of said flux transition representations of said binary encoded data onto said diskette.

4. The system as in claim 3 wherein said means for verifying includes:

(a) means for retransmitting said flux transition signals from said master module to said slave module means;

(b) buffer storage means in said slave module means for receiving and temporarily storing said flux transition signals;

(c) means for reading the pattern of flux transitions previously recorded on said diskette on a track-by-track basis;

(d) means for synchronously comparing the contents of buffer means with the pattern of flux transitions being read from said diskette on a bit-by-bit basis for correspondence; and (e) means coupled to said comparing means for generating a signal when a lack of correspondence is detected.

5. In a system for recovering data from a magnetic recording member containing recorded information in the form of a self-clocking code, data separating means comprising in combination:

(a) means for reading flux transition peak signals from a magnetic recording member;

(b) a source of reference clock signals of a frequency nominally equal to the frequency of the clock encoded in said self-clocking code for defining a time window;

(c) means coupled to said source of reference clock signals for dividing said time window into a plurality of generally equal time segments;

(d) data synchronizing means for synchronizing said flux transition peak signals with said segments;

(e) presettable counting means coupled to said data synchronizing means and to said means for dividing for adjusting the length of said time window segments; and (f) phase correction logic means coupled to said presettable counting means for periodically entering a digital quantity into said presettable counting means under control of said data synchronizing means whereby a predetermined count value is accumulated in said presettable counting means in synchronism with the occurrence of said flux transition peak signals.

6. A system for recovering the data from a self-clocking encoded data pattern comprising:

(a) a source of reference clock signals of a nominal frequency corresponding to the frequency of the clock encoded in said self-clocking encoded data pattern for defining a timing window;

(b) means for dividing said timing window into a predetermined number of equal segments;

(c) data synchronizing means for synchronizing said segments of said timing window with said encoded data pattern;

(d) counter means coupled to said data synchronizing means and to said means for dividing said timing window into a predetermined number of equal segments for shifting said timing window to maintain a desired relationship between said timing window and said encoded data pattern; and (e) gating means coupled to receive the output from said data synchronizing means and controlled by said counter means for producing a return-to-zero data pattern at the output of said gating means.

7. The system for recovering the data from a self-clocking encoded data pattern as in claim 6 and further including means coupled to said counter means for shifting said timing window in relation to the phase difference between said reference clock signals and the clock encoded in said data pattern.

8. A system for replicating information patterns recorded on a magnetic surface, comprising:

(a) master module means including a programmable microprocessor having a central processing unit, a random access memory coupled to said central processing unit for storing a program of instructions and data-representing signals at addressable locations therein and first bi-directional transceiver means coupled to said random access memory means and to said central processing unit;

(b) a plurality of slave module means, each including: (1) drive means for moving said magnetic surface of each relative to an associated magnetic transducing means in synchronism with the magnetic surface of the other of said drive means, (2) read circuit means coupled to said magnetic transducing means for producing flux transition signals in accordance with the information patterns recorded on said magnetic surface, (3) write circuit means coupled to said magnetic transducing means for recording flux transition signals in accordance with a predetermined encoding scheme on said magnetic surface, and second bi-directional transceiver means coupled to said read circuit means and said write circuit means;

(c) a multi-conductor cable connecting said first bi-directional transceiver means in said master module to said second bi-directional transceiver means in each of said plurality of slave module means for selectively carrying said data representing signals, said flux transition signals and control signals, including slave module addressing signals, between said master module and said plurality of salve module means;

(d) identifier means for uniquely identifying said slave module means from one another; and (e) comparator means coupled to said identifier means and connected to receive slave module addressing signals originating at said cental processing unit in said master module via said multi-conductor cable whereby predetermined ones of said plurality of slave module means are selected for communication with said master module.

9. The system as in claim 8 wherein said comparator in said plurality of slave module means is responsive to a predetermined code for simultaneous selection of all of said slave module means for simultaneous communication with said master module.

10. The system as in claim 8 and further including:

mass storage means in said master module for storing binary word signals representative of the data to be replicated;

means including translator means for coupling said mass storage means in controlled relationship to said central processing unit and to said random access memory for encoding said data to be replicated into one of a plurality of flux transition formats and entering it into said random access memory at predetermined memory locations;

direct memory access sequencing means in said master module coupled to said random access memory for providing a predetermined series of memory addresses to said random access memory independent of said central processing unit for reading out the flux transition formatted data to be replicated therefrom;

parallel-to-serial converter means in said master module coupled between said random access memory and said first bi-directional transceivers;

a source of timing signals in said master module coupled via said first bi-directional transceivers, said multi-conductor cable and said second bi-directional transceivers for timing the entry of the output from said parallel-to-serial converter conveyed over said multi-conductor cable into buffer memory means in selected ones of said slave module means, and means coupling said buffer memory means to said write circuit means.

* * * * *